(12) United States Patent
Victor-Faichney et al.

(10) Patent No.: US 12,704,936 B2
(45) Date of Patent: Aug. 11, 2026

(54) USER INTERFACE ELEMENTS FOR FACILITATING DIRECT-TOUCH AND INDIRECT HAND INTERACTIONS WITH A USER INTERFACE PRESENTED WITHIN AN ARTIFICIAL-REALITY ENVIRONMENT, AND SYSTEMS AND METHODS OF USE THEREOF

(71) Applicant: Meta Platforms Technologies, LLC, Menlo Park, CA (US)

(72) Inventors: Anastasia Victor-Faichney, San Francisco, CA (US); Qi Xiong, San Carlos, CA (US); Jennifer Morrow, Sunnyvale, CA (US); Miguel Angel Maya Hernández, Bellevue, WA (US); John Nicholas Jitkoff, Seattle, WA (US); Ahad Habib Basravi, Oakland, CA (US); Irvi Stefo, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 179 days.

(21) Appl. No.: 18/435,799

(22) Filed: Feb. 7, 2024

(65) Prior Publication Data

US 2024/0272764 A1 Aug. 15, 2024

Related U.S. Application Data

(60) Provisional application No. 63/484,467, filed on Feb. 10, 2023, provisional application No. 63/484,190, filed on Feb. 9, 2023.

(51) Int. Cl.

| | |
|---|---|
| ***G06F 3/04815*** | (2022.01) |
| ***G06F 3/0482*** | (2013.01) |
| ***G06T 17/00*** | (2006.01) |

(52) U.S. Cl.
CPC ........ *G06F 3/04815* (2013.01); *G06F 3/0482* (2013.01); *G06T 17/00* (2013.01)

(58) Field of Classification Search
CPC .... G06F 3/04815; G06F 3/0482; G06F 3/011; G06F 3/017; G06F 3/04842; G06T 17/00
See application file for complete search history.

(56) References Cited

U.S. PATENT DOCUMENTS 6,842,175 B1 1/2005 Schmalstieg et al.
7,701,439 B2 4/2010 Hillis et al.
(Continued)

FOREIGN PATENT DOCUMENTS

CN 106716332 A 5/2017
CN 108536273 A 9/2018
(Continued)

OTHER PUBLICATIONS

Argelaguet F., et al., A Survey of 3D Object Selection Techniques for Virtual Environments, Computers & Graphics,2013, vol. 37, No. 3, pp. 121-136.
(Continued)

*Primary Examiner* — Jitesh Patel
(74) *Attorney, Agent, or Firm* — Potomac Law Group, PLLC; Dannon G. Allbee

(57) ABSTRACT

An example method of presenting, via an artificial-reality headset, a user interface that includes a selectable user interface element is described. The method includes that while a representation of a hand of a user is within an indirect-control threshold distance of the user interface, a focus selector is projected within the user interface based on a position of the representation of the hand of the user. The example method also includes that upon determining that the representation of the hand of the user has moved within a direct-touch threshold distance of the user interface, ceasing
(Continued)

to display the focus selector within the user interface and allowing the representation of the hand of the user to interact directly with the selectable user interface element.

18 Claims, 30 Drawing Sheets

(56) References Cited

U.S. PATENT DOCUMENTS 8,558,759 B1 10/2013 Prada Gomez et al.
8,836,768 B1 9/2014 Rafii et al.
8,947,351 B1 2/2015 Noble
9,117,274 B2 8/2015 Liao et al.
9,292,089 B1 3/2016 Sadek
9,406,277 B1 8/2016 Letourneur
9,477,303 B2 10/2016 Fleischmann et al.
9,477,324 B2 * 10/2016 Ajmera .................. G06F 3/017
9,477,368 B1 10/2016 Filip et al.
9,817,472 B2 11/2017 Lee et al.
10,042,430 B2 8/2018 Bedikian et al.
10,187,936 B1 1/2019 Letourneur
10,220,303 B1 3/2019 Schmidt et al.
10,248,284 B2 4/2019 Itani et al.
10,261,595 B1 4/2019 Kin
10,318,100 B2 6/2019 Abercrombie et al.
10,473,935 B1 11/2019 Gribetz et al.
10,488,939 B2 11/2019 Karmon et al.
10,515,484 B1 12/2019 Lucas et al.
10,521,944 B2 12/2019 Sareen et al.
10,536,691 B2 1/2020 Valdivia et al.
10,595,011 B2 3/2020 Han et al.
10,607,413 B1 3/2020 Marcolina et al.
10,691,233 B2 6/2020 Dalton et al.
10,890,983 B2 1/2021 Ravasz et al.
10,901,506 B2 1/2021 Wu et al.
10,956,724 B1 3/2021 Terrano
10,957,059 B1 3/2021 Katz et al.
11,079,753 B1 8/2021 Roy
11,221,730 B2 1/2022 Murphy et al.
11,278,810 B1 3/2022 Sarria, Jr. et al.
11,307,671 B2 4/2022 Liu et al.
11,514,650 B2 11/2022 Kim et al.
11,991,222 B1 5/2024 Walton et al.
12,056,269 B2 8/2024 Chung
2004/0236541 A1 11/2004 Kramer et al.
2008/0030429 A1 2/2008 Hailpern et al.
2008/0089587 A1 4/2008 Kim et al.
2009/0077504 A1 3/2009 Bell et al.
2010/0306716 A1 12/2010 Perez
2011/0239155 A1 9/2011 Christie
2011/0267265 A1 11/2011 Stinson
2012/0013613 A1 * 1/2012 Vesely .................. H04N 13/30
345/419
2012/0069168 A1 3/2012 Huang et al.
2012/0071892 A1 3/2012 Itkowitz et al.
2012/0113223 A1 5/2012 Hilliges et al.
2012/0143358 A1 6/2012 Adams et al.
2012/0188279 A1 7/2012 Demaine
2012/0206345 A1 8/2012 Langridge
2012/0218183 A1 8/2012 Givon et al.
2012/0218395 A1 8/2012 Andersen et al.
2012/0249740 A1 10/2012 Lee et al.
2012/0249741 A1 10/2012 Maciocci et al.
2012/0275686 A1 11/2012 Wilson et al.
2012/0293544 A1 11/2012 Miyamoto et al.
2013/0063345 A1 3/2013 Maeda
2013/0125066 A1 5/2013 Klein et al.
2013/0147793 A1 6/2013 Jeon et al.
2013/0182902 A1 7/2013 Holz
2013/0265220 A1 10/2013 Fleischmann et al.
2014/0007484 A1 1/2014 Erdoss et al.
2014/0125598 A1 5/2014 Cheng et al.
2014/0204002 A1 7/2014 Bennet et al.
2014/0236996 A1 8/2014 Masuko et al.
2014/0268360 A1 9/2014 Ellsworth
2014/0306891 A1 10/2014 Latta et al.
2014/0357366 A1 12/2014 Koganezawa et al.
2014/0375691 A1 12/2014 Kasahara
2015/0035746 A1 2/2015 Cockburn et al.
2015/0040040 A1 2/2015 Balan et al.
2015/0054742 A1 2/2015 Imoto et al.
2015/0062160 A1 3/2015 Sakamoto et al.
2015/0110285 A1 4/2015 Censo et al.
2015/0153833 A1 6/2015 Pinault et al.
2015/0160736 A1 6/2015 Fujiwara
2015/0169076 A1 6/2015 Cohen et al.
2015/0178985 A1 6/2015 Di Censo et al.
2015/0181679 A1 6/2015 Liao et al.
2015/0206321 A1 7/2015 Scavezze et al.
2015/0220150 A1 8/2015 Plagemann et al.
2015/0243100 A1 8/2015 Abovitz et al.
2015/0261659 A1 9/2015 Bader et al.
2015/0269783 A1 9/2015 Yun
2016/0026253 A1 1/2016 Bradski et al.
2016/0110052 A1 4/2016 Kim et al.
2016/0147308 A1 5/2016 Gelman et al.
2016/0170603 A1 6/2016 Bastien et al.
2016/0217614 A1 7/2016 Kraver et al.
2016/0335140 A1 11/2016 Liu et al.
2016/0378291 A1 12/2016 Pokrzywka
2016/0379660 A1 12/2016 Wright et al.
2017/0003784 A1 1/2017 Garg et al.
2017/0050542 A1 2/2017 Shigeta et al.
2017/0060230 A1 3/2017 Faaborg et al.
2017/0109936 A1 4/2017 Powderly et al.
2017/0139478 A1 5/2017 Jeon et al.
2017/0139481 A1 5/2017 Long
2017/0192513 A1 7/2017 Karmon et al.
2017/0206691 A1 7/2017 Harrises et al.
2017/0228130 A1 8/2017 Palmaro
2017/0262063 A1 9/2017 Blénessy et al.
2017/0263033 A1 9/2017 Church
2017/0278304 A1 9/2017 Hildreth et al.
2017/0287225 A1 10/2017 Powderly et al.
2017/0296363 A1 10/2017 Yetkin et al.
2017/0308166 A1 10/2017 Mallinson
2017/0323483 A1 11/2017 Palmaro
2017/0329515 A1 11/2017 Clement et al.
2017/0337742 A1 11/2017 Powderly et al.
2017/0364198 A1 12/2017 Yoganandan et al.
2018/0004283 A1 1/2018 Mathey-Owens et al.
2018/0033204 A1 2/2018 Dimitrov et al.
2018/0039341 A1 2/2018 Du Bois et al.
2018/0046245 A1 2/2018 Schwarz et al.
2018/0059788 A1 3/2018 Noguchi et al.
2018/0059901 A1 3/2018 Gullicksen
2018/0107278 A1 4/2018 Goel et al.
2018/0113599 A1 4/2018 Yin
2018/0157398 A1 6/2018 Kaehler et al.
2018/0188816 A1 7/2018 Liu et al.
2018/0303446 A1 10/2018 Schweizer
2018/0307303 A1 10/2018 Powderly et al.
2018/0322701 A1 11/2018 Pahud et al.
2018/0323992 A1 11/2018 Harms et al.
2018/0329492 A1 11/2018 Coppin et al.
2018/0335925 A1 11/2018 Hsiao et al.
2018/0357780 A1 12/2018 Young et al.
2018/0361234 A1 12/2018 Nietfeld et al.
2019/0018498 A1 1/2019 West et al.
2019/0050071 A1 2/2019 Liu et al.
2019/0057531 A1 2/2019 Sareen et al.
2019/0094981 A1 3/2019 Bradski et al.
2019/0107894 A1 4/2019 Hebbalaguppe et al.
2019/0120593 A1 4/2019 Randles
2019/0129607 A1 5/2019 Saurabh et al.
2019/0130653 A1 5/2019 Kuehne
2019/0138107 A1 5/2019 Nietfeld et al.
2019/0146599 A1 5/2019 Gunnarsson et al.
2019/0213792 A1 7/2019 Jakubzak et al.
2019/0258318 A1 8/2019 Qin et al.
2019/0265828 A1 8/2019 Hauenstein et al.
2019/0278376 A1 9/2019 Kutliroff et al.
2019/0279424 A1 9/2019 Clausen et al.

(56) References Cited

U.S. PATENT DOCUMENTS

2019/0286231 A1 9/2019 Burns et al.
2019/0290999 A1 9/2019 Bradner et al.
2019/0318640 A1 10/2019 Goel et al.
2019/0324549 A1* 10/2019 Araki .................... G06V 40/28
2019/0325651 A1 10/2019 Bradner et al.
2019/0347865 A1 11/2019 Hackett et al.
2019/0361521 A1 11/2019 Stellmach et al.
2019/0362562 A1 11/2019 Benson
2019/0369391 A1 12/2019 Cordesses et al.
2019/0377416 A1 12/2019 Alexander
2019/0391710 A1 12/2019 Shen
2020/0001172 A1 1/2020 Nicoli
2020/0005026 A1 1/2020 Andersen et al.
2020/0005539 A1 1/2020 Hwang et al.
2020/0005541 A1 1/2020 Preston
2020/0012341 A1 1/2020 Stellmach et al.
2020/0074742 A1 3/2020 Rogers
2020/0082629 A1 3/2020 Jones et al.
2020/0097077 A1 3/2020 Nguyen et al.
2020/0097091 A1 3/2020 Chou et al.
2020/0129850 A1 4/2020 Ohashi
2020/0159337 A1 5/2020 Kin et al.
2020/0218423 A1 7/2020 Ohashi
2020/0225736 A1 7/2020 Schwarz et al.
2020/0225757 A1 7/2020 Schwarz et al.
2020/0225758 A1 7/2020 Tang et al.
2020/0225813 A1 7/2020 Schwarz et al.
2020/0225830 A1* 7/2020 Tang ....................... G06F 3/011
2020/0226814 A1 7/2020 Tang et al.
2020/0286299 A1 9/2020 Wang et al.
2020/0310561 A1 10/2020 Connellan et al.
2020/0379576 A1 12/2020 Chen et al.
2020/0387228 A1 12/2020 Ravasz et al.
2020/0387287 A1 12/2020 Ravasz et al.
2020/0388247 A1 12/2020 Ravasz et al.
2021/0011556 A1 1/2021 Atlas et al.
2021/0076091 A1 3/2021 Shohara
2021/0089127 A1 3/2021 Wu et al.
2021/0096726 A1 4/2021 Faulkner et al.
2021/0134065 A1 5/2021 Ramani et al.
2021/0141461 A1 5/2021 Liu et al.
2021/0183135 A1 6/2021 Lin et al.
2021/0208698 A1 7/2021 Martin et al.
2021/0373672 A1 12/2021 Schwarz et al.
2022/0084279 A1 3/2022 Lindmeier et al.
2022/0121344 A1 4/2022 Pastrana Vicente et al.
2022/0129082 A1 4/2022 Schoen
2022/0147137 A1* 5/2022 Johnston ................ G06F 3/011
2022/0156999 A1 5/2022 Assouline et al.
2022/0163800 A1 5/2022 Yokokawa
2022/0198755 A1 6/2022 Pinchon
2022/0244834 A1 8/2022 Ravasz et al.
2022/0262080 A1 8/2022 Burton et al.
2022/0365739 A1 11/2022 Chang et al.
2023/0031913 A1 2/2023 Ishikawa et al.
2023/0040610 A1 2/2023 Buerli et al.
2023/0072423 A1 3/2023 Osborn et al.
2023/0139337 A1 5/2023 Noam et al.
2023/0252737 A1 8/2023 Dreyer et al.
2023/0274512 A1 8/2023 Terre et al.
2023/0343052 A1 10/2023 Kimura et al.
2023/0344662 A1 10/2023 Banks et al.
2024/0019938 A1 1/2024 Whitmire et al.
2024/0028129 A1 1/2024 Whitmire et al.
2024/0045509 A1 2/2024 Holz
2024/0112426 A1 4/2024 Berliner et al.
2024/0201776 A1 6/2024 Jun et al.
2024/0212302 A1 6/2024 Sorg et al.
2024/0264660 A1 8/2024 Levatich et al.
2024/0265656 A1 8/2024 Victor-Faichney et al.
2024/0281070 A1 8/2024 Emami et al.
2024/0281071 A1 8/2024 Emami et al.
2024/0346751 A1 10/2024 Vizeu Oliveira et al.
2024/0372901 A1 11/2024 Walton et al.
2025/0054243 A1 2/2025 Selig et al.
2025/0068297 A1 2/2025 Selig et al.
2025/0103636 A1 3/2025 Chan et al.
2025/0166536 A1 5/2025 Wang et al.
2025/0348151 A1 11/2025 Emami et al.

FOREIGN PATENT DOCUMENTS

CN 110134234 B 5/2022
CN 116339737 A 6/2023
CN 118045365 A 5/2024
EP 3155560 A1 4/2017
EP 3155560 B1 5/2020
EP 3188075 B1 2/2023
EP 4145397 A1 3/2023
EP 4386519 A1 6/2024
EP 4189460 B1 4/2025
JP 2015100032 A 5/2015
JP 2015176439 A 10/2015
JP 2015192436 A 11/2015
JP 2017529635 A 10/2017
JP 2023181132 A 12/2023
KR 20120136719 A 12/2012
TW 202313162 A 4/2023
WO 2014119258 A1 8/2014
WO 2015192117 A1 12/2015
WO 2017009707 A1 1/2017
WO 2018067508 A1 4/2018
WO 2018235371 A1 12/2018
WO 2019245681 A1 12/2019
WO 2022146938 A1 7/2022
WO 2022150113 A1 7/2022
WO 2023158745 A1 8/2023

OTHER PUBLICATIONS

Cardoso J., Comparison of Gesture, Gamepad, and Gaze-Based Locomotion for VR Worlds, Proceedings of the 22nd ACM Conference on Virtual Reality Software and Technology, Nov. 2, 2016, pp. 319-320.

European Search Report for European Patent Application No. 24154976.5, dated Jun. 7, 2024, 8 pages.

European Search Report for European Patent Application No. 24155225.6, dated May 2, 2024, 10 pages.

Fox B., et al., "Designing Singlehanded Shortcuts for VR & AR," May 10, 2018, Retrieved from the Internet: URL: https://www.roadtovr.com/leap-motion-designing-single-handed-shortcuts-for-vr-ar/, [Retrieved on Oct. 27, 2020], 18 pages.

GAMESPOT: "Oculus Touch Review," Dec. 5, 2016, Retrieved from the Internet: URL: https://www.youtube.com/watch?v=YO7Y0KEhUog, 3 pages.

Hincapie-Ramos J.D., et aL, "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

Huang Y., et al., "Evaluation of a Hybrid of Hand Gesture and Controller Inputs in Virtual Reality," International Journal of Human-Computer Interaction, Aug. 26, 2020, vol. 37, No. 2, pp. 169-180.

International Preliminary Report on Patentability for International Application No. PCT/US2020/051763, mailed Mar. 31, 2022, 10 pages.

International Preliminary Report on Patentability for International Application No. PCT/US2024/013757, mailed Aug. 28, 2025, 10 pages.

International Preliminary Report on Patentability for International Application No. PCT/US2024/015076, mailed Aug. 21, 2025, 9 pages.

International Search Report and Written Opinion for International Application No. PCT/US2020/051763, mailed Feb. 3, 2021, 11 Pages.

International Search Report and Written Opinion for International Application No. PCT/US2021/063536 mailed Mar. 22, 2022, 12 pages.

(56) References Cited

OTHER PUBLICATIONS

International Search Report and Written Opinion for International Application No. PCT/US2023/017990, mailed Jul. 10, 2023, 9 pages.
International Search Report and Written Opinion for International Application No. PCT/US2024/013757, mailed May 7, 2024, 14 pages.
International Search Report and Written Opinion for International Application No. PCT/US2024/015076, mailed May 7, 2024, 12 pages.
International Search Report and Written Opinion for International Application No. PCT/US2024/036906, mailed Oct. 17, 2024, 14 pages.
International Search Report and Written Opinion for International Application No. PCT/US2024/040999, mailed Dec. 2, 2024, 10 pages.
International Search Report and Written Opinion of International Application No. PCT/US2020/035998, mailed Sep. 30, 2020, 16 pages.
Lang B., "Leap Motion Virtual Wearable AR Prototype is a Potent Glimpse at the Future of Your Smartphone," Mar. 24, 2018, Retrieved from the Internet: URL: https://www.roadtovr.com/leap-motion-virtual-wearable-ar-prototype-glimpse-of-future-smartphone/, [Retrieved on Oct. 27, 2020], 6 pages.
Lee M.S., et al., "A Computer Vision System for on-Screen Item Selection by Finger Pointing," In Proceedings of the 2001 IEEE Computer Society Conference on Computer Vision and Pattern Recognition (CVPR), 2001, vol. 1, 8 pages.
Mardanbegi D., et al., "Eyesee Through: Unifying Tool Selection and Application in Virtual Environments," In 2019 IEEE Conference on Virtual Reality and 3D User Interfaces (VR), 2019, pp. 474-483.
Matsuda K., "Augmented City 3D [Official]," YouTube, Aug. 20, 2010, Retrieved from the Internet: URL: https://www.youtube.com/watch?v=3TL80ScTLIM, 1 page.
Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Meta Quest: "Oculus Touch—Hand Presence Technology," Oct. 7, 2016, Retrieved from the Internet: URL: https://www.youtube.com/watch?v=pppkQ4jlrMU, 3 pages.
Mine M.R., et al., Moving Objects in Space: Exploiting Proprioception in Virtual-Environment Interaction, In Proceedings of the 24th Annual Conference on Computer Graphics and Interactive Techniques, 1997, pp. 19-26.
Newton A., "Immersive Menus Demo," YouTube, Oct. 8, 2017, Retrieved from the Internet: URL: https://www.youtube.com/watch?v=_ow1RboHJDY, 1 page.
Notice of Allowance mailed May 22, 2025 for U.S. Appl. No. 18/095,946, filed Jan. 11, 2023, 5 pages.
Office Action mailed Apr. 9, 2024 for Japanese Patent Application No. 2021-555497, filed on Jun. 3, 2020, 4 pages.
Office Action mailed Sep. 19, 2023 for European Patent Application No. 20747255.6, filed on Dec. 7, 2021, 6 pages.
Office Action mailed Feb. 27, 2024 for Chinese Application No. 202080035337.X, filed Jun. 3, 2020, 8 pages.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Pfeuffer, et al., "Gaze+ Pinch Interaction in Virtual Reality," Proceedings of the 5th Symposium on Spatial User Interaction, SUI '17, Oct. 16, 2017, pp. 99-108.
Prosecution History of U.S. Appl. No. 16/434,919, dated Apr. 2, 2020 through Dec. 15, 2020, 46 pages.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et aL, "EyePointing: A Gaze-Based Selection Technique," Proceedings of Mensch and Computer, Hamburg, Germany, Sep. 8-11, 2019, pp. 719-723.
Tomberlin M., et al., "Gauntlet: Travel Technique for Immersive Environments using Non-Dominant Hand," IEEE Virtual Reality (VR), Mar. 18, 2017, pp. 299-300.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Discord., "How to Enable and Use the Discord Overlay," Youtube. Com, Mar. 14, 2016, [Retrieved on May 28, 2024], 2 Pages, Retrieved from the Internet URL: https://www.youtube.com/watch?v=7xvpcXvNwJs.
International Preliminary Report on Patentability for International Application No. PCT/US2024/021541, mailed Nov. 13, 2025, 10 pages.
International Search Report and Written Opinion for International Application No. PCT/US2024/021541, mailed Jun. 10, 2024, 14 pages.
International Search Report and Written Opinion for International Application No. PCT/US2025/048371, mailed Jan. 5, 2026, 10 pages.
Office Action mailed Dec. 18, 2025 for European Patent Application No. 24155225.6, filed on Feb. 1, 2024, 9 pages.
Valem Tutorials., "How to Interact in VR—Oculus Interaction SDK—Part 1," YouTube, Mar. 14, 2022, [Retrieved on Dec. 16, 2025], XP093347652, 2 pages, Retrieved from the Internet URL: https://www.youtube.com/watch?v=1FRqniErAfs&list=PLpEoiloH-4eMRR8wAfy22ecQeCT2tluMD.
International Preliminary Report on Patentability for International Application No. PCT/US2024/036906, mailed Mar. 5, 2026, 12 pages.
International Preliminary Report on Patentability for International Application No. PCT/US2024/040999, mailed Feb. 26, 2026, 8 pages.
Extended European Search Report for European Patent Application No. 26152580.2, dated Mar. 25, 2026, 9 pages.
LOLAMBEAN: "Getting around Hololens 2," Microsoft Learn, Aug. 30, 2021, XP093333393, 11 pages, Retrieved from the Internet URL: https://learn.microsoft.com/en-US/hololens/hololens2-basic-usage.

* cited by examiner

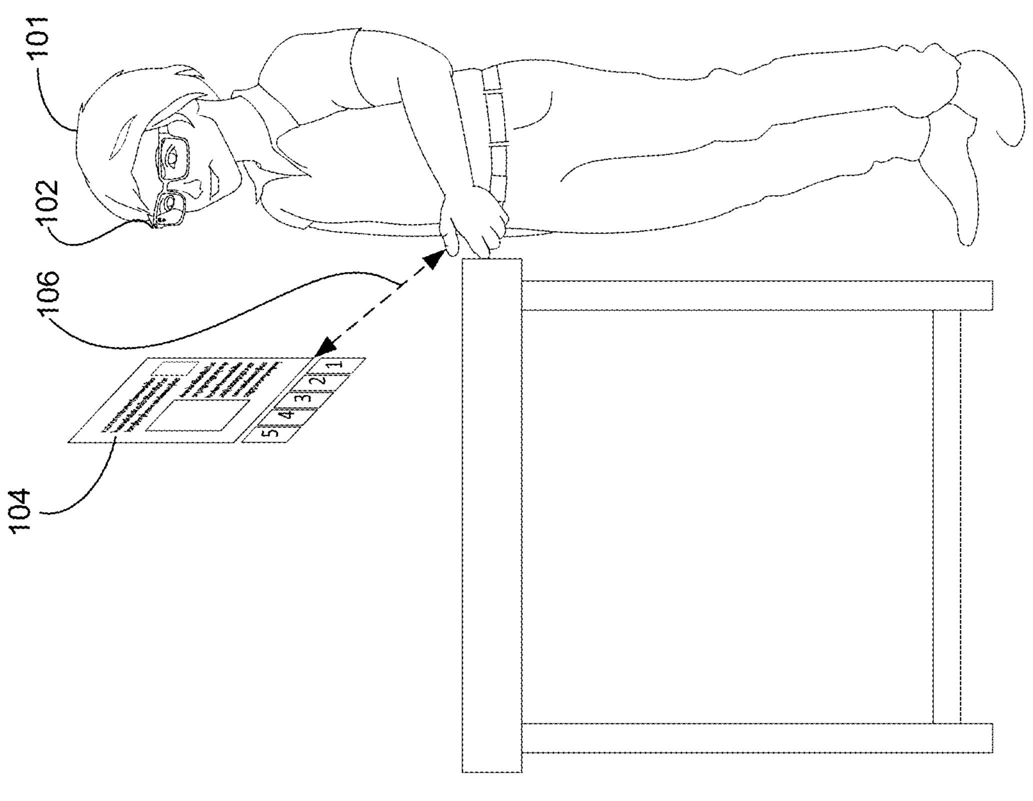
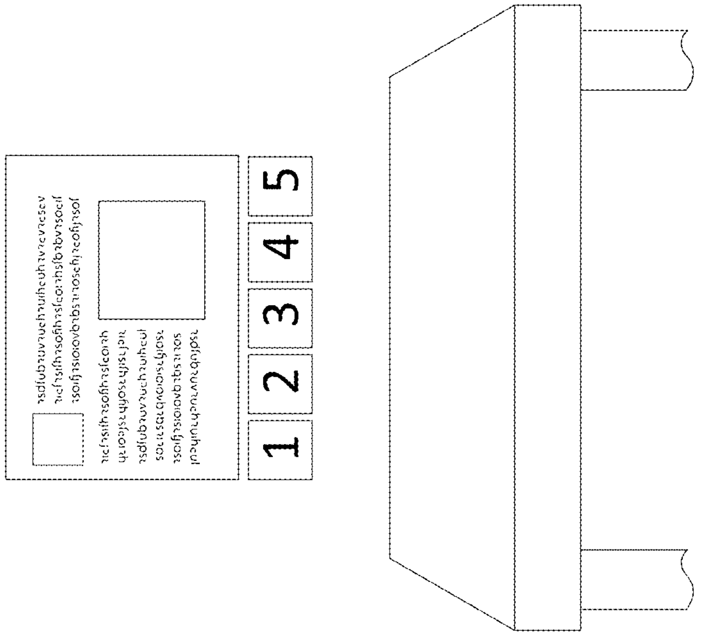
Figure 1A

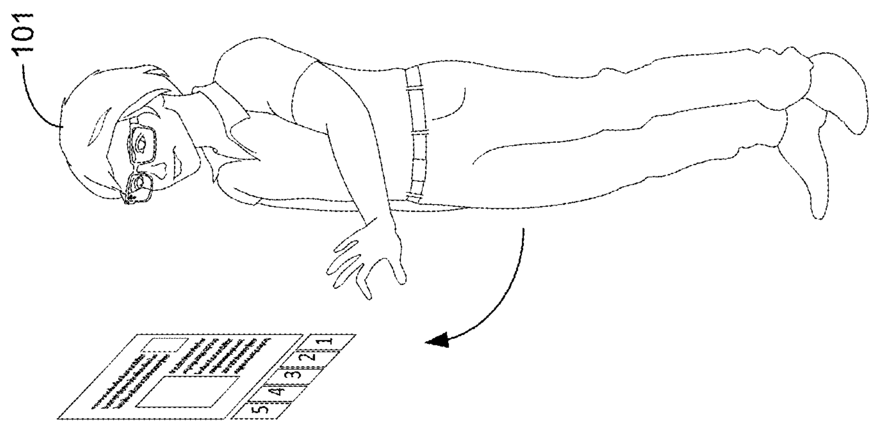
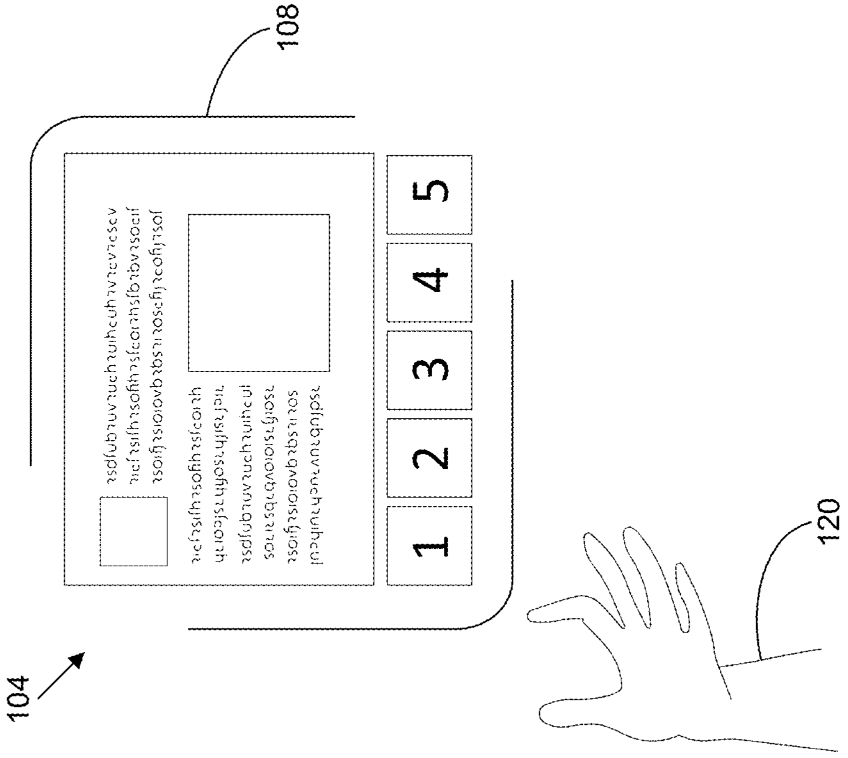
Figure 1B 108
1
2
3
4
5

108

132
142
140
120

108

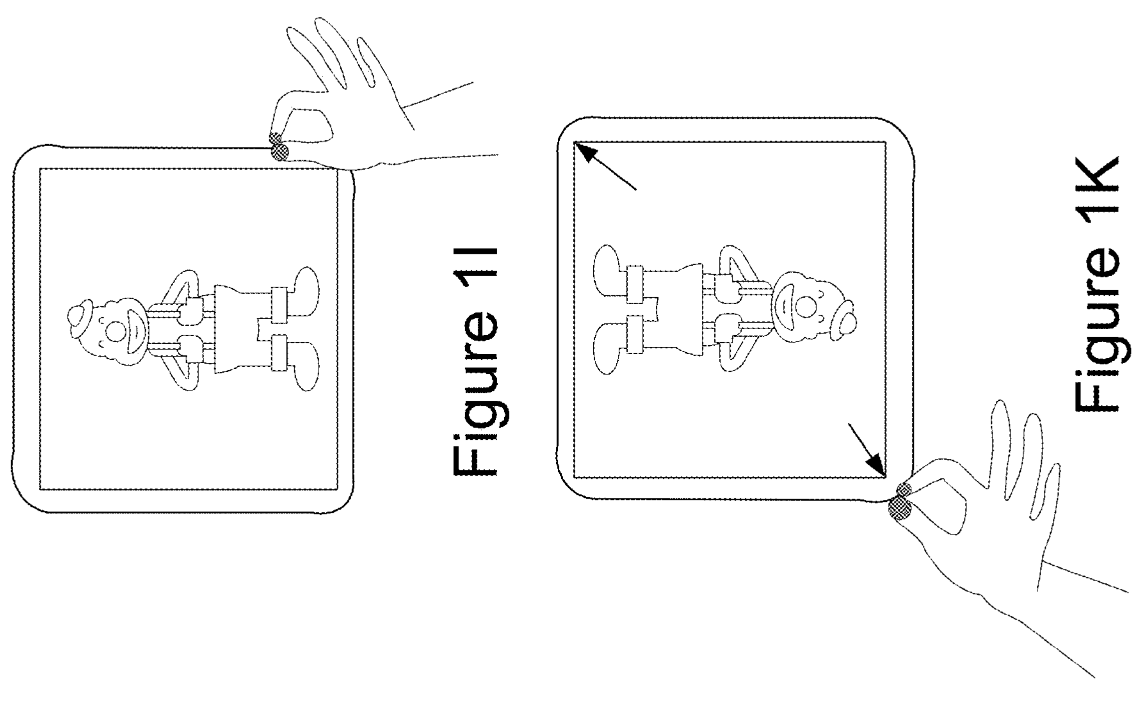
Figure 1I
Figure 1K
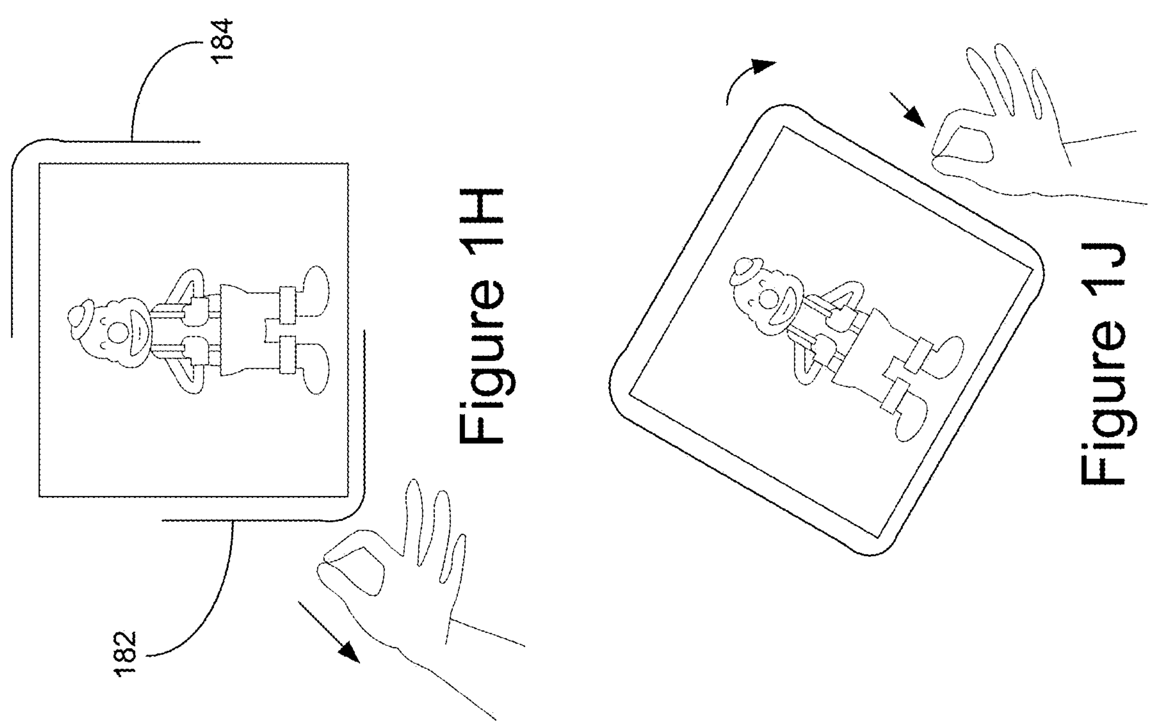
Figure 1H
Figure 1J

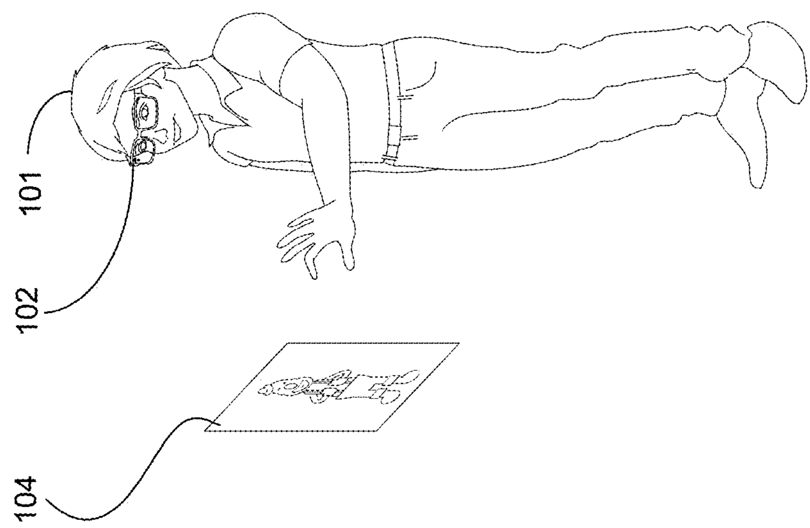
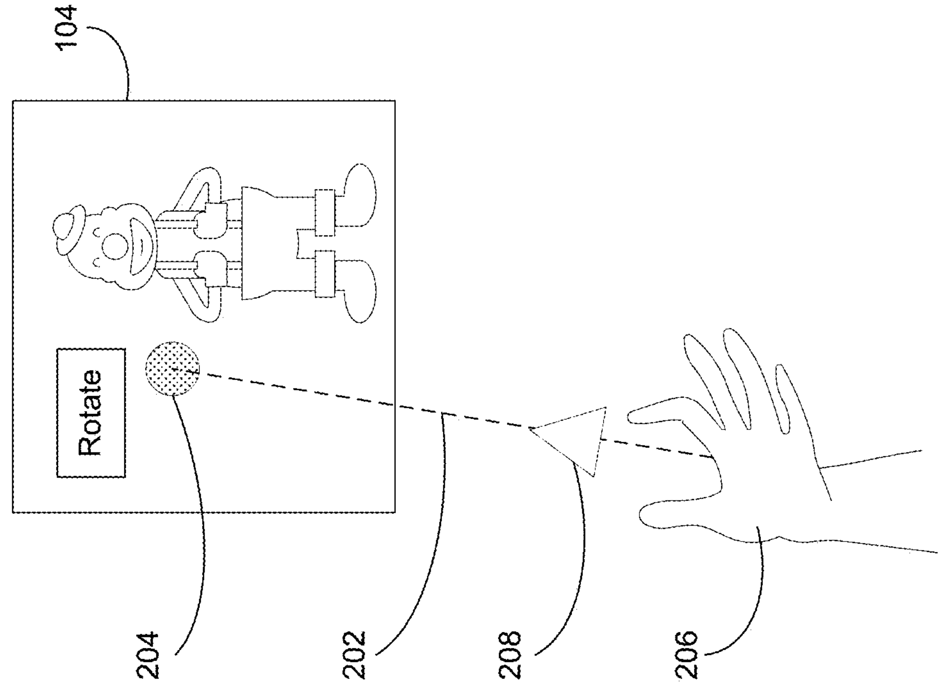
Figure 2A

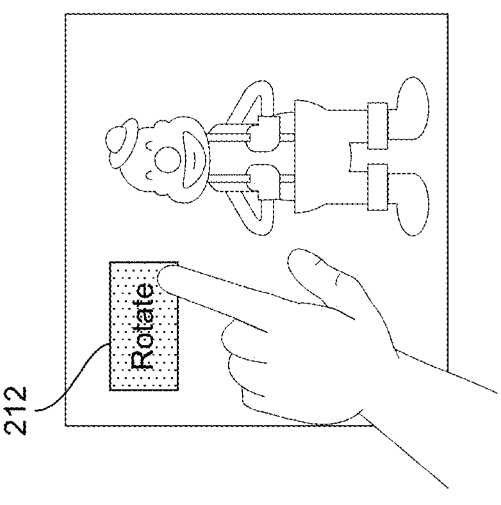
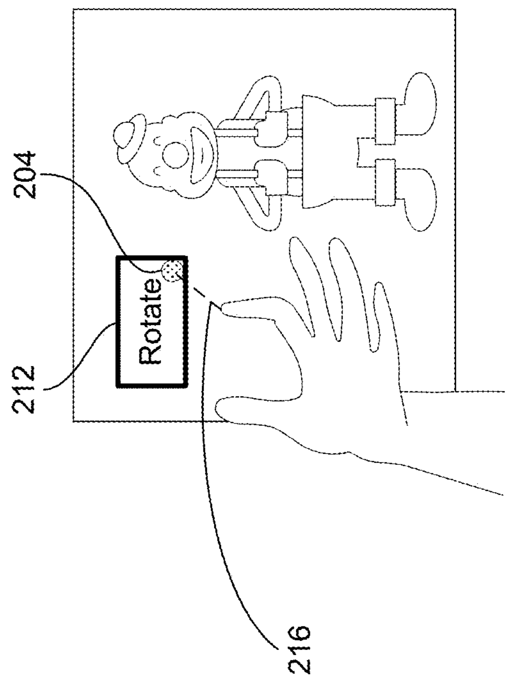
Figure 2D

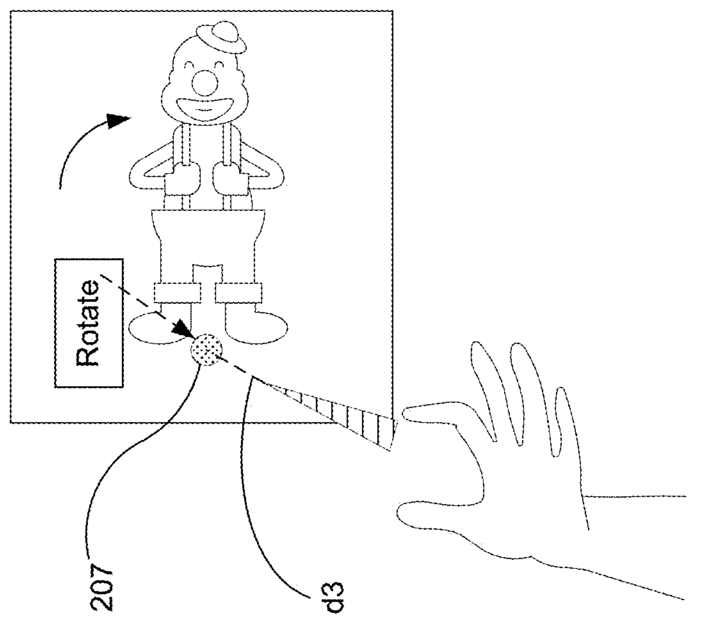
Figure 2G
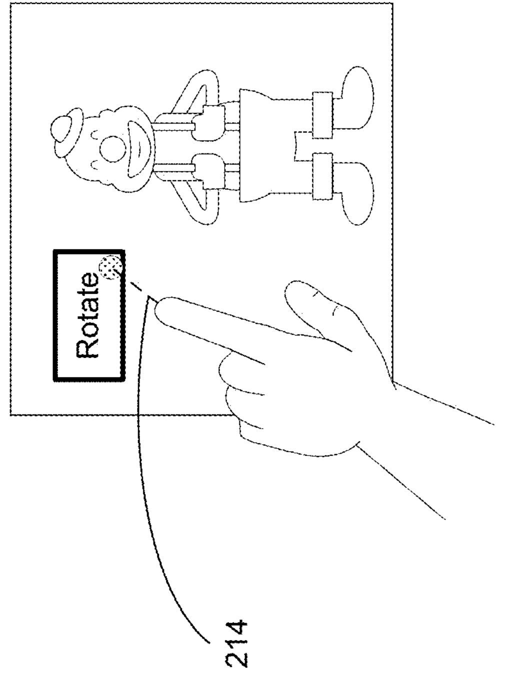
Figure 2F

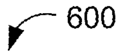

602 Present, via an artificial-reality headset, a user interface that includes a perimeter.

↓

604 In accordance with a determination that a representation of a hand of the user is within a direct-touch interaction distance from the user interface, present a user interface element outside the perimeter.

↓

606 While presenting the user interface element outside of a portion of the perimeter, in response to detecting the representation of the hand of the user interacting with the user interface element that is presented outside the perimeter, modify the user interface element such that it surrounds all of the perimeter.

Figure 6A

632 Present, via an artificial-reality headset, a user interface that includes a system-level control and an application-specific control.

634 While a user interface is presented in a first display mode during a first period of time, presenting, via the artificial-reality headset, the user interface such that it is in contact with the user interface element that includes the system-level control and the application-specific control.

636 In response to a request to present the user interface using a second display mode that is distinct from the first display mode, presenting, via the artificial-reality headset, the user interface such that it is not in contact with the user interface element that includes the system-level control and the application-specific control.

Figure 6B

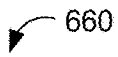

662 Present, via an artificial-reality headset, a user interface that includes a selectable user interface element.

↓

664 While a representation of a hand of a user is within an indirect-control threshold distance of the user interface, projecting a focus selector within the user interface based on a position of the representation of the user's hand.

↓

666 Upon determining that the representation of the hand of the user has moved within a direct-touch threshold distance of the user interface, ceasing to display the focus selector within the user interface and allowing the representation of the hand of the user to interact directly with the selectable user interface.

Figure 6C

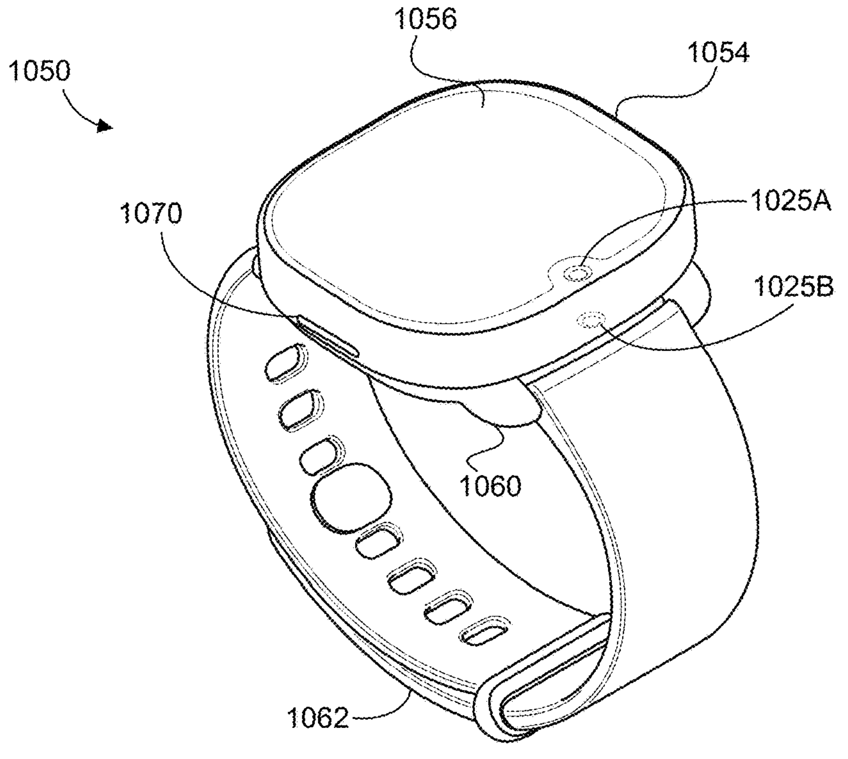
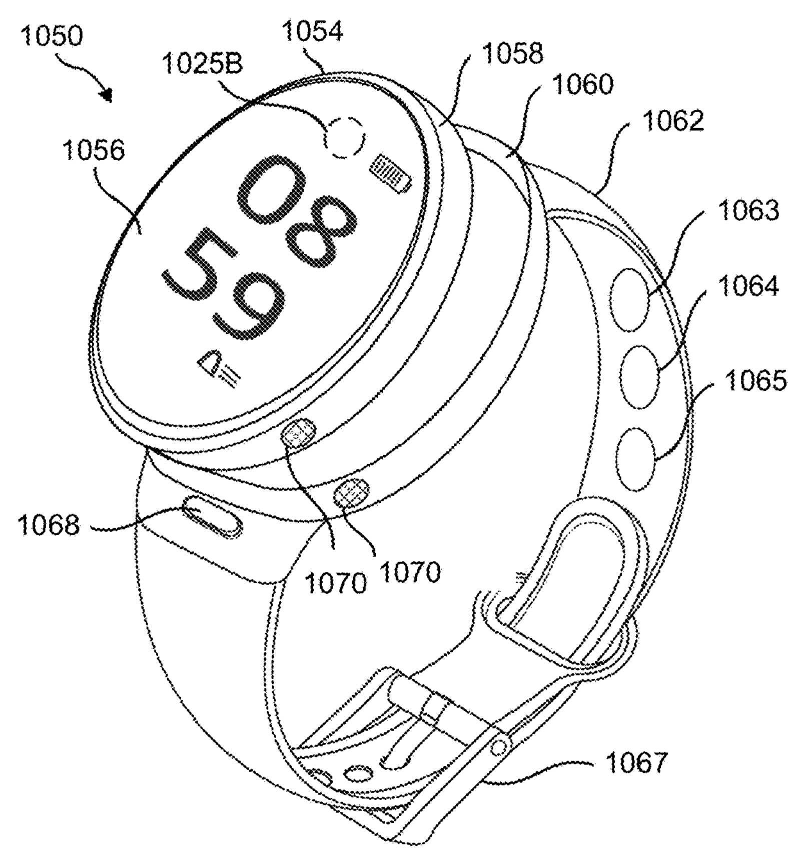
Figure 7A

USER INTERFACE ELEMENTS FOR FACILITATING DIRECT-TOUCH AND INDIRECT HAND INTERACTIONS WITH A USER INTERFACE PRESENTED WITHIN AN ARTIFICIAL-REALITY ENVIRONMENT, AND SYSTEMS AND METHODS OF USE THEREOF

RELATED APPLICATIONS

This claims the benefit of, and the priority to, U.S. Provisional Application Ser. No. 63/484,190, entitled "User Interface Elements for Facilitating Direct Touch And Indirect Hand Interactions With A User Interface Presented Within An Artificial-Reality Environment, And Systems And Methods Of Use Thereof" filed Feb. 9, 2023, and also claims the benefit of, and the priority to, U.S. Provisional Application Ser. No. 63/484,467, entitled "User Interface Elements for Facilitating Direct Touch And Indirect Hand Interactions With A User Interface Presented Within An Artificial-Reality Environment, And Systems And Methods Of Use Thereof" filed Feb. 10, 2023, the disclosures of which are incorporated in their entirety by this reference.

TECHNICAL FIELD

This relates generally to artificial-reality headsets, including but not limited to techniques for facilitating efficient and intuitive hand interactions with user interfaces of artificial-reality environments, including: (i) hand interactions with a user interface element that substantially surrounds a perimeter of a user interface, (ii) a user interface that includes a plurality of distinct display modes, and (iii) adjusting hand control of a user interface from indirect to direct-touch control based on a distance from the user interface.

BACKGROUND

Artificial-reality environments, such as augmented-reality and virtual-reality environments, can provide a richer interactive experience than conventional computing devices, such as desktop computers, tablets, and smartphones. However, interaction with such artificial-reality environments typically requires hand-held controllers or other mechanical input means for interacting with user interfaces of the artificial-reality environment. Such mechanical input means can be bulky, complicated, tedious to use, and prone to causing repetitive motion disorders, such as carpal tunnel syndrome. Further, some interaction means for artificial-reality environments do not provide an amount of control to users that makes the users feel in control of the artificial-reality experience.

As such, there is a need to address one or more of the above-identified challenges. A brief summary of solutions to the issues noted above are described below.

SUMMARY

The techniques described herein provide rich, predictable, and intuitive guidance for enabling hand interactions by users of artificial-reality environments, thereby providing for a more efficient man-machine interface, and enabling sustained interactions for users of artificial-reality environments (e.g., avoiding errors that users might otherwise commit, which causes them to waste time in having to retrace operations and thereby experience frustration and possibly minimize or eliminate their interactions with artificial-reality systems). Some embodiments of the disclosure for achieving the above-mentioned technical improvements are briefly described below.

A first example method is described herein. The method includes presenting, via an artificial-reality headset (as used herein, this term can refer to any headset that is used to present artificially-generated content (e.g., content that is not in user's physical world) to a user, including virtual-reality headsets as well as augmented-reality glasses, among other types of artificial-reality headsets), a user interface that includes a perimeter. The method includes, in accordance with a determination that a representation of a hand of a user (as explained herein, a user's physical hand can move and cameras of a virtual-reality headset or augmented-reality glasses (or other types of artificial-reality headsets) can be used to track positioning and orientation of the user's physical hand to then allow for rendering a representation of the user's hand with which the user interfaces discussed herein can be interacted with) is within a direct-touch interaction distance (also referred to as a direct-touch threshold distance, which can be e.g., a distance of between 0-10 pixels (e.g., volumetric pixels, or voxels)) from the user interface, presenting a user interface element outside of the perimeter. As described herein, pixels can be understood as two-dimensional pixels when a user interface is viewed, e.g., in screenshot form (which can be a screenshot taken of an artificial-reality user interface that includes a grab-handle element) in two dimensions, and/or three-dimensional volumetric pixels (voxels), which can be presented while the user is viewing respective artificial-reality user interfaces via an artificial-reality headset. And the method includes, while presenting the user interface element outside of a portion of the perimeter, in response to detecting the representation of the hand of the user interacting with the user interface element that is presented outside of the perimeter, modifying the user interface element such that it surrounds substantially all of the perimeter. Indirect-control threshold distances (distinct from, and larger than, direct-touch interaction distances) are also contemplated herein, which allow for users to move artificial-reality user interfaces around when the representation of the user's hand is further away from a respective artificial-reality interface, which indirect-touch interaction distance can be a distance, in some embodiments, of between 30-90 pixels (e.g., volumetric pixels, or voxels) from the respective artificial-reality interface.

A second example method is also described herein. The method includes, presenting, via an artificial-reality headset, a user interface element that includes a system-level control and an application-specific control. The method includes, while a user interface is presented in a first display mode during a first period of time, presenting, via the artificial-reality headset, the user interface such that it is in contact with the user interface element that includes the system-level control and the application-specific control. And the method includes in response to a request to present the user interface using a second display mode that is distinct from the first display mode, presenting, via the artificial-reality headset, the user interface such that it is not in contact with the user interface element that includes the system-level control and the application-specific control. Aspects of this are shown in the sequence of FIGS. 4A-4E.

A third example method is also described herein. The method includes presenting, via an artificial-reality headset, a user interface that includes a selectable user interface element. The method includes, while a representation of a user's hand is within an indirect-control threshold distance (e.g., a distance of between 30-90 pixels (e.g., volumetric pixels, or voxels)) of the user interface, projecting a focus selector within the user interface based on a position of the representation of the user's hand. And the method includes, upon determining that the representation of the user's hand has moved within a direct-touch threshold distance (e.g., an example distance range was noted above) of the user interface, ceasing to display the focus selector within the user interface and allowing the representation of the user's hand to interact directly with the selectable user interface element. An example of this is shown in FIGS. 2A-2I, which correspond in part to certain figures shown in Appendix A of the U.S. Provisional Application No. 63/484,467 and the U.S. Provisional Application No. 63/484,190, which are both incorporated herein by reference.

Any of the operations of the first, second, and third example methods described above may be performed sequentially, in combination, and/or concurrently. For example, a user interface (e.g., an artificial-reality panel user interface) that is in contact with a user interface element (e.g., a universal menu) and not in contact with the user interface element in the second display mode may also have an associated user interface element (e.g., a grab handle) that is configured to be presented at portions or all of a surrounding perimeter of the user interface. The grab handle of the panel user interface may be configured to be interacted with by a user's hand via a focus selector projected toward the grab handle while the user's hand is within an indirect-control threshold distance of the user interface (e.g., via ray casting). And the grab handle of the panel user interface may be configured to be interacted with directly by a representation of the user's hand while the user's hand is within a direct-touch threshold distance of the user interface.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 1A-1K show an example sequence of a user interacting with an artificial-reality user interface (e.g., a panel user interface) that is configured to be presented with a user interface element that surrounds substantially all of a perimeter of the user interface when a representation of a user's hand is close enough for such an interaction (e.g., within a direct-touch interaction control distance), in accordance with some embodiments.

FIGS. 2A-2I show an example sequence of a user interacting with artificial-reality content using a plurality of distinct input-control modes (including direct-touch and indirect-control modes) based a distance of a representation of a hand of the user from an artificial-reality user interface and an orientation of a hand of a user, in accordance with some embodiments.

FIG. 6A-6C show example flow charts for methods of user interactions via hands of a user (as explained herein, a user's physical hand can move and cameras of a virtual-reality headset or augmented-reality glasses can be used to track positioning and orientation of the user's physical hand to then allow for rendering a representation of the user's hand with which the user interfaces discussed herein can be interacted with) with user interfaces presented within an artificial-reality environment, in accordance with some embodiments.

FIGS. 7A-7E illustrate example wrist-wearable devices (e.g., sensor data from the wrist-wearable devices can be used in conjunction with computer-vision-based tracking techniques to help with accurately rendering representations of a user's hands in artificial-reality environments), in accordance with some embodiments.

Figures 1, 1C, 2:
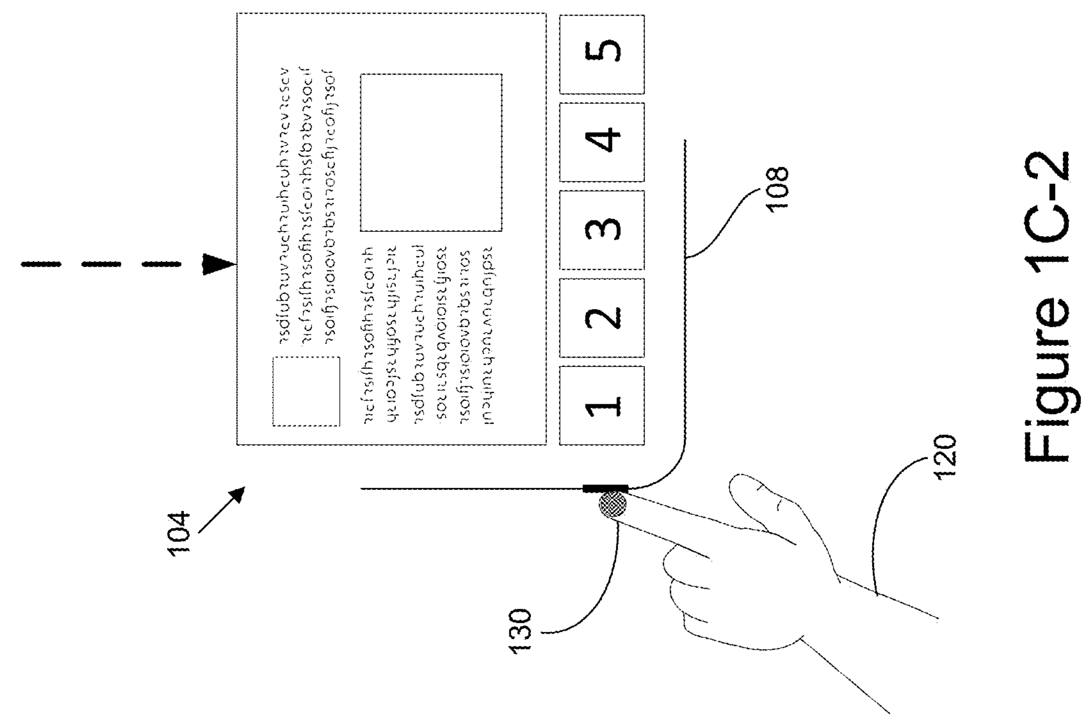
Figures 1, 1C:
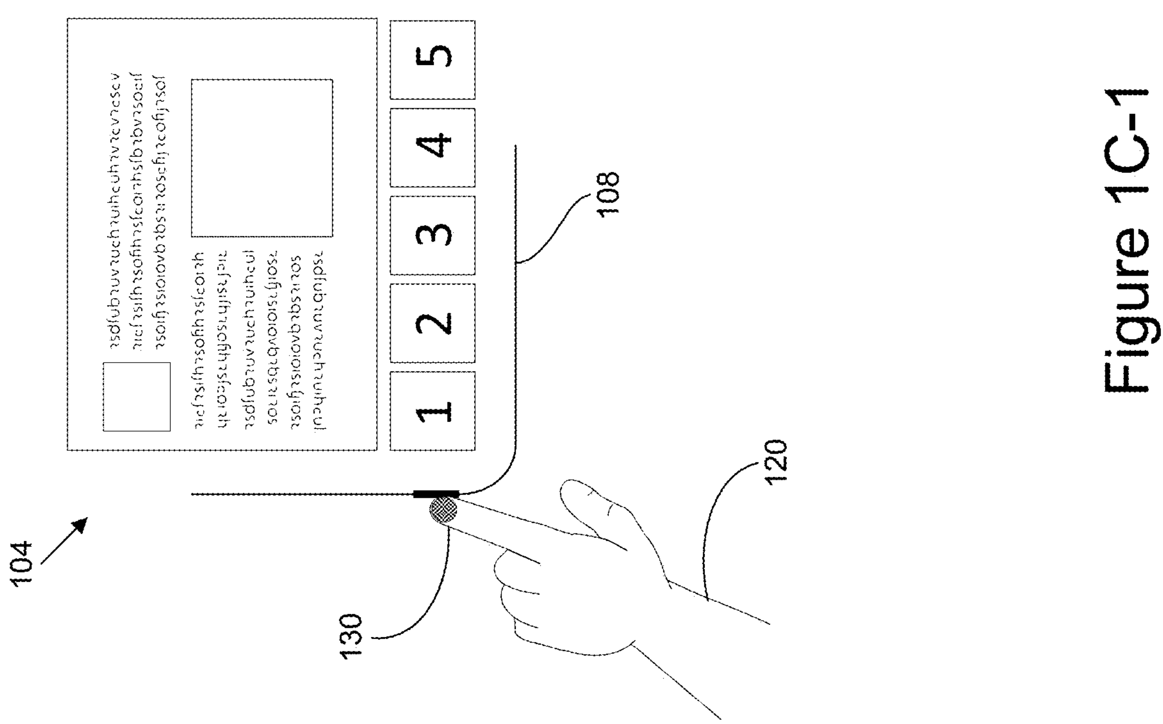

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

BRIEF DESCRIPTION OF THE APPENDICES OF U.S. PROVISIONAL APPLICATION NO. 63/484,190 AND APPENDICES OF U.S. PROVISIONAL APPLICATION NO. 63/484,467

As stated above, U.S. Provisional Application No. 63/484,190 and the U.S. Provisional Application No. 63/484,467 (hereinafter also referred to as the "provisionals") are hereby incorporated by reference, including their respective appendices.

Appendix A of the provisionals includes Figures A-E (which corresponds in part to FIGS. 2H to 2I of the present application) that show a representation of a user's hand that is able to indirectly interact with an artificial-reality user interface (one that can be viewed by a user wearing a virtual-reality headset or augmented-reality glasses) by using a teardrop-shaped interaction element and a focus selector that is positioned within the artificial-reality user interface based the direction and orientation of the teardrop-shaped interaction element (which itself is positioned based on orientation and position of the representation of the user's hand. Orientation and position determinations can be made using one or more cameras of the artificial-reality headset and computer-vision algorithms for processing of data from the one or more cameras. As shown, when digits of the representation of the user's hand are squeezed progressively closer together, then a visual appearance of both the teardrop-shaped interaction element and the corresponding focus select can be adjusted (in the depicted sequence of Figures A-E, both can be decreased in sized). Appendix A also includes Figures F-J showing a similar interaction sequence as Figures A-E, but also demonstrating that visual changes to the teardrop-shaped interaction element and the corresponding focus selector can be presented in alternative fashions, such as by changing colors and/or transparency levels as well. Appendix A further includes Figures K-O, which show that the teardrop-shaped interaction element and the corresponding focus selector can be used to allow indirect interact (e.g., indirect in the sense that the representation of the user's hand does not directly touch the selectable user interface elements, but is instead enabled to do so indirectly by way of the teardrop-shaped interaction element and corresponding focus selector) with selectable user interface elements within the artificial-reality user interface. Figures P-U, Figures V-Z, and Figures AA-AE respectively correspond to Figures A-E, F-J, and K-O, but rather than showing just a representation of the user's hand also show that the teardrop-shaped interaction element and corresponding focus selector can also be used while the representation of the user's hand is also holding a controller. Figures AF-AJ show a sequence in which the representation of the user's hand moves closer to the artificial-reality user interface and, as it does so, the teardrop-shaped interaction element and the corresponding focus selector change in appearance and eventually disappear entirely to then allow the representation of the user's hand to interact directly with the artificial-reality user interface. Figures AK-AO are similar to Figures AF-AJ, but instead show a interaction sequence in which the representation of the user's hand is initially holding a controller but then moves closer to the artificial-reality user interface and is eventually able to interact directly with the artificial-reality user interface.

Figure 5A:
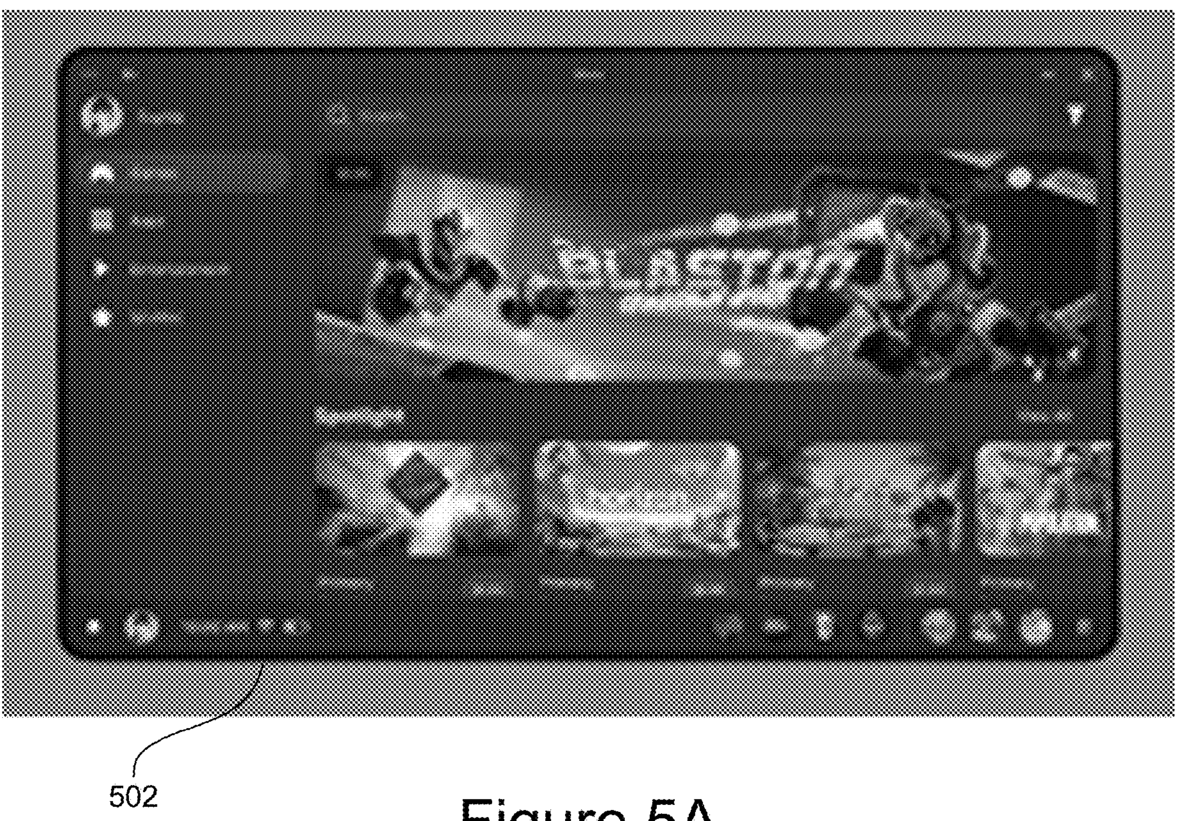
FIGS. 5A-5F show an example sequence of a user interacting with an artificial-reality panel user interface that is configured to be presented with a grab-handle user interface element and a visual aids for indicating proximity to a user interface element, in accordance with some embodiments.
Figure 5B:
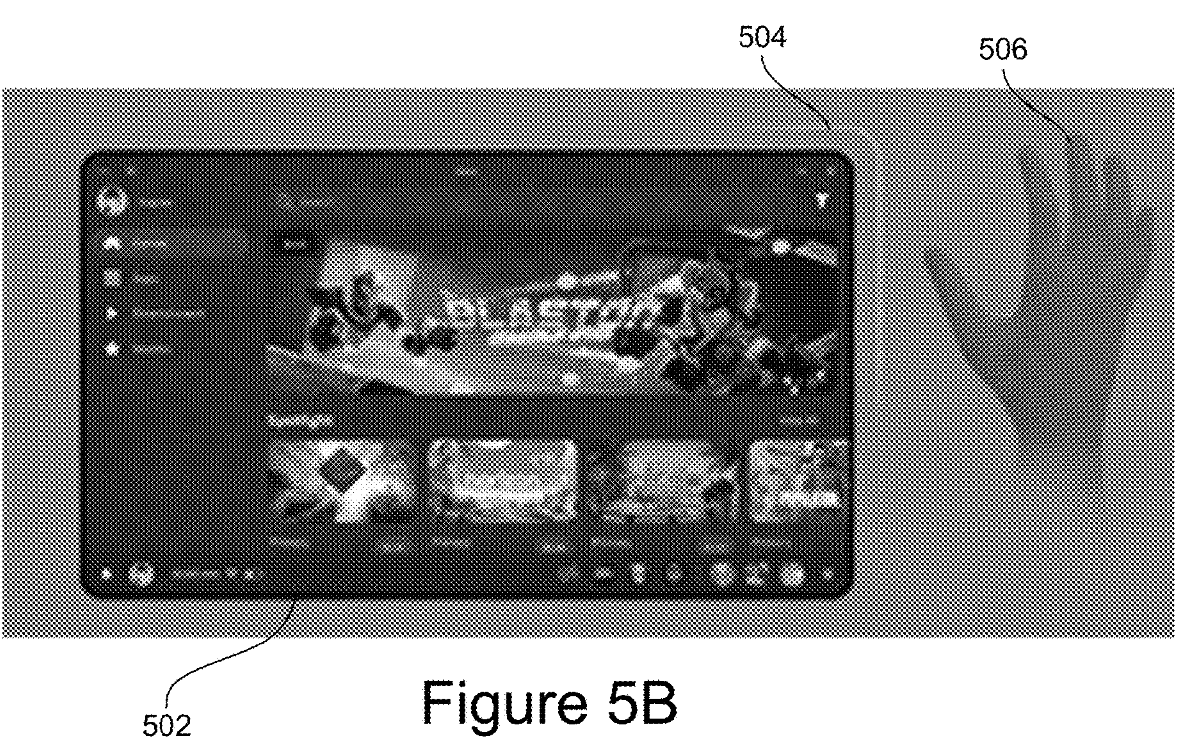
Figure 5C:
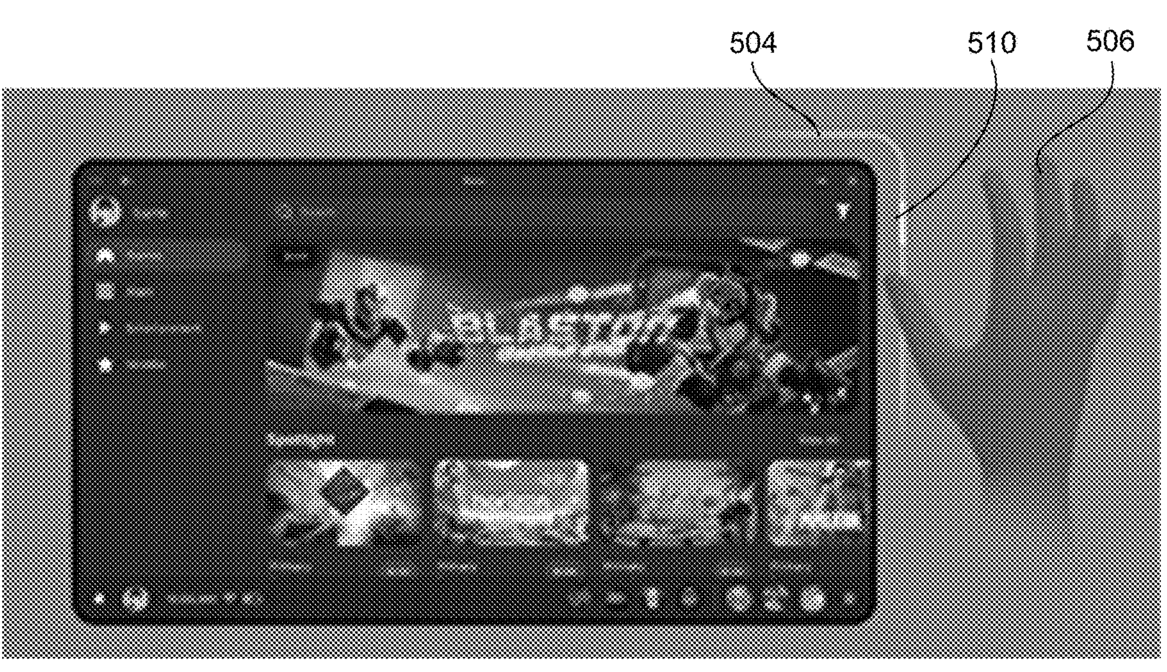
Figure 5D:
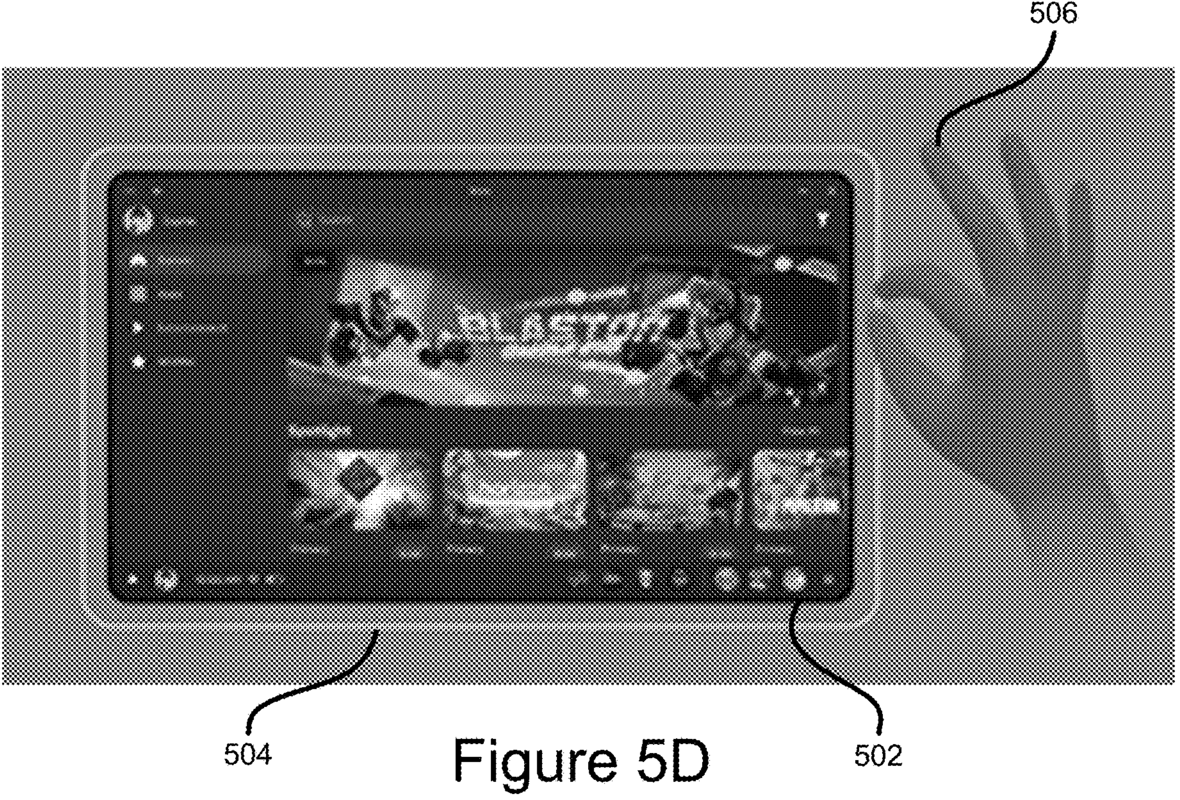
Figures 5E, 5F:
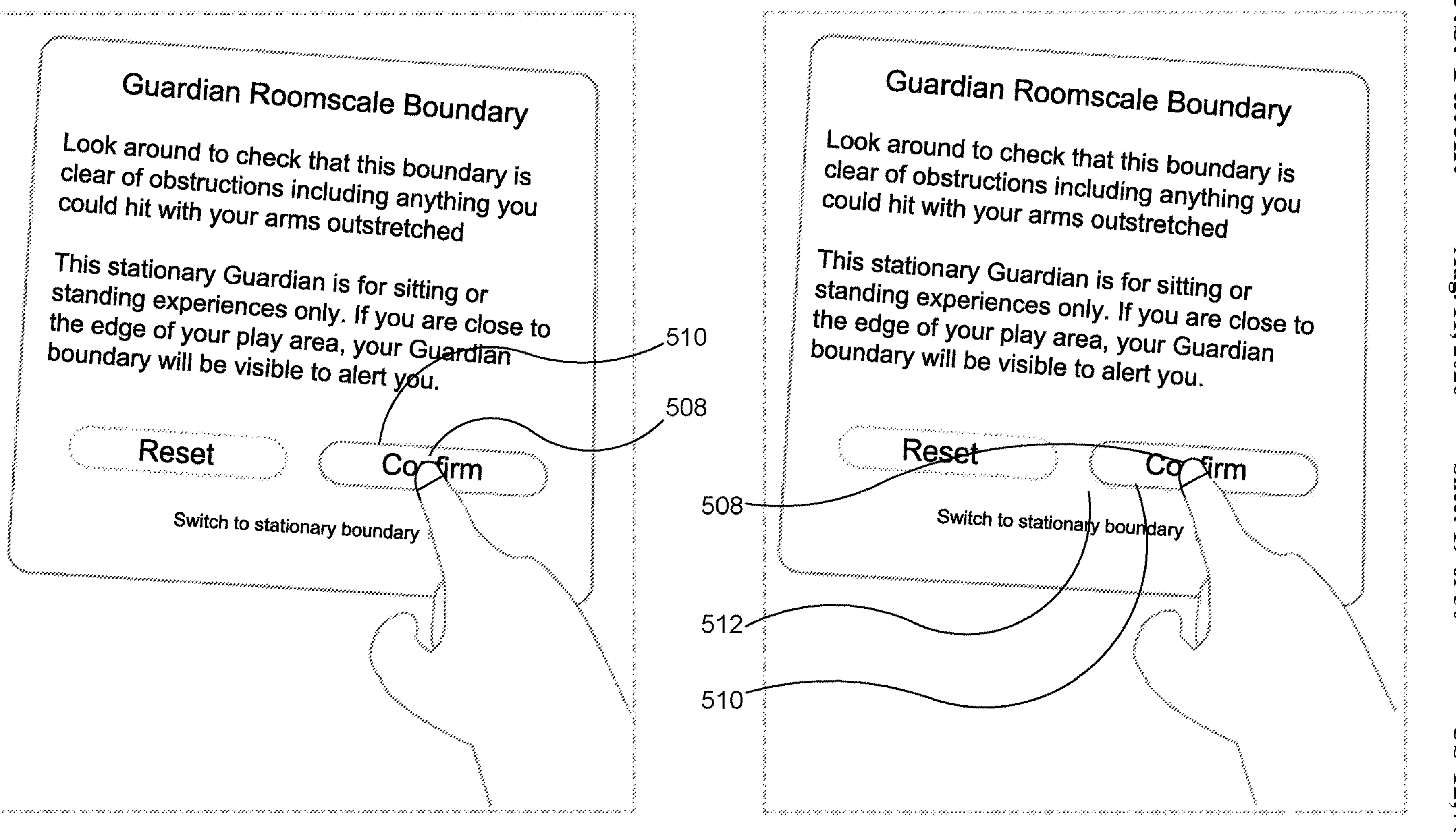

Appendix B of the provisionals includes sequences of figures (e.g., Figures F-J and K-R) that show how selectable user interface elements (e.g., a button that includes the text "Confirm") can be visually distinguished when a representation of the user's hand is interacting directly with one of the selectable user interface elements (which corresponds in part to FIGS. 5E to 5F of the present application). In the depicted sequences, the "Confirm" button is caused to have a glowing effect emanating from its edges to provide a clear visual cue to the user that the button can be interacted with directly by the representation of the user's hand, as if it did not do so in some embodiments, then user's might have difficulties understanding that they have the ability to directly interact with artificial-reality user interface elements.

Appendix C of the provisionals includes figures showing that the artificial-reality interfaces described herein can be presented in a variety of different display modes (e.g., a first display mode, which can be referred to as a tablet display mode, shown in Figure A; a second display mode, which can be referred to as a multi-desktop display mode, shown in Figure B; and a third display mode, which can be referred to as a portrait display mode, shown in Figure D. As illustrated, a system control bar that is at bottom of each of the figures can be modified depending on which display mode is currently being used, such that the system control bar (which can include both application-specific and system-level user interface elements) can have at least three different display modes as well. In conjunction with displaying the artificial-reality user interface using the second display mode (e.g., the multi-desktop display mode), the system control bar can be detached from a main user interface, such that the system control bar when it is used with main user interfaces having the first or third display modes, can be attached to those main user interfaces, but upon a change in the display mode to user the second display mode for a main user interface, then the system control bar can then be presented in a detached fashion (as shown in Figure B).

Appendix D of the provisionals illustrates that a user interface element (which can be referred to as a grab-hand element or grab-handle interaction element) can begin to appear once a representation of a user's hand moves within a direct-touch interaction distance of an artificial-reality user interface, e.g., as shown in Figure A, a grab-handle element appears outside a perimeter of the artificial-reality user interface because the representation of the user's hand is within the direct-touch interaction distance of the artificial-reality user interface. As shown in Figure B, the grab-hand element can also be grabbed directly (Figure B), which then causes the grab-handle element to expand in size and surround substantially all (e.g., greater than 90%) of the perimeter of the artificial-reality user interface, and movement of the representation of the user's hand then also causes a corresponding movement of the artificial-reality user interface such that it can be dragged around to different positions. In some embodiments, translation movements of the representation of the user's hand cause corresponding translation movements of the artificial-reality user interface, and rotational movements of the representation of the user's hand (or wrist) cause changes in tilt or orientation of the artificial-reality user interface. In this way, use of a grab-handle element can serve as a clear visual cue to enable a user to learn a new interaction scheme (directly interacting with virtual objects) and these techniques thus enable more efficient man-machine interfaces (users do not need to correct inadvertent control actions) and facilitate sustained user interfaces (by avoiding users being confused or uncertain about how to properly interact with virtual elements in a direct-control fashion). Figures C-G in Appendix D show other depictions of the representation of the user's hand moving while the representation of the user's hand is within the direct-touch interaction distance, and the grab-handle element can also follow that movement up until the representation of the user's hand grabs the grab-handle element, at which point the grab-handle element expands in size and surrounds substantially all of a perimeter of the artificial-reality interface (which gives the user a clear visual cue that they can now move the artificial-reality interface around and also adjust tilt and/or orientation of it). Figures H-I show a sequence in which the representation of the user's hand releases the grab-handle element and beings to move away from the artificial-reality interface, which causes the grab-handle element to no longer surround substantially all of the artificial-reality element (Figure I). Figures J-Q show the representation of the user's hand making positional and/or orientation/tilt adjustments to the artificial-reality interface. Figures X-AA show additional examples of how the grab-handle element appears, moves to follow the representation of the user's hand, and also substantially surrounds a perimeter of the artificial-reality interface once the grab-handle element is grabbed. Figures R-W (and AB-AE) further depict that, in some embodiments, the grab-handle element can also be used to facilitate indirect-control actions (ray-casted movement and/or orientation changes).

Appendix E of the provisionals includes figures illustrating that individual user interface elements within the system control bar can be directly interacted with by a representation of a user's hand, and that these direct-touch interactions can occur while artificial-reality interfaces are presented using one of three different display modes (which display modes were discussed above in conjunction with Appendix C).

Appendix F of the provisionals shows figures illustrating various elements that can be presented in direct-touch-capable artificial-reality user interfaces, including aspects of having multiple different display modes (e.g., Figures A-D and the different display modes shown therein, which were described above in conjunction with Appendix C). Appendix F also shows that the system control bar can have a variety of different display states, which are shown in Figures L-AM, and that a virtual keyboard can be presented for direct-touch interactions below user interfaces presented using the multi-desktop display mode (Figure J), and that an active call bar element can be presented below the system control bar to allow a user to see call status even while interacting with other artificial-reality user interfaces (e.g., Figure I, and various active call bar display options are shown in Figures AN-AR).

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality, as described herein, is any superimposed functionality and or sensory-detectable presentation provided by an artificial-reality system within a user's physical surroundings. Such artificial-realities (AR) can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker.

In some embodiments of an AR system, ambient light (e.g., a live feed of the surrounding environment that a user would normally see) can be passed through a display element of a respective head-wearable device presenting aspects of the AR system (e.g., a passthrough mode). In some embodiments, ambient light can be passed through respective aspect of the AR system. For example, a user interface element (e.g., a panel user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality. In some embodiments, artificial-reality content includes two-dimensional and/or three-dimensional virtual objects that are configured to be presented to users at a particular location in three-dimensional space. User interfaces are one form of artificial-reality content that are described herein. For example, a panel user interface element may include a two-dimensional display portion with a surround border that includes a perimeter. A first user interface element may surround substantially all of the perimeter of the panel user interface. And a second user interface element may be configured to be attached to the panel user interface while it is in a first display mode, and not attached to the panel user interface while it is in a second display mode. The second user interface element may include a system-level control and an application-level control.

Artificial-reality systems may provide users with one or more ways of interacting with artificial-reality content that is presented to the user. For example, users may be able to interact with artificial-reality content via direct virtual contact with artificial-reality content using representations of their hands as presented within artificial-reality headsets. Users may interact with the artificial-reality content using controllers (e.g., game controllers).

Users in some embodiments discussed below use a technique described herein as ray casting, using one or more of controller input control and hand input control to indirectly control artificial-reality elements by projecting a focus selector onto an artificial-reality interface based on a position of a representation of a user's hand (such that its position is projected towards the artificial-reality interface to cause a focus selector to appear that can then be controlled and moved to interact with individual elements in the interface). As described herein, ray casting is a method for indirectly controlling virtual objects being presented within an artificial-reality environment, where the user performs a hand gesture (e.g., an in-air hand gesture) that is directed to (e.g., pointing at) a particular location in three-dimensional space associated with a virtual object. In some embodiments, ray casting is not enabled by default, and users must perform a particular activation input to enable ray casting within the artificial-reality environment. In some embodiments, ray casting is automatically enabled while a user is using a mechanical controller. In some embodiments, users can enable ray casting by making a particular shape with their hand (e.g., a "C" shape). In some embodiments, ray casting is automatically disabled when an input control component (e.g., a controller, a hand of the user, etc.) is within a contact distance of artificial-reality content (e.g., a virtual object) that is being presented to the user.

As described herein, a grab-handle user interface element is an element that is on or in proximity to (e.g., within 2-10 pixels (e.g., volumetric pixels, or voxels) of) artificial-reality content (e.g., a virtual object) presented in an artificial reality environment, or on or in proximity to a perimeter of the artificial-reality content (e.g., within 2-10 pixels (e.g., volumetric pixels, or voxels) of the perimeter). The artificial-reality content may be a two-dimensional user interface element, such as a panel user-interface element (e.g., a virtual touchscreen displayed as a two-dimensional object, or a three-dimensional object presented in three-dimensional space). Users of the artificial-reality environment may interact with grab handles of artificial-reality content directly (e.g., via virtual contact with a location where the virtual object is being presented). Users may additionally or alternatively interact with grab handles of virtual objects using ray casting and/or mechanical controllers, in some embodiments.

In some embodiments, grab handles of virtual objects are configured to provide repositioning of a corresponding virtual object with six degrees of freedom with the artificial-reality environment. In some embodiments, grab handles of virtual objects are configured to allow users to resize artificial-reality content and/or portions thereof. In some embodiments, users can use grab handles (e.g., via indirect input control, such as a thumb stick of a mechanical controller) to adjust a position of artificial-reality content in three-dimensional space (e.g., along a coordinate plane that is normal to the user).

FIGS. 1A-1K show an example sequence of a user 101 interacting with a panel user interface 104 that is configured to be presented in conjunction with a grab-handle user interface element 108 (revealed in FIG. 1E), in accordance with some embodiments. The user 101 is wearing an artificial-reality headset 102 that is configured to present an artificial-reality environment.

In some embodiments, while the user 101 is interacting with the grab-handle user interface element 108, inputs directed to the user interface are ignored. In some embodiments, an indication is provided to the user 101 that such inputs are being ignored based on the user 101 interacting with the grab-handle user interface element 108. For example, visual aspects of the inputs of the user interface may be adjusted while the user 101 is interacting with the grab-handle user interface element 108. In some embodiments, the panel user interface 104 can be grabbed via an input (e.g., a grip button) of a handheld controller in electronic communication with the artificial-reality headset 102. In some embodiments, the visual representation of the hand of the user 101 is presented while the user is using the handheld controller. And when the user 101 performs the input at the handheld controller corresponding to grabbing the grab handle user interface 104, the representation of the hand of the user 101 simulates the grabbing motion of the user's physical hand. In some embodiments, the user 101 can use the grip button of the handheld controller even at locations that do not correspond to a grab handle, such as the grab handle user interface 104.

FIG. 1A shows the user 101 standing in a room in physical reality (on right side of FIG. 1A) while wearing the artificial-reality headset 102, which is presenting a panel user interface 104 (shown from the user's perspective view on left side of FIG. 1A) to the user 101 within an artificial-reality environment that is being presented to the user. The panel user interface 104 is being presented at a default presentation position 106 relative to the user 101. For example, in some embodiments, the panel user interface 104 is configured to initiate presentation at a position that offset by a distance of 0.25 to 0.75 meters from a hand of the user in a first direction (e.g., outward), and offset by a distance of 0.15 to 0.35 meters from the hand in a second direction. In some embodiments, the default presentation position 106 is a set of three-dimensional coordinates that are measured from a particular location associated with the user 101 (e.g., a centroid of the user's body). In some embodiments, at least one coordinate of the default presentation position 106 is determined based on data from a sensor of the artificial-reality headset 102 (e.g., an imaging sensor, an infrared sensor, etc.), and/or a sensor of another electronic device associated with the user.

The panel user interface 104 is displayed in FIG. 1A without any visual indication of the grab-handle user interface element 108. In some embodiments, the grab handle is not displayed while the user 101 is not interacting with the grab-handle user interface element 108, either directly or indirectly (e.g., via ray casting and/or controllers). In some embodiments, in accordance with initiating presentation of the panel user interface 104, the grab-handle user interface element 108, and/or a portion thereof is configured to flicker or otherwise provide an indication of locations of interactivity.

FIG. 1B shows the user 101 performing a hand gesture that includes a particular hand configuration (e.g., a hand of the user 101 is cupped in a "C" shape) that causes the hand of the user 101 to be within an approaching distance (e.g., within 10-20 pixels (e.g., volumetric pixels, or voxels)) of the grab-handle user interface element 108 of the panel user interface 104. In accordance with the hand movement, a first portion of the grab-handle user interface element 108 of the panel user interface 104 is illuminated by the artificial-reality headset 102. A representation 120 of the hand of the user is presented corresponding to a location where the hand of the user is located in three-dimensional space.

FIG. 1C-1 shows the user 101 performing another hand movement that causes a finger 130 of the user 101 to be within a grabbable threshold distance of the grab-handle user interface element 108. Based on the finger 130 of the user 101 being within a grabbable distance of the user 101, a portion 110 associated with the grab-handle user interface element 108 is presented to the user, indicating that the grab-handle user interface element 108 is available for user interactivity. A visual indication is also provided at the representation of the finger 130 that it is in a grabbable position with respect to the grab-handle user interface element 108.

FIG. 1C-2 shows the user 101 performing a movement with the finger 130 that is located in the grabbable position of the grab-handle user interface element 108. In some embodiments, the grab-handle user interface element 108 automatically becomes grabbed by the representation 120 of the hand of the user 101 based on it being in contact with the grab-handle user interface element 108 for a predefined hold duration. Based on the user performing the movement with the finger 130, the panel user interface 104 is caused to translate in three-dimensional space in a direction that corresponds to the movement of the representation 120 of the hand of the user.

FIGS. 1C-1 and 1C-2 provide examples of a representation of a user's finger being able to cause movement of artificial-reality interfaces, and, as explained below, this is one example as other examples include using a pinch between the user's thumb and index finger (or two other digits) to then enable interacting with grab handles for positional and/or orientation changes while the grab handle is active.

Figures 1D, 1E, 1F, 1G:
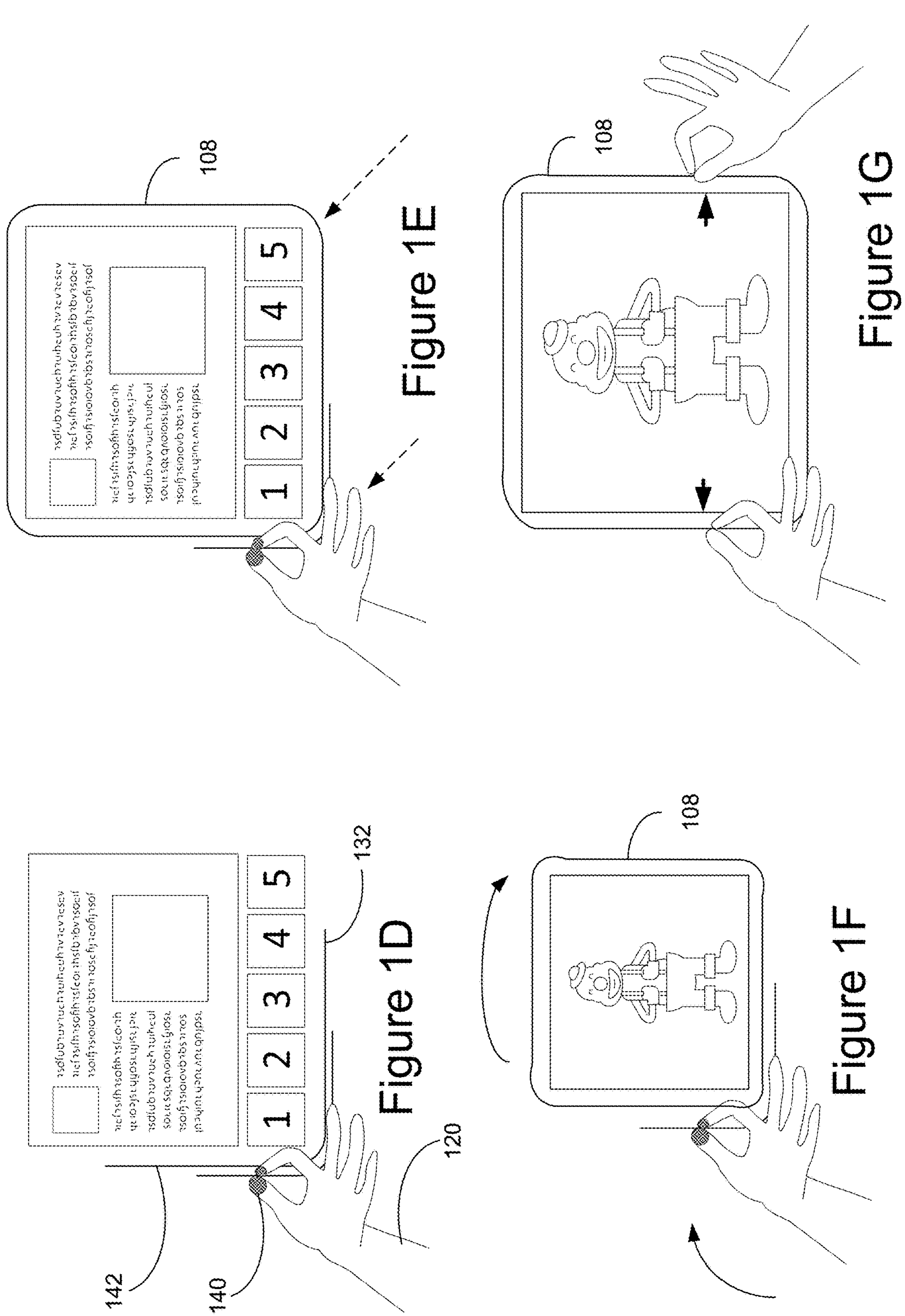

FIG. 1D shows the user 101 performing a pinch gesture 140 at a location where a grab handle affordance 142 is being presented. The grab handle affordance corresponds to a portion of the grab-handle user interface element 108. In some embodiments, an indication is provided at a portion of each finger of the user 101 that is in virtual contact with the grab handle affordance associated with the grab-handle user interface element 108.

FIG. 1E shows the user 101 performing a pinch gesture at a portion of the grab-handle user interface element 108, which causes the virtual object to be translated in three-dimensional space. In some embodiments, snapping locations are presented (either visually or non-visually) in conjunction with a virtual object, such that the virtual object is configured to snap to particular locations in three-dimensional space (which may be configured by the user, the operating system of artificial-reality environment, and/or an application specifically associated with the virtual object). In some embodiments, while the user 101 is moving the grab-handle user interface element 108, the panel user interface 104 is adjusted to face towards a center of the face of the user 101. That is, the orientation of the panel user interface 104 is continuously re-positioned as it moved by the representation of the hand of the user 101 towards the center of the head of the user 101. In some embodiments, the user interface is re-spawned in a same orientation within three-dimensional space as it had previously been in before the user interface was translated via the grab handle user interface. In some embodiments, previous aspects of the user interface 104 orientation, including geometric properties such as pitch, size, position relative to head, should be ignored if they result in spawning the user interface in conflict with other geometry in the environment, avatars (e.g., a physical wall that was not located at the previous position of the user interface 104, an avatar corresponding to the a different user that was not visible within the three-dimensional space when the user 101 began interacting with the grab-handle user interface element 104). In some embodiments, a higher weighting is applied to retaining the original orientation based on the panel user interface 104 having a particular orientation (e.g., snapped to a particular snap point) before being interacted with by the user 101 moving the grab-handle user interface element 104. During a grab-and-move gesture, the user 101 can, in some embodiments, set their preferred distance from their head, height relative to their head, and tilt angle (pitch) and tablet scale.

If a system user interface (e.g., a user interface window in an artificial-reality environment that allows for controller system-level functions) or other artificial-reality user interface is summoned using an affordance on the hand (quick menu or wrist button, which can be activated by the user looking down at their wrist or hand for a predefined period of time, such as 1-2 seconds, or a shorter time period such as 5-10 ms). In some embodiments, a fallback position for the summoned system user interface can be in front of the representation of the user's hand that has the affordance on it. Thus, in some embodiments, the system user interface (which can be presented in a table display mode, which is discussed elsewhere herein) can be summoned within reachable range (e.g., within 30-90 pixels (e.g., volumetric pixels, or voxels) of the representation of the user's hand) without tracking anything about previous position of the system user interface or the user's preferences. If the system user interface is dismissed and summoned within a predefined refresh duration. In some embodiments, when a system (or other) user interface is hidden and then shown again, it can be configured to appear at a preferred distance, or may be configured by the user 101 to appear at a certain position based on desired height, tilt (pitch) and scale from the last time they repositioned that particular user interface, or may be positioned directly in front of the representation of the user's hand (along their forward vector from their current head position in the plane parallel to the ground).

FIG. 1F shows the user 101 performing a rotation of the panel user interface 104, which causes the panel user interface 104 to adjust a displayed user interface element.

In some embodiments, users' interactions with user interface elements cause the user interface elements to perform non-movement-based operations within the artificial-reality environment, such as the resize interaction shown in FIG. 1G.

FIG. 1K shows the user 101 performing a pinch gesture at a corner of the grab-handle user interface element 108, which causes the panel user interface 104 to be resized. In some embodiments, artificial-reality content can be scaled between respective minimum and maximum dimensions. In some embodiments, artificial-reality content can be reshaped (e.g., having different respective dimensions based on resizing a particular dimension of the artificial-reality content). In some embodiments, different locations along the grab-handle user interface element 108 correspond to different adjustments to the artificial-reality content. For example, the grab handle may have a manual pitch adjustment edge (e.g., a top edge) such that the user can adjust a display angle of a virtual object or other artificial-reality content by interacting with the manual pitch adjustment edge. In some embodiments, while the user is reaching the manual pitch adjustment edge, the grab-handle user interface element 108 provides an indication (e.g., a visual indication) that the manual pitch adjustment edge of the grab handle provides distinct functionality from other portions of the grab-handle user interface element 108.

FIG. 1G shows the user 101 performing a two-handed grab gesture of the grab-handle user interface element 108, which causes resizing of the panel user interface 104. In some embodiments, a user can grab a panel with two hands (e.g., one on each grab handle) to resize (e.g., virtually stretch) the virtual object. When grabbing with two hands simultaneously, instead of just passing a respective user interface (which can be in a tablet display mode) from hand to hand, some embodiments support the respective user interface being held, positioned, and scaled by both hands. In some embodiments, using two hands to interact with the grab-handle user interface element 108 enables precision in one or more additional axes/degrees-of-freedom, allowing the user to provide additional input control to the panel user interface 104. In some embodiments, based on a second hand of the user 101 intersecting with an intersection of the grab-handle user interface element 108, the first hand can automatically release the grab handle.

FIG. 1H shows the user 101 releasing the hand that was grabbing the grab-handle user interface element 108. In accordance with the user 101 releasing the grab-handle user interface element 108, the grab-handle user interface element 108 gradually ceases to be visually indicated as the representation of the user's hands moves further away from the user interface, and portions 182 and 184 can be separately displayed, indicating that the user is no longer actively interacting with the grab-handle user interface element 108.

FIG. 1I shows a different hand of the user 101 grabbing a different portion of the grab-handle user interface element 108 after releasing the grab-handle user interface element 108 as shown in FIG. 1H. In some embodiments, the user can place a panel from one of the user's hands into the other of the user's hands via the grab handle.

FIG. 1J shows the user 101 releasing the grab-handle user interface element 108 after performing a tilt gesture at the grab-handle user interface element 108. Based on the user 101 performing the tilt gesture, a manual tilt operation is performed that causes the panel user interface 104 to rotate within three-dimensional space. In some embodiments, tilt changes can be performed by rotationally adjusting a user's hand while the grab handle is held, as compared to translationally moving the user's hand while the grab handle is held, which can cause positional changes to where the user interface is being presented while the grab handle is held.

FIG. 1K shows the user 101 interacting with a corner of the grab-handle user interface element 108, which causes the panel user interface 104 to resize. As the panel user interface resizes, the grab-handle user interface element 108 also resizes such that the grab-handle user interface element 108 continues to surround the panel user interface 104.

FIGS. 2A-2G show an example sequence of a user interacting with artificial-reality content using a plurality of distinct input-control modes based a distance of a hand of the user from a user interface (e.g., as the representation of the user's hand moves between direct-touch and indirect-control distances from user interfaces), in accordance with some embodiments. Specifically, the sequence shows the user 101 interacting with the panel user interface element 104 by using ray casting, as described above, and transitioning to using direct touch with a simulated location of the panel user interface 104. In some embodiments, the user can interact with a panel while it is far away (e.g., remotely accessing one or more grab handles of distant virtual object). In some embodiments, when a user is moving an artificial-reality user interface farther away from themselves, content within the artificial-reality user interface can be scaled up or down to ensure that the content remains legible and easy enough to interact with using a cursor from a distance. Appendix A shows additional examples of a user performing indirect-control interactions and direct-touch interactions sequentially while the user is interacting with a user interface.

FIG. 2A shows the user 101 wearing the artificially-reality headset 102 shown in FIGS. 1A-1K. The hand of the user 101 is interacting with the panel user interface 104 from a distance 202 that is within an indirect-control threshold distance of the panel user interface 104. A focus selector 204 is projected onto a location of the panel user interface 104 based on a position of a representation 206 of a hand of the user, which corresponds to a location and an orientation of the hand of the user 101. An arrow indicator 208 (which can be the tear-drop shaped element described above in the brief description of the appendices section) is presented in conjunction with the user 101 performing ray casting.

Figure 2C:
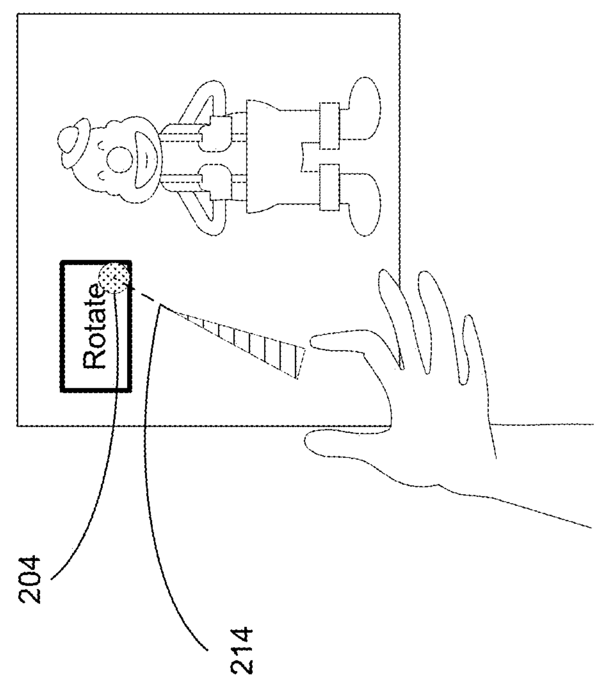
Figure 2B:
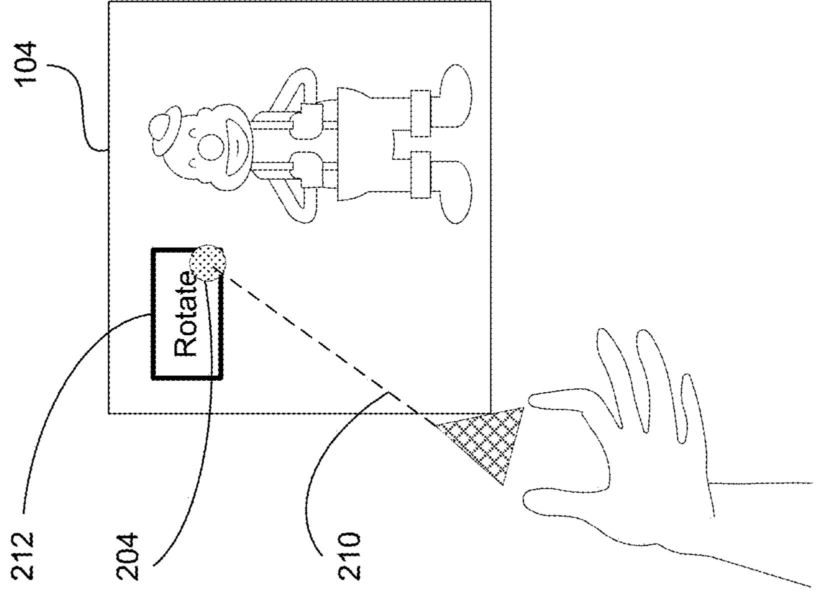

FIG. 2B shows the user 101 interacting with the panel user interface 104 from a second distance 210 that is within the indirect-control threshold distance of the panel user interface 104 and closer than the distance 202. The focus selector 204 is at a second location within the panel user interface within a selectable user interface element 212 that is configured to cause an operation upon release of a selection of the selectable user interface element 212. Based on the second distance 210 being less than the distance 202, the arrow indicator 208 is presented with a different visual characteristic than in FIG. 2A. Further based on the second distance 210 being less than the distance 202, the focus selector 204 is shown with a smaller radius (as one example of a distinguishing characteristic), distinct from the radius of the focus selector as presented in FIG. 2A. A visually-perceptible adjustment is also caused to the selectable user interface element 212 based on the focus selector 204 being projected within the area of the selectable user interface element 212. Appendix B includes additional examples of visually-perceptible effects caused by the user performing direct-touch and/or ray casting gestures directed to selectable user interface elements (e.g., the selectable user interface element 212). In some embodiments, the selectable user interface element can become backlit (e.g., emanating an illuminated indicator behind the selectable user interface element), and the illumination of the indication can be adjusted based on a press intensity (e.g., a depth of the direct-contact gesture into the user interface element) and/or a press duration.

FIG. 2C shows the user 101 interacting with the panel user interface 104 from a third distance 214 that is within the indirect-control threshold distance of the panel user interface 104 and closer than the distance 202 and the second distance 210. Based on the third distance 214 being closer, the arrow indicator 208 is presented with another different visual characteristic than in FIGS. 2A and 2B. And the radius of the focus selector 204 is smaller than the radius of the focus selector 204 as presented in FIGS. 2A and 2B.

FIG. 2D shows the user 101 interacting with the panel user interface 104 from a fourth distance 216 that is closer than the first distance 202, the second distance 210, and the third distance 214. Based on the fourth distance 216 being within a direct-touch threshold distance of the panel user interface 104, the arrow indicator 206. In some embodiments, the focus selector 204 also ceases to be displayed while the hand of the user is within the direct-touch threshold distance of the panel user interface 104.

FIG. 2E shows the user 101 performing a direct-touch contact at the panel user interface 104 within the selectable user interface element 212. Based on the user 101 performing the direct-touch contact at the selectable user interface element 212, a visual aspect of the selectable user interface element 212 is adjusted to indicate that the selectable user interface element 212 is being selected by a direct-touch interaction.

FIG. 2F shows the user 101 bringing their hand away from the panel user interface such that the hand of the user is at the third distance from the panel user interface 104. In some embodiments, as the user 101 brings their hand away from the panel user interface, the gesture is continued even though the input control mode switches to a ray casting mode based on the representation 206 of the hand of the user 101 being within an indirect-control threshold distance of the panel user interface. That is, the selectable user interface element 212 remains selected, even though the representation 206 of the hand of the user 101 is no longer in direct contact with the panel user interface 104.

FIG. 2G shows the user 101 while their hand is the third distance 210 from the panel user interface 104 and the focus selector 207 has moved to a different location outside of the selectable user interface element 212. Based on the release of the selectable user interface element 212, the content within the display component of the panel user interface 104 is caused to rotate within the panel user interface 104.

Figure 2I:
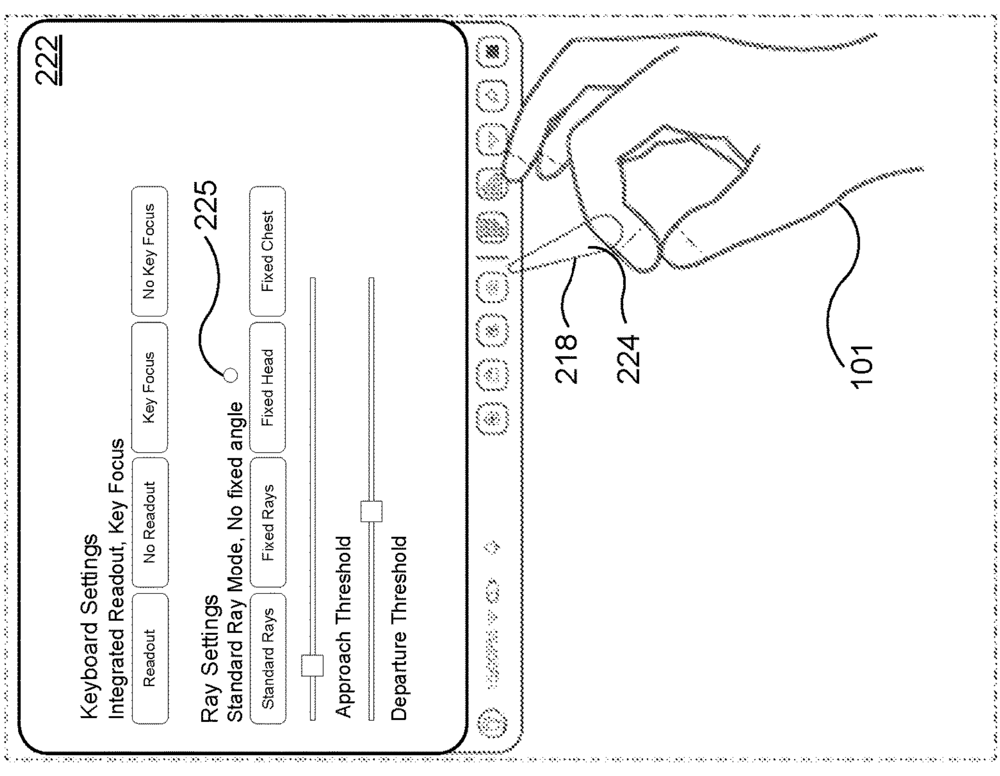
Figure 2H:
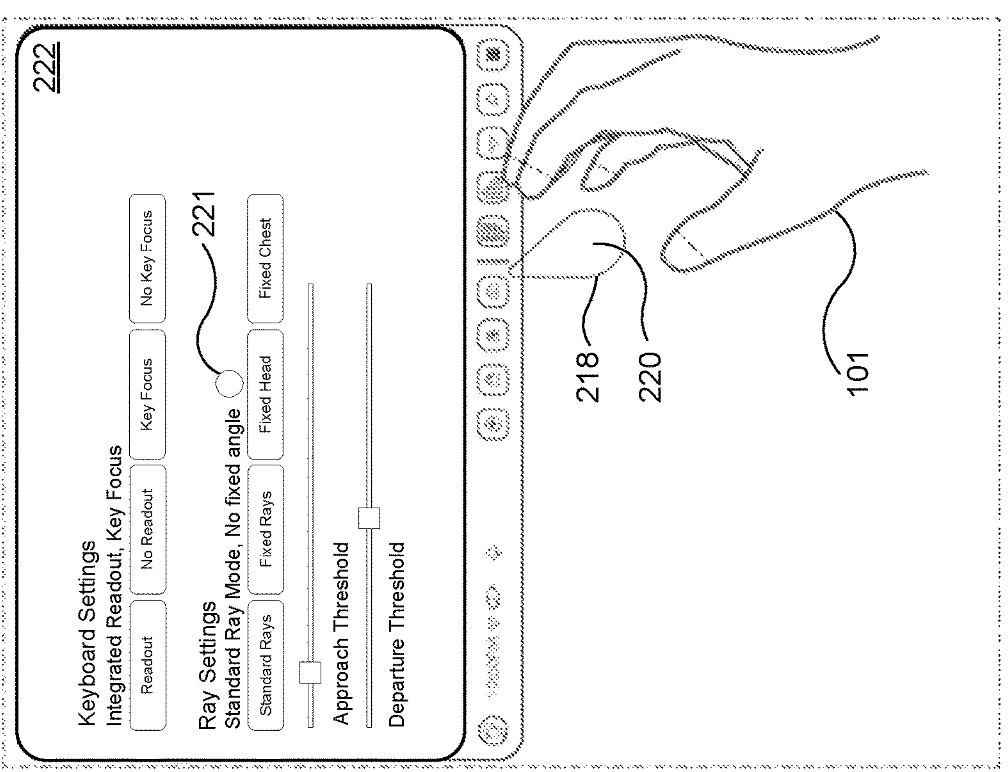

FIG. 2H shows the user 101 while their hand has a first orientation (e.g., a thumb of a user and a finger of the user not in contact with each other) the tear drop user interface element 218 has a first appearance 220, which corresponds to the focus selector 221 having a larger size (e.g., larger in size such that the focus selector is not precisely over one single user interface element, and aids the user in determining the location of the focus selector) in the user interface 222. In some embodiments, the first appearance is a tear drop shaped selector having a first width.

FIG. 2I shows the user 101 while their hand has a second orientation (e.g., a thumb of a user and a finger of a user in contact with each other) the tear drop user interface element 218 has a second appearance 224 (e.g., narrower in size such that the focus selector 225 is precisely over one single user interface element) in the user interface 222. In some embodiments, the second appearance is a tear drop shape having a second width greater than the first width. In some embodiments, as the thumb and finger move closer together, both the focus selector 225 shrinks and the tear drop user interface element 218 narrows. In some embodiments, when the finger and thumb contact each other, whichever user interface element is beneath the focus selector will be selected. As such, it is beneficial to have a smaller tear drop shape and a smeller focus selector so the user can visually understand what is being selected. Alternatively, it is beneficial to have a large focus selector when not selecting a user interface element, so the user can quickly identify the location of the focus selector within the user interface.

Figure 3B:
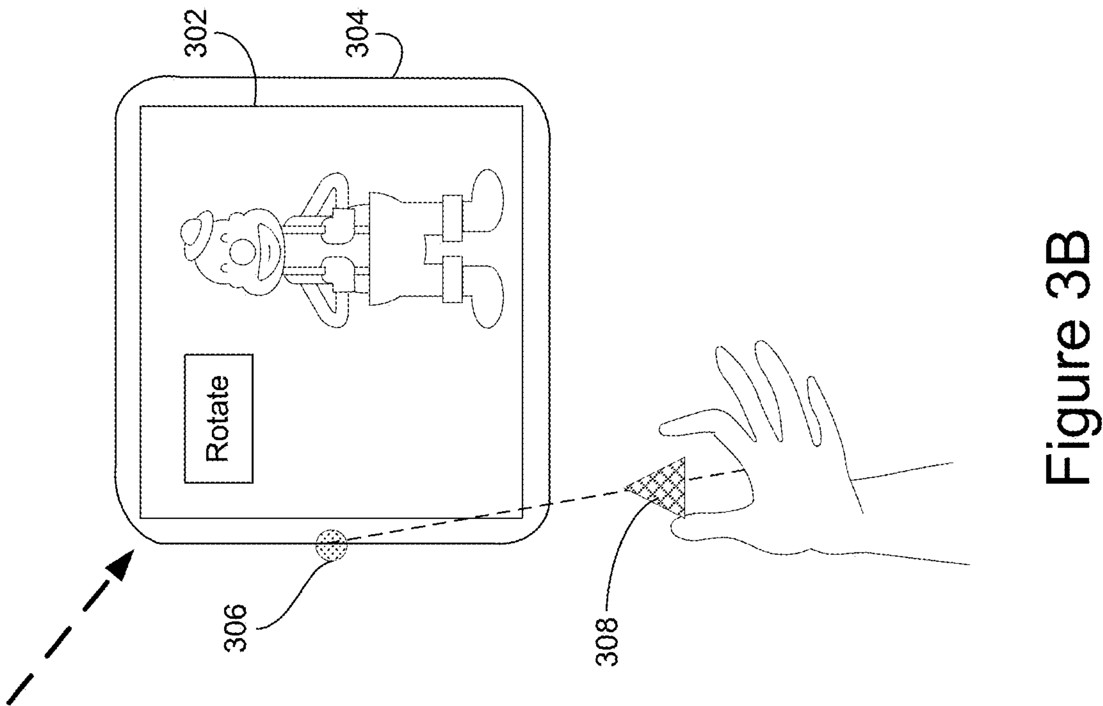
FIGS. 3A-3B show an example sequence of a user interacting with an artificial-reality user interface configured to be presented with a grab-handle user interface element while a representation of the user's hand is indirectly interacting with the grab-handle user interface, in accordance with some embodiments.
Figure 3A:
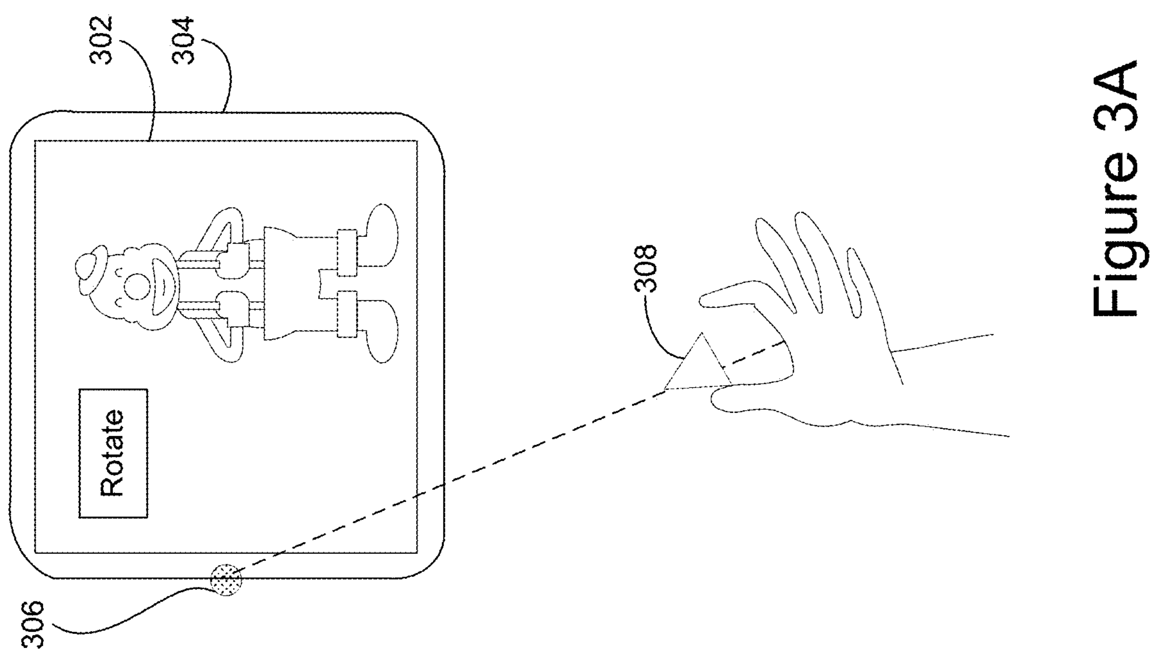

FIGS. 3A-3B show an example sequence of a user interacting with a panel user interface 302 that includes a grab-handle user interface element 304 that is substantially surrounding the panel user interface 302, in accordance with some embodiments.

FIG. 3A shows the user 101 ray casting a focus selector 306 onto a grabbable portion of the grab-handle user interface element 304. The grab-handle user interface element 304 is presented such that it substantially surrounds the panel user interface 302, in accordance with the user 101 interacting with the grab-handle user interface element 304 via the focus selector 306 being projected by the ray casting gesture being performed by the user.

FIG. 3B shows causing the panel user interface 302 to translate in three-dimensional space based on the user adjusting a projected location of the focus selector 306. Based on the user 101 performing the ray casting gesture to move the panel user interface 302, the directional arrow indicator 308 is presented with an adjusted physical appearance. In some embodiments, based on the user performing the operation associated with the grab-handle user interface element 304, a simulated grabbing hand representation is presented at the location of the focus selector 306, to indicate that the user is performing a grab handle operation.

FIGS. 4A-4D show examples of a user interface (e.g., a panel user interface 402) that is configured to be presented in a plurality of different display modes within an artificial-reality environment, in accordance with some embodiments. Additional examples of user interfaces that are configured perform the operations described with respect to FIGS. 4A-4D are described above in reference to the figures of Appendices C and E. Appendix F shows additional examples of user interfaces that have a plurality of distinct display modes, including examples of individual elements (e.g., system bar user interface elements) that can be presented in conjunction with the respective user interfaces.

Figure 4A:
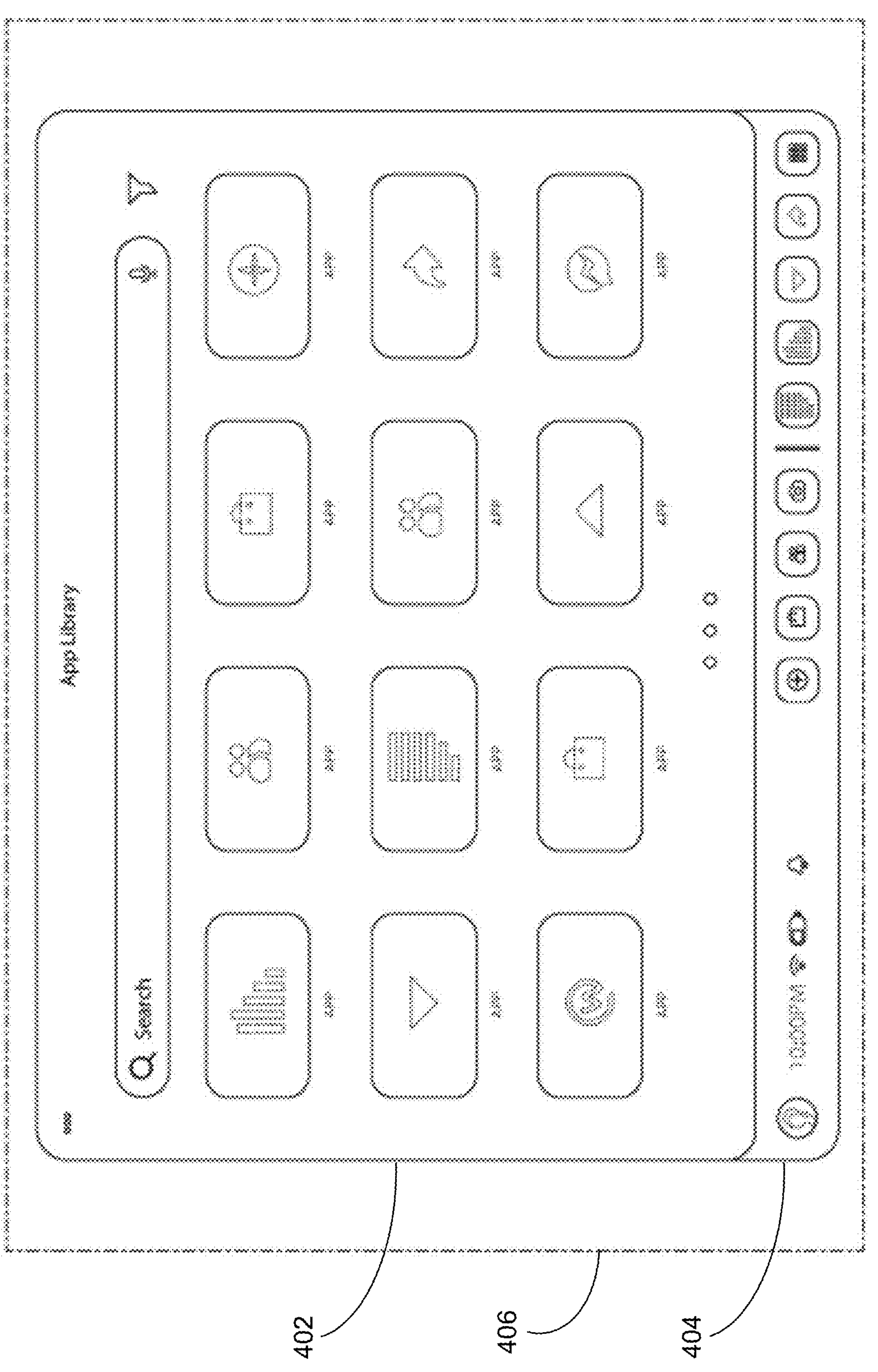
FIGS. 4A-4E show examples of artificial-reality user interfaces configured to be presented in a plurality of different display modes within an artificial-reality environment, in accordance with some embodiments.

FIG. 4A shows artificial-reality content that is configured to be presented within an artificial-reality environment. The artificial-reality content includes a panel user interface 402. In some embodiments, panel user interface elements, such as the panel user interface 402 are presented as having a three-dimensional depth. In some embodiments, grab handles associated with the panel user interface element can be presented at different locations along the three-dimensional depth of the panel user interface 402. In some embodiments, a virtual button user interface element presented on a user's wrist (which can be activated based on the user looking down at their wrist for a predefined period of time such as 1-2 seconds, or a shorter period of time such as 5-10 ms) can be used to activate the tablet virtual object which can then appear as if it is sitting above the user's wrist within the artificial-reality environment.

FIG. 4A illustrates the panel user interface 402 being displayed in a first display mode (e.g., a tablet display mode) during a first period of time within the artificial-reality environment. While the panel user interface 402 is being presented in the first display mode, a system bar user interface element 404 is presented such that it is in contact with the panel user interface 402. A grab-handle user interface element 406 is presented such that it is substantially surrounding a perimeter of the panel user interface 402.

Figure 4B:
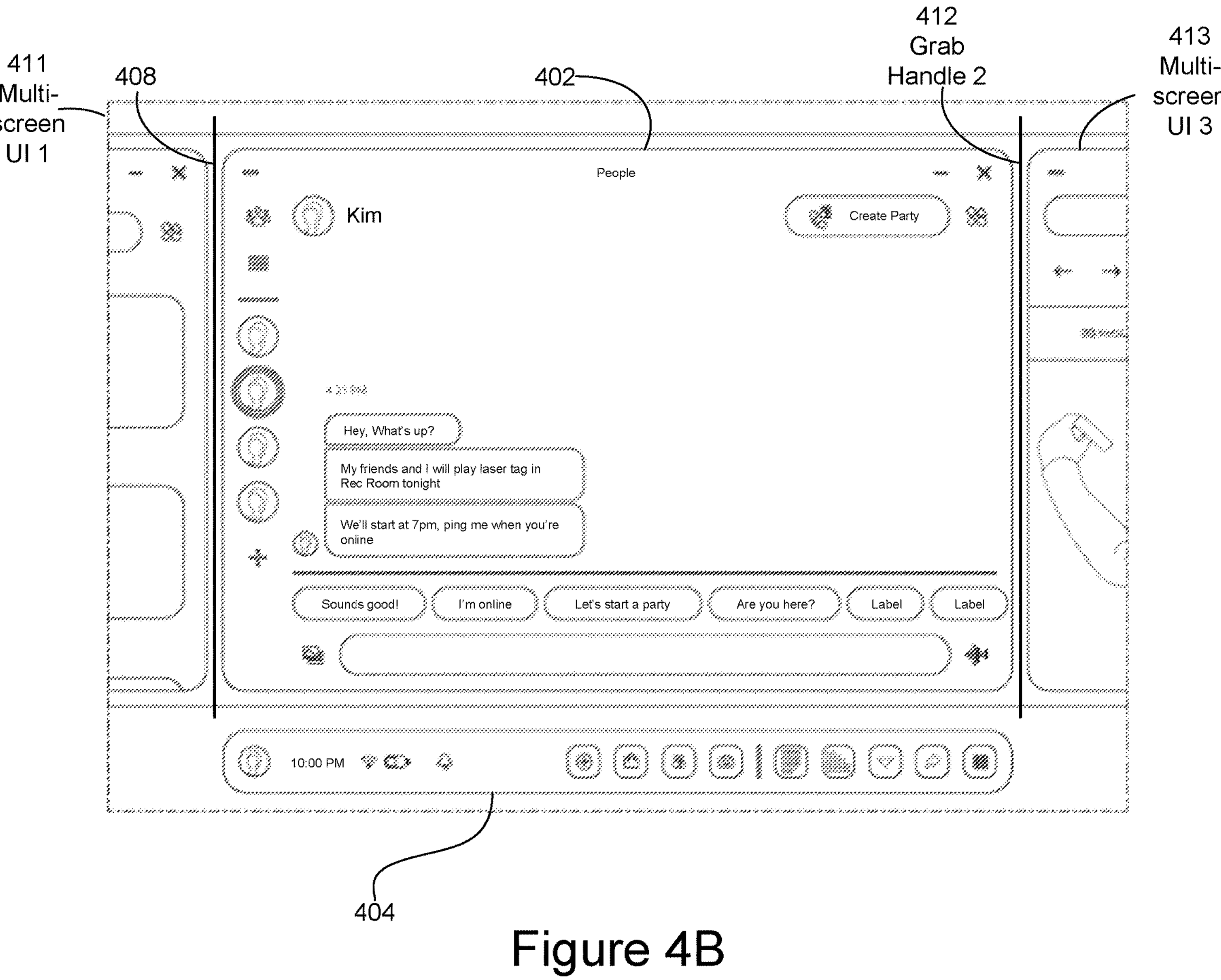

FIG. 4B illustrates the panel user interface 402 being displayed in a second display mode (e.g., a multi-desktop display mode with multiple artificial-reality windows 411, 402, and 413 next to one another) during a second period of time within the artificial-reality environment. While the panel user interface 402 is being presented in the second display mode, the panel user interface 402 is presented such that it is not in contact with the system bar user interface element 404 that includes system-level control and the application-specific control. In other words, once a user chooses to transition from viewing artificial-reality content in the first display mode to viewing content in the second display mode, the system bar 404 can detach from the content (as is shown in the sequence of FIGS. 4A-4B). The panel user interface 402 is presented in a multi-screen display mode, wherein a plurality of individual panel user interface elements is presented sequentially. In some embodiments, multiple grab handles can be activated, one for each of the respective windows within the multi-desktop view, including grab handle 408 associated with movement or rotation or window 411 and grab handle 412 associated with movement and rotation of window 402. In other embodiments, one grab handle can be provided to move all of the windows in a simultaneous fashion.

Figure 4C:
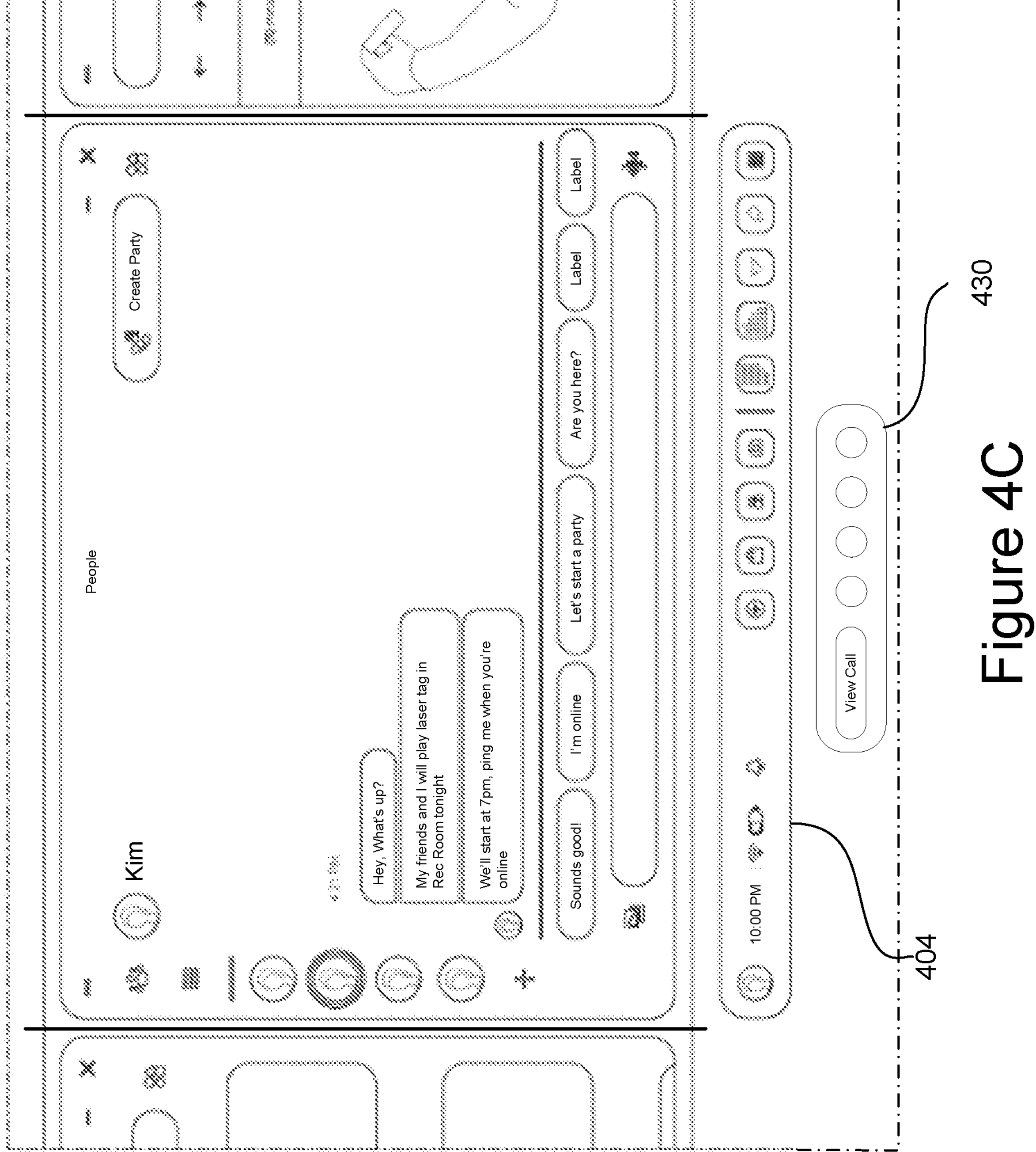

FIG. 4C illustrates the panel user interface 402 while the user is receiving a phone call from another user of a different electronic device. An active call user interface 430 is presented below the detached system bar user interface element 404, in accordance with the user receiving a call from another user of a different electronic device. In some embodiments, an active application bar, such as the active call user interface 430 is presented with similar visual characteristics as the visual characteristics of the system bar user interface element 404.

Figure 4D:
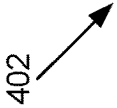

FIG. 4D illustrates the panel user interface 402 while a keyboard user interface element 440 is being presented below the panel user interface. The panel user interface 402 is being presented in a multi-screen display mode. The keyboard user interface element 440 is configured to be co-located based on the location of the panel user interface 402. That is, in some embodiments, the keyboard user interface element cannot be re-located independently of the panel user interface 402. If the panel user interface 402 is attached to the keyboard user interface element 440 while the keyboard user interface element 440 is attached to the panel user interface 402, in accordance with some embodiments. In some embodiments, once the keyboard user interface element 440 becomes unattached, the panel user interface 402 can move independently. The user can snap the keyboard user interface element 440 back to the panel user interface 402. In some embodiments, while the keyboard user interface element 440 is detached from the panel user interface 402, it can be rotated with six degrees of freedom. In some embodiments, when the keyboard user interface element 440 is placed in a location where another user interface element is located (e.g., a panel user interface), the user interface element being directly re-positioned is caused to move away from the location.

As shown in Appendix E, the user can perform a direct-touch contact that is directed to an individual selectable key user interface element of the keyboard user interface element 440. In some embodiments, when the representation of the hand, and/or a portion thereof is displayed such that it obscures other selectable user interface elements and/or descriptive user interface elements, the representation of the hand can be presented as partially translucent, such that the user can see the user interface elements that are behind the representation of the hand of the user. In some embodiments, the user can use ray casting to interact with the individual selectable key elements of the keyboard user interface element 440.

Figure 4E:
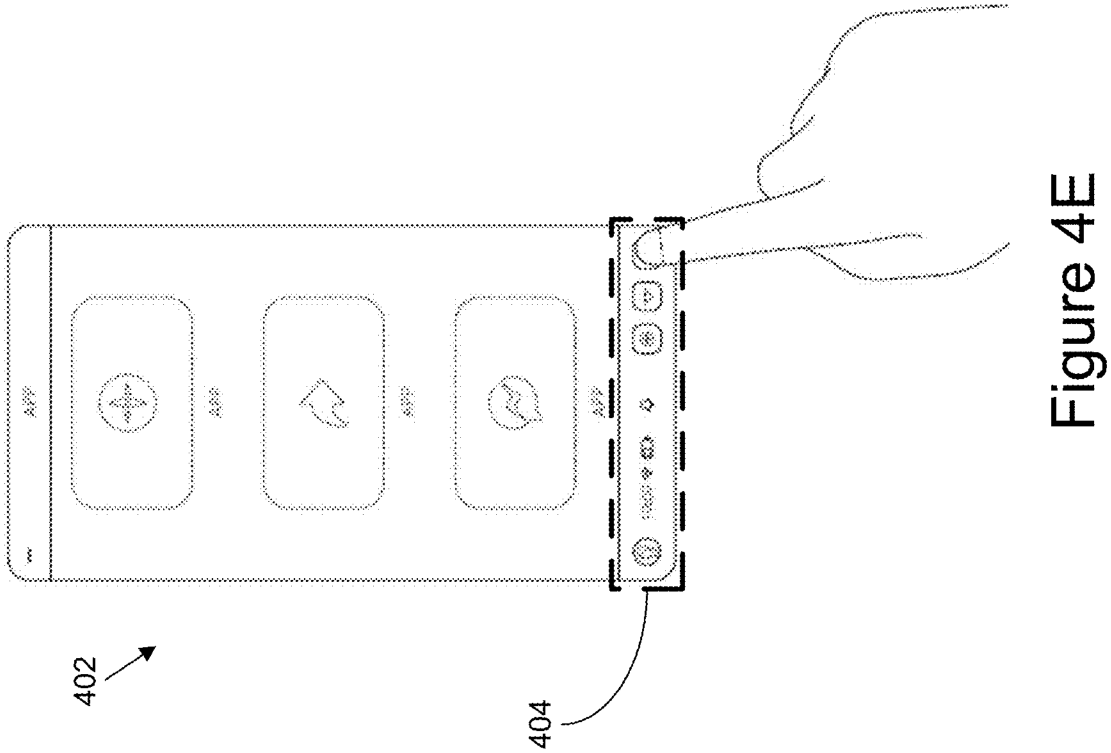

FIG. 4E illustrates the panel user interface in a portrait display mode. The portrait display mode is a sub-mode of the first display mode, such that the system bar user interface element 404 is configured to be in contact with the panel user interface 402. In some embodiments, the panel user interface may be configured to be presented in the portrait display sub-mode of the first display mode based on a user's interaction with a grab-handle user interface element corresponding to the panel user interface 402. As shown, content within the system bar 404 also changes (relative to content within the system bar 404 when the first or second display modes are utilized) when the portrait display mode (a third display mode) is activated.

FIGS. 5A-5D show an example sequence of a user interacting with the panel user interface 502, which can include some or all of the features of the panel user interface 402 discussed with respect to FIGS. 4A-4D. The panel user interface 502 is configured to present a grab-handle user interface element 504 in accordance with particular user interactions with the panel user interface 502. In the example shown in FIGS. 5A-5D, the grab-handle user interface element has four presentation states. Additional examples of user interactions with user interfaces that have corresponding grab-handle user interface elements, and the corresponding visual indications caused at the grab-handle user interface elements are described in more detail with respect to Appendix D. For example, Appendix D illustrates examples of adjusting an orientation of the panel user interface 502 in three-dimensional space. Appendix D also includes examples, such as Figures O and P, that show a region between the grab-handle user interface element and the user interface having a glossy texture (e.g., similar to a glass display case). In some embodiments, the grab-handle user interface element and/or a transitional zone between the grab-handle user interface element and the user interface are caused to have visually perceptible aspect that corresponds to a visual aspect of the display. That is, the grab-handle user interface element can be configured to visually integrate with the content of the user interface, while the grab handle user interface is being displayed.

FIG. 5A shows the panel user interface 502 being presented to the user 101 while the grab-handle user interface element 504 is in a first presentation state. In the first presentation state, which corresponds to a representation 506 of a hand of a user not interacting with the grab-handle user interface element 504 and not being within a direct-interaction distance and/or a grabbable distance of the grab-handle user interface element 504.

FIG. 5B shows the panel user interface 502 being presented to the user 101 while the grab-handle user interface element 504 is in a second presentation state. In the second presentation state, which corresponds to the representation of the hand of the user being within a direct touch interaction distance (e.g., an approaching distance) of the grab-handle user interface element 504, a portion of the grab-handle user interface element is visually presented to the user.

FIG. 5C shows the panel user interface 502 being presented to the user 101 while the grab-handle user interface element 504 is in a third presentation state. In the third presentation state, which corresponds to the representation of the hand of the user being at a grabbable location of the grab-handle user interface element 504, the portion of the grab-handle user interface element 504 is visually presented to the user, similarly to in FIG. 5B. But in FIG. 5C, an additional indication is presented (e.g., a slightly different visual appearance of a portion 510 of the grab-handle user interface element 504) to indicate that the representation of the hand of the user 101 is in a grabbable position with respect to the grab-handle user interface element 504.

FIG. 5D shows the panel user interface 502 being presented to the user 101 while the grab-handle user interface element 504 is in a fourth presentation state. In the fourth presentation state, which corresponds to determination that the representation 506 of the hand of the user interacting with the grab-handle user interface element 504, the grab-handle user interface element 504 is such that it is substantially surrounding the panel user interface 502.

FIGS. 5E and 5F illustrate a sequence of providing a user with a visual indication of selection of a user interface element in response to a detection that a user's digit or other selecting device (e.g., a controller) is within a predefined distance of the user interface element. FIG. 5E shows the tip of the user's finger 508 becoming close to contacting the user interface element 510, but yet within contacting distance (e.g., the location of the user interface displayed within the augmented or virtual reality is at a different location than the finger or representation of the user's finger) of the user interface element 510.

FIG. 5F illustrates in response to the tip of the user's finger 508 coming within a predefined distance (e.g., between 0.5 to 5 inches) of the user interface element, the appearance of the user interface element is changed (e.g., the user interface element is enlarged and/or a visual emphasis 512 is displayed around the user interface element 510.

(A1) FIG. 6A shows a flow chart of a method 600 of interacting with a user interface (e.g., a panel user interface) that is configured to be presented with a user interface element that surrounds substantially all of a perimeter of the user interface, in accordance with some embodiments. The method can be performed by one or more processors of an artificial-reality headset by executing instruction stored in memory of the artificial-reality headset. The instructions include presenting (602), via an artificial-reality headset, a user interface (e.g., a panel user interface) that includes a perimeter.

The instructions include, in accordance with (604) a determination that a representation of a hand of the user is within a direct-touch interaction distance from the user interface, presenting a user interface element (e.g., a portion of a grab handle) outside of the perimeter. In some embodiments, an additional or alternative artificial-reality content control input (e.g., a controller, ray casting, etc.) can be used in conjunction with and/or alternatively to direct-touch interactions with one or more of the user's hands.

And the instructions include, while presenting the user interface element outside of a portion of the perimeter, in response to detecting the representation of the user's hand interacting with the user interface element that is presented outside of the perimeter, modifying the user interface element such that it surrounds substantially all (e.g., 90-100%)

of the perimeter. That is, the entire grab handle is presented so to surround the perimeter of the user interface.

(A2) In some embodiments of A1, the instructions further include, after presenting the user interface element outside of the perimeter of the user interface, and before modifying the user interface element such that it surrounds substantially all of the perimeter, in accordance with a determination that a portion of the user's hand is located at an intersection (e.g., within a grabbable position of the user interface element) of the user interface element, modifying the user interface element to indicate the portion of the interaction zone wherein the user's hand is located.

(A3) In some embodiments of any of A1-A2, the instructions further include, while the user interface that includes the perimeter is being presented via the artificial-reality headset, in accordance with a determination that the user is directing a focus-selector affordance generated by a ray casting gesture to an interaction location (e.g., an intersection with the user interface element that would be substantially surrounding the perimeter of the user interface), presenting a portion of the user interface element corresponding to the interaction location. The instructions further include, further in accordance with the determination that the representation of the hand of the user is within the direct-touch interaction distance of the user interface element, in conjunction with presenting the user interface element, ceasing to present the focus-selector affordance generated by the ray casting gesture.

(A4) In some embodiments of any of A1-A3, detecting the representation of the user's hand interacting with the user interface element includes detecting a pinch gesture between a thumb of the user and one or more fingers of the user at an intersection of the user interface element.

(A5) In some embodiments of any of A1-A4, the instructions further include, after the detecting of the hand of the user interacting with the user interface element, and while the user interface element is surrounding substantially all of the perimeter of the user interface, detecting a movement of the user's hand. And the instructions further include, in accordance with detecting the movement of the user's hand, causing a translational movement of the user interface in three-dimensional space to a new location.

(A6) In some embodiments of A5, the instructions further include, while the movement of the hand of the user is causing the translational movement of the user interface to the new location, continuously displaying the user interface element such that the user interface element is substantially surrounding the user interface.

(A7) In some embodiments of A6, the instructions further include, after detecting the movement of the hand that causes the translational movement of the user interface, in accordance with a determination that the user is no longer interacting with the user interface element: (i) modifying the user interface element such that it is no longer substantially surrounding the user interface, and (ii) continuing to display the user interface at the new location.

(A8) In some embodiments of any of A1-A7, the instructions further include, in accordance with detecting a user interaction with a portion of the user interface element, performing a rotational adjustment of the user interface such that the user interface is presented with a different angular orientation in three-dimensional space.

(A9) In some embodiments of A8, the portion is a top edge of the user interface element, and the top edge of the user interface element is configured to cause manual tilt operations which cause the user interface to tilt from a first angular orientation to a second angular orientation.

(A10) In some embodiments of A1-A9, the representation of the hand of the user is a first representation of a first hand of the user, and the method further includes, while the first hand of the user is interacting with the user interface element, in response to detecting a second representation of a second hand of the user interacting with the user interface element, performing an operation to adjust the user interface based on a two-handed gesture space associated with the user interface, the two-handed gesture space being distinct from a one-handed gesture space associated with the user interface.

(A11) In some embodiments of A10, in accordance with detecting pinch gestures being performed by each of the first and second hands of the user while the first and second representations of the first and second hands of the user are interacting with the user interface element, based on movement of at least one of the first and second representations of the first and second hands of the user while the user is performing pinch gestures with both the first and second hand, performing an operation to resize the user interface.

(A12) In some embodiments of A1-A11, the instructions further include, before detecting the representation of the hand of the user is interacting with the user interface element, in accordance with detecting an indirect-touch gesture performed by the user, causing the user interface to move such that the user interface element moves towards the representation of the hand of the user. For example, the user performs a beckoning gesture (e.g., a gesture in which the user's hand is wrist up towards the sky and they move their fingers towards their body) to cause a respective artificial-reality user interface to move towards the user.

(A13) In some embodiments of A1-A12, the user interface element has no depth in three-dimensional space in accordance with the determination that the hand of the user is within the direct-touch interaction distance of the user interface element, and the user interface element has a depth in three-dimensional space while it surrounds substantially all of the perimeter.

(A14) In some embodiments of A1-A13, the instructions further include, in accordance with a determination that the representation of the hand of the user is within the direct-touch interaction distance from a grab point within the user interface, causing an adjustment to the user interface based on a hand movement performed by the user while the representation of the hand is located at the grab point.

(A15) In some embodiments of A14, the grab point is located at a center of the user interface and is not a portion of the user interface element, and, in accordance with the user interacting with the grab point, while the hand of the user is not within a direct-touch interaction distance from the user interface, displaying at least a portion of the user interface element.

(A16) In some embodiments of A1-A15, while the user interface element is being presented such that it substantially surrounds the perimeter of the user interface, the user interface element has a visual characteristic based on a visual appearance of the user interface.

(A17) In some embodiments of A1-A16, the user interface is configured to be presented in (i) a first display mode, and (ii) a second display mode. While the user interface element is being interacted with by the representation of the hand of the user to cause the user interface element to be presented such that it substantially surrounds the user interface, the user interface is being presented in a second display mode. And, in accordance with a determination to present the user interface in the second display mode, adjusting the user interface element such that it does not substantially surround the user interface.

(B1) FIG. 6B shows a flow chart of a method 630 of presenting a user interface that has two or more distinct display modes, in accordance with some embodiments. The method can be performed by one or more processors of an artificial-reality headset by executing instruction stored in memory of the artificial-reality headset. The instructions include presenting (632), via an artificial-reality headset, a user interface element (e.g., a system bar user interface element) that includes a system-level control and an application specific control.

The instructions include, while a user interface is presented (634) in a first display mode during a first period of time, presenting, via the artificial-reality headset, the user interface such that it is in contact with the user interface element that includes the system-level control and the application-specific control.

And the instructions include, in response to (636) a request to present the user interface using a second display mode that is distinct from the first display mode, presenting, via the artificial-reality headset, the user interface such that it is not in contact with the user interface element that includes the system-level control and the application-specific control.

(B2) In some embodiments of B1, the first display mode is a tablet display mode, and the user interface is configured to be presented as a panel user interface in the tablet display mode.

(B3) In some embodiments of B2, the instructions further include, while the user interface is being presented as a panel user interface in the tablet display mode, presenting the user interface element along a bottom edge of the panel user interface.

(B4) In some embodiments of B3, the tablet display mode includes a widescreen-display sub-mode. A display portion of the user interface is not vertically-scrollable in the widescreen-display sub-mode. The tablet display mode includes a portrait-display sub-mode. And the display portion of the user interface is vertically-scrollable in the portrait-display sub-mode.

(B5) In some embodiments of B1-B4, the second display mode is a multi-screen display mode, and a plurality of panel user interfaces are configured to be presented in a connected sequence in the multi-screen display mode.

(B6) In some embodiments of B1-B5, a grab-handle user interface element is presented below the user interface element in the first display mode, and the grab-handle user interface element is presented above the user interface element in the second display mode.

(B7) In some embodiments B6, a portion of the grab handle that is configured to be presented between a bottom edge of the user interface and a top edge of the user interface element is occluded while the user interface is in the second display mode.

(B8) In some embodiments of B6-B7, the request to present the user interface using the second display mode is based on an interaction by a representation of a hand of a user with the grab-handle user interface element.

(B9) In some embodiments of B1-B8, an avatar associated with a user is presented in a system-level control portion of the user interface element.

(B10) In some embodiments of B1-B9, the instructions further include, while the user interface is in the second display mode, in response to a request to present a virtual keyboard user interface element in conjunction with the user interface, ceasing to display the user interface element, and displaying the virtual keyboard user interface element at a location where the user interface element had previously been displayed. And the instructions further include in response to another request to present the user interface using the first display mode, re-initiating display of the user interface element such that is in contact with the user interface and presenting the virtual keyboard user interface element below the user interface element.

(B11) In some embodiments of B1-B10, while the user interface is in the first display mode, the user interface is configured to be interacted with directly by a visual representation of a hand of a user, and, while the user interface is in the second display mode, the user interface is not configured to be interacted with directly by the visual representation of the hand of the user.

(C1) FIG. 6C shows a flow chart 660 of interacting with a user interface using indirect-control and direct-touch user inputs based on a distance of a visual representation of a user's hand from the user interface, in accordance with some embodiments. The method can be performed by one or more processors of an artificial-reality headset by executing instruction stored in memory of the artificial-reality headset. The instructions include presenting (662), via an artificial-reality headset, a user interface that includes a selectable user interface element.

The instructions include, while a representation of a user's hand is within an indirect-control threshold distance of the user interface, projecting a focus selector within the user interface based on a position of the representation of the user's hand.

And the instructions include, upon determining that the representation of the hand of the user has moved within a direct-touch threshold distance of the user interface, ceasing to display the focus selector within the user interface and allowing the representation of the hand of the user to interact directly with the selectable user interface.

(C2) In some embodiments of C1, the instructions further include, in conjunction with projecting the focus selector within the user interface based on a position of the representation of the hand of the user, presenting a directional element associated with the focus selector near the representation of the hand of the user. And the instructions further include, before the representation of the hand of the user has moved within the direct-touch threshold distance, altering a visual characteristic associated with the focus selector.

(C3) In some embodiments of C2, a visual characteristic of the directional element is altered in conjunction with the altering of the visual characteristic of the focus selector.

(C4) In some embodiments of C1-C3, the instructions further include, in accordance with determining that direct-touch contact has occurred between the representation of the hand of the user and the selectable user interface element, adjusting a visual characteristic of the selectable user interface element such that a visual glow is presented behind the selectable user interface element.

(D1) In accordance with some embodiments of any of A1-C4, no operations of the method of are directed to a touch-screen display or any other physical hardware components.

(E1) In accordance with some embodiments of any of A1-D1, no handheld controllers or other mechanical or electronic devices are in physical contact with a hand or a wrist of the user during performance of any of the operations.

(F1) In accordance with some embodiments, a non-transitory computer readable storage medium includes instructions that, when executed by a computing device in communication with an artificial-reality headset, cause the computer device to perform operations corresponding to any of A1-E1.

(G1) In accordance with some embodiments, an artificial-reality headset is configured to perform operations, including operations that correspond to any of A1-E1.

(H1) In accordance with some embodiments, a system includes an artificial-reality headset and a portable computing unit that includes a processor configured to cause operations of any of A1-E1.

The devices described above are further detailed below, including wrist-wearable devices, headset devices, systems, and haptic feedback devices. Specific operations described above may occur as a result of specific hardware, such hardware is described in further detail below. The devices described below are not limiting and features on these devices can be removed or additional features can be added to these devices.

Example Wrist-Wearable Devices

Figure 7B:
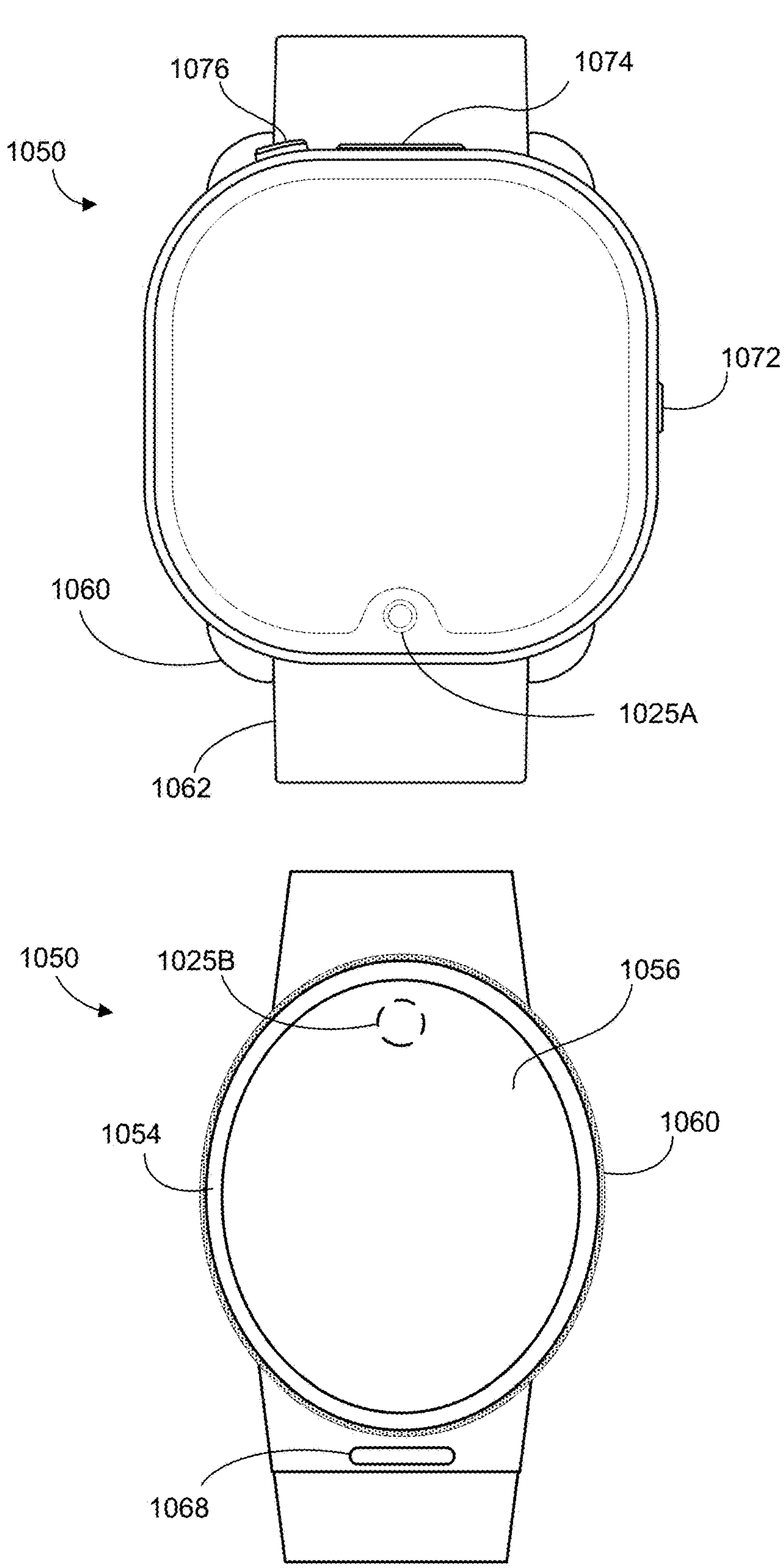

FIGS. 7A and 7B illustrate an example wrist-wearable device 1050, in accordance with some embodiments. The wrist-wearable device 1050 is an instance of the wearable device described herein, such that the wearable device should be understood to have the features of the wrist-wearable device 1050 and vice versa. FIG. 7A illustrates a perspective view of the wrist-wearable device 1050 that includes a watch body 1054 coupled with a watch band 1062. The watch body 1054 and the watch band 1062 can have a substantially rectangular or circular shape and can be configured to allow a user to wear the wrist-wearable device 1050 on a body part (e.g., a wrist). The wrist-wearable device 1050 can include a retaining mechanism 1067 (e.g., a buckle or a hook-and-loop fastener) for securing the watch band 1062 to the user's wrist. The wrist-wearable device 1050 can also include a coupling mechanism 1060 (e.g., a cradle) for detachably coupling the capsule or watch body 1054 (via a coupling surface 1058 of the watch body 1054) to the watch band 1062.

The wrist-wearable device 1050 can perform various functions associated with navigating through user interfaces and selectively opening applications. As will be described in more detail below, operations executed by the wrist-wearable device 1050 can include, without limitation, display of visual content to the user (e.g., visual content displayed on display 1056); sensing user input (e.g., sensing a touch on peripheral button 1068, sensing biometric data on sensor 1064, or sensing neuromuscular signals on neuromuscular sensor 1065); messaging (e.g., text, speech, and/or video); image capture; wireless communications (e.g., cellular, near field, Wi-Fi, and/or personal area network); location determination; financial transactions; providing haptic feedback; alarms; notifications; biometric authentication; health monitoring; sleep monitoring; etc. These functions can be executed independently in the watch body 1054, independently in the watch band 1062, and/or in communication between the watch body 1054 and the watch band 1062. In some embodiments, functions are executed on the wrist-wearable device 1050 in conjunction with an artificial-reality environment that includes, but is not limited to, virtual-reality (VR) environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments. As the skilled artisan will appreciate upon reading the descriptions provided herein, the novel wearable devices described herein can be used with any of these types of artificial-reality environments.

The watch band 1062 can be configured to be worn by a user such that an inner surface of the watch band 1062 is in contact with the user's skin. When worn by a user, sensor 1064 is in contact with the user's skin. The sensor 1064 can be a biosensor that senses a user's heart rate, saturated oxygen level, temperature, sweat level, muscle intentions, or a combination thereof. The watch band 1062 can include multiple sensors 1064 that can be distributed on an inside and/or an outside surface of the watch band 1062. Additionally, or alternatively, the watch body 1054 can include sensors that are the same or different than those of the watch band 1062 (or the watch band 1062 can include no sensors at all in some embodiments). For example, multiple sensors can be distributed on an inside and/or an outside surface of the watch body 1054. As described below with reference to FIGS. 7B and/or 7C, the watch body 1054 can include, without limitation, a front-facing image sensor 1025A and/or a rear-facing image sensor 1025B, a biometric sensor, an IMU, a heart rate sensor, a saturated-oxygen sensor, a neuromuscular sensor(s), an altimeter sensor, a temperature sensor, a bioimpedance sensor, a pedometer sensor, an optical sensor (e.g., imaging sensor 1204), a touch sensor, a sweat sensor, etc. The sensor 1064 can also include a sensor that provides data about a user's environment, including a user's motion (e.g., an IMU), altitude, location, orientation, gait, or a combination thereof. The sensor 1064 can also include a light sensor (e.g., an infrared light sensor, a visible light sensor) that is configured to track a position and/or motion of the watch body 1054 and/or the watch band 1062. The watch band 1062 can transmit the data acquired by sensor 1064 to the watch body 1054 using a wired communication method (e.g., a Universal Asynchronous Receiver/Transmitter (UART) or a USB transceiver) and/or a wireless communication method (e.g., near field communication or Bluetooth). The watch band 1062 can be configured to operate (e.g., to collect data using sensor 1064) independent of whether the watch body 1054 is coupled to or decoupled from watch band 1062.

In some examples, the watch band 1062 can include a neuromuscular sensor 1065 (e.g., an EMG sensor, a mechanomyogram (MMG) sensor, and/or a sonomyography (SMG) sensor). Neuromuscular sensor 1065 can sense a user's intention to perform certain motor actions. The sensed muscle intention can be used to control certain user interfaces displayed on the display 1056 of the wrist-wearable device 1050 and/or can be transmitted to a device responsible for rendering an artificial-reality environment (e.g., a head-mounted display) to perform an action in an associated artificial-reality environment, such as to control the motion of a virtual device displayed to the user.

Signals from neuromuscular sensor 1065 can be used to provide a user with an enhanced interaction with a physical object and/or a virtual object in an artificial-reality application generated by an artificial-reality system (e.g., user interface objects presented on the display 1056, or another computing device (e.g., a smartphone)). Signals from neuromuscular sensor 1065 can be obtained (e.g., sensed and recorded) by one or more neuromuscular sensors 1065 of the watch band 1062. Although FIG. 7A shows one neuromuscular sensor 1065, the watch band 1062 can include a plurality of neuromuscular sensors 1065 arranged circumferentially on an inside surface of the watch band 1062 such that the plurality of neuromuscular sensors 1065 contact the skin of the user. The watch band 1062 can include a plurality of neuromuscular sensors 1065 arranged circumferentially on an inside surface of the watch band 1062. Neuromuscular sensor 1065 can sense and record neuromuscular signals from the user as the user performs muscular activations (e.g., movements and/or gestures). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The watch band 1062 and/or watch body 1054 can include a haptic device 1063 (e.g., a vibratory haptic actuator) that is configured to provide haptic feedback (e.g., a cutaneous and/or kinesthetic sensation) to the user's skin. The sensors 1064 and 1065, and/or the haptic device 1063 can be configured to operate in conjunction with multiple applications including, without limitation, health monitoring, social media, game playing, and artificial reality (e.g., the applications associated with artificial reality).

The wrist-wearable device 1050 can include a coupling mechanism (also referred to as a cradle) for detachably coupling the watch body 1054 to the watch band 1062. A user can detach the watch body 1054 from the watch band 1062 in order to reduce the encumbrance of the wrist-wearable device 1050 to the user. The wrist-wearable device 1050 can include a coupling surface on the watch body 1054 and/or coupling mechanism(s) 1060 (e.g., a cradle, a tracker band, a support base, a clasp). A user can perform any type of motion to couple the watch body 1054 to the watch band 1062 and to decouple the watch body 1054 from the watch band 1062. For example, a user can twist, slide, turn, push, pull, or rotate the watch body 1054 relative to the watch band 1062, or a combination thereof, to attach the watch body 1054 to the watch band 1062 and to detach the watch body 1054 from the watch band 1062.

As shown in the example of FIG. 7A, the watch band coupling mechanism 1060 can include a type of frame or shell that allows the watch-body 1054 coupling surface to be retained within the watch-band coupling mechanism 1060. The watch body 1054 can be detachably coupled to the watch band 1062 through a friction fit, magnetic coupling, a rotation-based connector, a shear-pin coupler, a retention spring, one or more magnets, a clip, a pin shaft, a hook-and-loop fastener, or a combination thereof. In some examples, the watch body 1054 can be decoupled from the watch band 1062 by actuation of the release mechanism 1070. The release mechanism 1070 can include, without limitation, a button, a knob, a plunger, a handle, a lever, a fastener, a clasp, a dial, a latch, or a combination thereof.

As shown in FIGS. 7A-7B, the coupling mechanism 1060 can be configured to receive a coupling surface proximate to the bottom side of the watch body 1054 (e.g., a side opposite to a front side of the watch body 1054 where the display 1056 is located) such that a user can push the watch body 1054 downward into the coupling mechanism 1060 to attach the watch body 1054 to the coupling mechanism 1060. In some embodiments, the coupling mechanism 1060 can be configured to receive a top side of the watch body 1054 (e.g., a side proximate to the front side of the watch body 1054 where the display 1056 is located) that is pushed upward into the cradle, as opposed to being pushed downward into the coupling mechanism 1060. In some embodiments, the coupling mechanism 1060 is an integrated component of the watch band 1062 such that the watch band 1062 and the coupling mechanism 1060 are a single unitary structure.

The wrist-wearable device 1050 can include a single release mechanism 1070 or multiple release mechanisms 1070 (e.g., two release mechanisms 1070 positioned on opposing sides of the wrist-wearable device 1050 such as spring-loaded buttons). As shown in FIG. 7A, the release mechanism 1070 can be positioned on the watch body 1054 and/or the watch band coupling mechanism 1060. Although FIG. 7A shows release mechanism 1070 positioned at a corner of watch body 1054 and at a corner of watch band coupling mechanism 1060, the release mechanism 1070 can be positioned anywhere on watch body 1054 and/or watch band coupling mechanism 1060 that is convenient for a user of wrist-wearable device 1050 to actuate. A user of the wrist-wearable device 1050 can actuate the release mechanism 1070 by pushing, turning, lifting, depressing, shifting, or performing other actions on the release mechanism 1070. Actuation of the release mechanism 1070 can release (e.g., decouple) the watch body 1054 from the watch band coupling mechanism 1060 and the watch band 1062 allowing the user to use the watch body 1054 independently of watch band 1062. For example, decoupling the watch body 1054 from the watch band 1062 can allow the user to capture images using rear-facing image sensor 1025B.

FIG. 7B includes top views of examples of the wrist-wearable device 1050. The examples of the wrist-wearable device 1050 shown in FIGS. 7A-7B can include a coupling mechanism 1060 (as shown in FIG. 6B, the shape of the coupling mechanism can correspond to the shape of the watch body 1054 of the wrist-wearable device 1050). The watch body 1054 can be detachably coupled to the coupling mechanism 1060 through a friction fit, magnetic coupling, a rotation-based connector, a shear-pin coupler, a retention spring, one or more magnets, a clip, a pin shaft, a hook-and-loop fastener, or any combination thereof.

In some examples, the watch body 1054 can be decoupled from the coupling mechanism 1060 by actuation of a release mechanism 1070. The release mechanism 1070 can include, without limitation, a button, a knob, a plunger, a handle, a lever, a fastener, a clasp, a dial, a latch, or a combination thereof. In some examples, the wristband system functions can be executed independently in the watch body 1054, independently in the coupling mechanism 1060, and/or in communication between the watch body 1054 and the coupling mechanism 1060. The coupling mechanism 1060 can be configured to operate independently (e.g., execute functions independently) of watch body 1054. Additionally, or alternatively, the watch body 1054 can be configured to operate independently (e.g., execute functions independently) from the coupling mechanism 1060. As described below with reference to the block diagram of FIG. 7A, the coupling mechanism 1060 and/or the watch body 1054 can each include the independent resources required to independently execute functions. For example, the coupling mechanism 1060 and/or the watch body 1054 can each include a power source (e.g., a battery), a memory, data storage, a processor (e.g., a central processing unit (CPU)), communications, a light source, and/or input/output devices.

The wrist-wearable device 1050 can have various peripheral buttons 1072, 1074, and 1076, for performing various operations at the wrist-wearable device 1050. Also, various sensors, including one or both of the sensors 1064 and 1065, can be located on the bottom of the watch body 1054, and can optionally be used even when the watch body 1054 is detached from the watch band 1062.

Figure 7C:
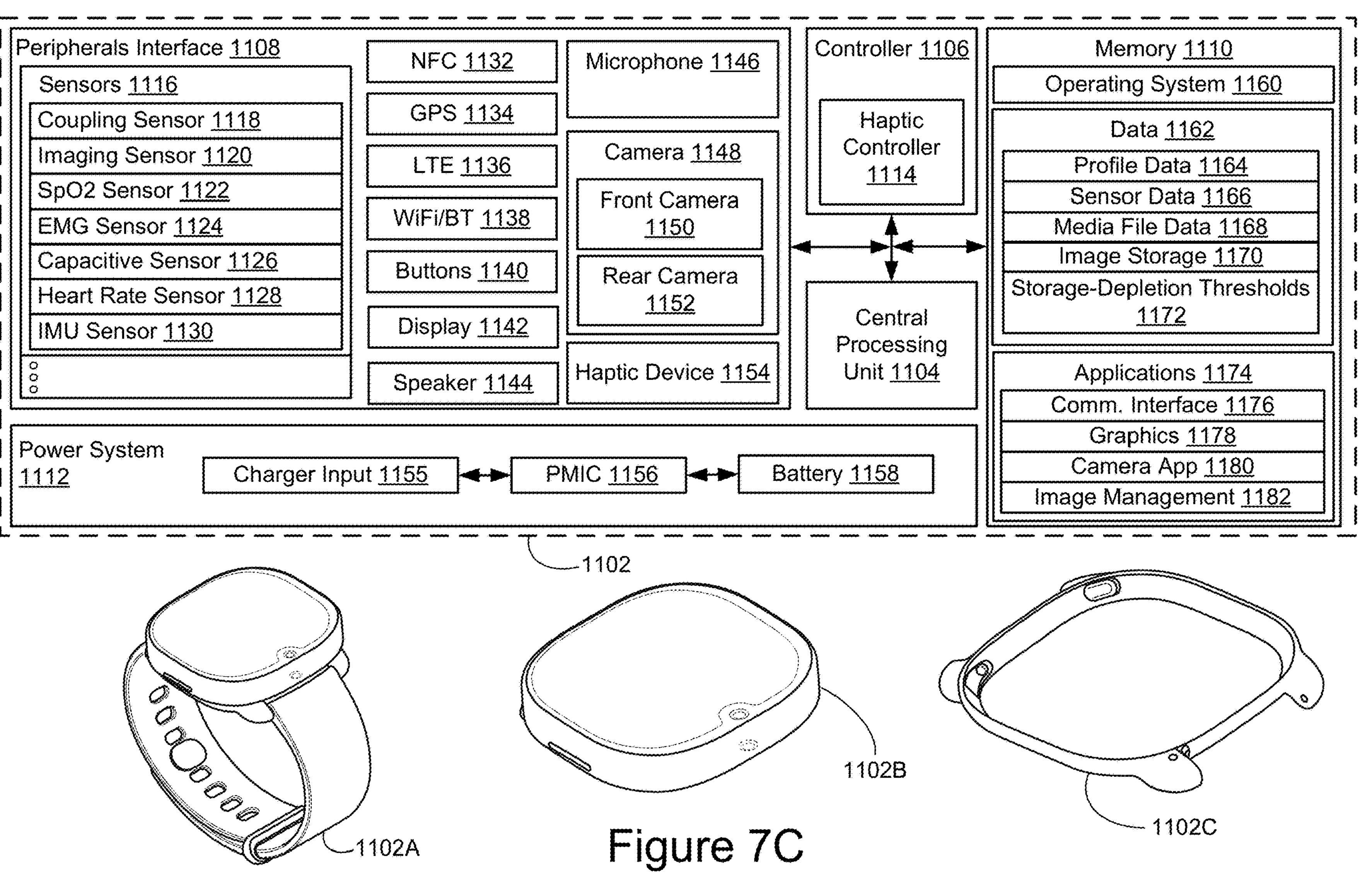

FIG. 7C is a block diagram of a computing system 1100, according to at least one embodiment of the present disclosure. The computing system 1100 includes an electronic device 1102, which can be, for example, a wrist-wearable device. The wrist-wearable device 1050 described in detail above with respect to FIGS. 7A-7B is an example of the electronic device 1102, so that the electronic device 1102 will be understood to include the components shown and described below for the computing system 1100. In some embodiments, all, or a substantial portion of the components of the computing system 1100 are included in a single integrated circuit. In some embodiments, the computing system 1100 has a split architecture (e.g., a split mechanical architecture, a split electrical architecture) between a watch body (e.g., a watch body 1054 in FIGS. 7A-7B) and a watch band (e.g., a watch band 1062 in FIGS. 7A-7B). The electronic device 1102 can include a processor (e.g., a central processing unit 1104), a controller 1106, a peripherals interface 1108 that includes one or more sensors 1116 and various peripheral devices, a power source (e.g., a power system 1112), and memory (e.g., a memory 1110) that includes an operating system (e.g., an operating system 1160), data (e.g., data 1162), and one or more applications (e.g., applications 1174). In some embodiments, the computing system 1100 includes the power system 1112, which includes a charger input 1155, a power-management integrated circuit (PMIC) 1156, and a battery 1158.

In some embodiments, a watch body and a watch band are each electronic devices 1102 that each have respective batteries (e.g., battery 1158), and can share power with each other. The watch body and the watch band can receive a charge using a variety of techniques. In some embodiments, the watch body and the watch band use a wired charging assembly (e.g., power cords) to receive the charge. Alternatively, or in addition, the watch body and/or the watch band can be configured for wireless charging. For example, a portable charging device can be designed to mate with a portion of the watch body and/or the watch band and wirelessly deliver usable power to a battery of the watch body and/or the watch band. The watch body and the watch band can have independent power systems 1112 to enable each to operate independently. The watch body and the watch band can also share power (e.g., one can charge the other) via respective PMICs 1156 that can share power over power and ground conductors and/or over wireless charging antennas.

In some embodiments, the peripherals interface 1108 include one or more sensors 1116. The sensors 1116 can include a coupling sensor 1118 for detecting when the electronic device 1102 is coupled with another electronic device 1102 (e.g., a watch body can detect when it is coupled to a watch band, and vice versa). The sensors 1116 can include imaging sensors 1120 for collecting imaging data, which can optionally be the same device as one or more of the cameras 1148. In some embodiments, the imaging sensors 1120 are separate from the cameras 1148. In some embodiments the sensors include an SpO2 sensor 1122. In some embodiments, the sensors 1116 include an EMG sensor 1124 for detecting, for example, muscular movements by a user of the electronic device 1102. In some embodiments, the sensors 1116 include a capacitive sensor 1126 for detecting changes in potential of a portion of a user's body. In some embodiments, the sensors 1116 include a heart-rate sensor 1128. In some embodiments, the sensors 1116 include an inertial measurement unit (IMU) sensor 1130 for detecting, for example, changes in acceleration of the user's hand.

In some embodiments, the peripherals interface 1108 includes a near-field communication (NFC) component 1132, a global-positioning system (GPS) component 1134, a long-term evolution (LTE) component 1136, and/or a Wi-Fi and/or Bluetooth communication component 1138. In some embodiments, the peripherals interface includes one or more buttons 1140 (e.g., the peripheral buttons 1072, 1074, and 1076 in FIG. 6B), which, when selected by a user, cause the operation to be performed at the electronic device 1102.

The electronic device 1102 can include at least one display 1142, for displaying visual affordances to the user, including user-interface elements and/or three-dimensional virtual objects. The display can also include a touch screen for inputting user inputs, such as touch gestures, swipe gestures, and the like. The electronic device 1102 can include at least one speaker 1144 and at least one microphone 1146 for providing audio signals to the user and receiving audio input from the user. The user can provide user inputs through the microphone 1146 and can also receive audio output from the speaker 1144 as part of a haptic event provided by the haptic controller 1114. The electronic device 1102 can include at least one camera 1148, including a front camera 1150 and a rear camera 1152. In some embodiments, the electronic device 1102 can be a head-wearable device and one of the cameras 1148 can be integrated with a lens assembly of the head-wearable device.

One or more of the electronic devices 1102 can include one or more haptic controllers 1114 and associated componentry (e.g., the haptic device 1154) for providing haptic events at one or more of the electronic devices 1102 (e.g., a vibrating sensation or audio output in response to an event at the electronic device 1102). The haptic controllers 1114 can communicate with one or more electroacoustic devices, including a speaker of the one or more speakers 1144 and/or other audio components and/or electromechanical devices that convert energy into linear motion such as a motor, solenoid, electroactive polymer, piezoelectric actuator, electrostatic actuator, or other tactile-output-generating component (e.g., a component that converts electrical signals into tactile outputs on the device). The haptic controller 1114 can provide haptic events that are capable of being sensed by a user of the electronic devices 1102. In some embodiments, the one or more haptic controllers 1114 receive input signals from an application of the applications 1174.

Memory 1110 optionally includes high-speed random-access memory and optionally also includes non-volatile memory, such as one or more magnetic disk storage devices, flash memory devices, or other non-volatile solid-state memory devices. Access to the memory 1110 by other components of the electronic device 1102, such as the one or more processors of the central processing unit 1104, and the peripherals interface 1108 is optionally controlled by a memory controller of the controllers 1106.

In some embodiments, software components stored in the memory 1110 include one or more operating systems 1160 (e.g., a Linux-based operating system or an Android operating system). The memory 1110 can also include data 1162, including structured data (e.g., SQL databases, MongoDB databases, GraphQL data, or JSON data). The data 1162 can include profile data 1164, sensor data 1166, media file data 1168. In some embodiments, the memory 1110 includes an image storage 1170. In some embodiments, the memory 1110 has one or more storage-depletion thresholds 1172.

In some embodiments, software components stored in the memory 1110 include one or more applications 1174 configured to perform operations at the electronic devices 1102. In some embodiments, the one or more applications 1174 include one or more communication interface modules 1176, one or more graphics modules 1178, one or more camera application modules 1180, and/or one or more image management modules 1182. In some embodiments, a plurality of applications 1174 work in conjunction with one another to perform various tasks at one or more of the electronic devices 1102.

It should be appreciated that the electronic devices 1102 are only some examples of the electronic devices 1102 within the computing system 1100, and that other electronic devices 1102 that are part of the computing system 1100 can have more or fewer components than shown, combine two or more components, or have a different configuration or arrangement of the components. The various components shown in FIG. 7C are implemented in hardware, software, firmware, or a combination thereof, including one or more signal processing and/or application-specific integrated circuits.

As illustrated by the lower portion of FIG. 7C, various individual components of a wrist-wearable device can be examples of the electronic device 1102. For example, some or all of the components shown in the electronic device 1102 can be housed or otherwise disposed in a combined watch device 1102A, or within individual components of the capsule device watch body 1102B, the cradle portion 1102C, and/or a watch band.

Figure 7D:
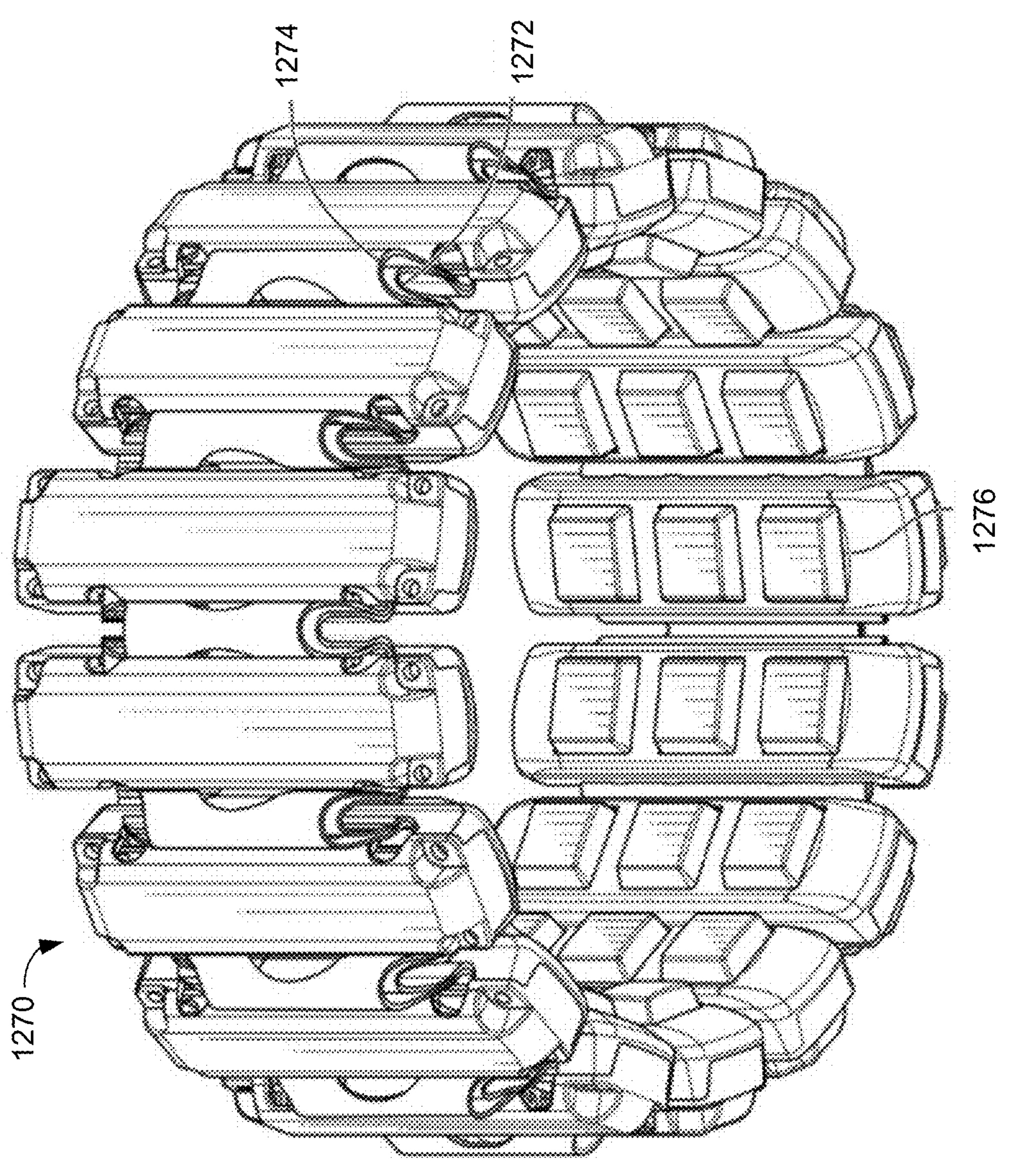

FIG. 7D illustrates a wearable device 1270, in accordance with some embodiments. In some embodiments, the wearable device 1270 is used to generate control information (e.g., sensed data about neuromuscular signals or instructions to perform certain commands after the data is sensed) for causing a computing device to perform one or more input commands. In some embodiments, the wearable device 1270 includes a plurality of neuromuscular sensors 1276. In some embodiments, the plurality of neuromuscular sensors 1276 includes a predetermined number (e.g., 16) of neuromuscular sensors (e.g., EMG sensors) arranged circumferentially around an elastic band 1274. The plurality of neuromuscular sensors 1276 may include any suitable number of neuromuscular sensors. In some embodiments, the number and arrangement of neuromuscular sensors 1276 depends on the particular application for which the wearable device 1270 is used. For instance, a wearable device 1270 configured as an armband, wristband, or chest-band may include a plurality of neuromuscular sensors 1276 with a different number of neuromuscular sensors and a different arrangement for each use case, such as medical use cases as compared to gaming or general day-to-day use cases. For example, at least 16 neuromuscular sensors 1276 may be arranged circumferentially around elastic band 1274.

In some embodiments, the elastic band 1274 is configured to be worn around a user's lower arm or wrist. The elastic band 1274 may include a flexible electronic connector 1272. In some embodiments, the flexible electronic connector 1272 interconnects separate sensors and electronic circuitry that are enclosed in one or more sensor housings. Alternatively, in some embodiments, the flexible electronic connector 1272 interconnects separate sensors and electronic circuitry that are outside the one or more sensor housings. Each neuromuscular sensor of the plurality of neuromuscular sensors 1276 can include a skin-contacting surface that includes one or more electrodes. One or more sensors of the plurality of neuromuscular sensors 1276 can be coupled together using flexible electronics incorporated into the wearable device 1270. In some embodiments, one or more sensors of the plurality of neuromuscular sensors 1276 are integrated into a woven fabric, where one or more sensors of the plurality of neuromuscular sensors 1276 are sewn into the fabric and mimic the pliability of fabric (e.g., the one or more sensors of the plurality of neuromuscular sensors 1276 can be constructed from a series of woven strands of fabric). In some embodiments, the sensors are flush with the surface of the textile and are indistinguishable from the textile when worn by the user.

Figure 7E:
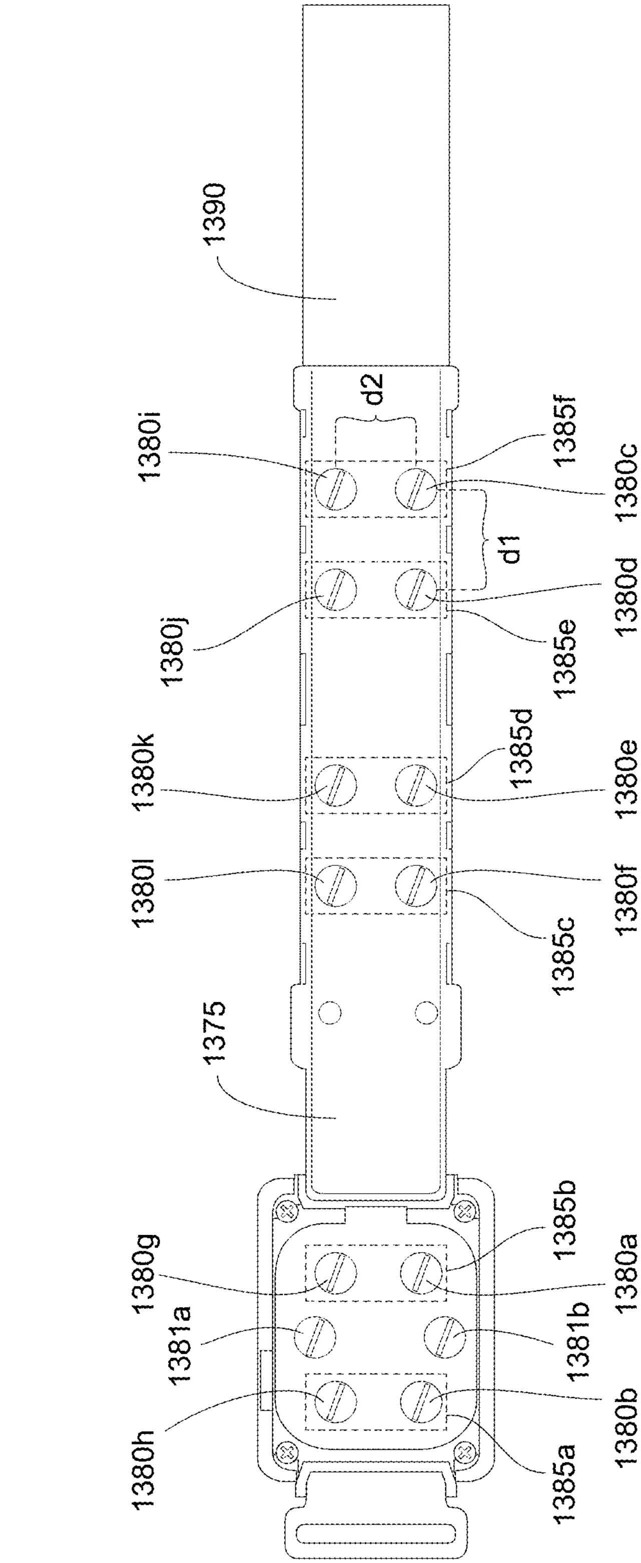

FIG. 7E illustrates a wearable device 1379 in accordance with some embodiments. The wearable device 1379 includes paired sensor channels 1385*a*-1385*f* along an interior surface of a wearable structure 1375 that are configured to detect neuromuscular signals. Different numbers of paired sensors channels can be used (e.g., one pair of sensors, three pairs of sensors, four pairs of sensors, or six pairs of sensors). In some embodiments, the wearable device 1379 further includes other sensors 1381*a* and 1381*b* (e.g., an IMU, accelerometer, gyroscope, and/or magnetometer). The wearable structure 1375 can include a band portion 1390, a capsule portion, and a cradle portion that is coupled with the band portion 1390 to allow for the capsule portion to be removably coupled with the band portion 1390. For embodiments in which the capsule portion is removable, the capsule portion can be referred to as a removable structure, such that in these embodiments the wearable device includes a wearable portion (e.g., band portion 1390 and the cradle portion) and a removable structure (the capsule portion which can be removed from the cradle). In some embodiments, the capsule portion includes the one or more processors and/or other components of the wearable device 1050 described previously in reference to FIG. 7A. The wearable structure 1375 is configured to be worn by a user 101. More specifically, the wearable structure 1375 is configured to couple the wearable device 1379 to a wrist, arm, forearm, or other portion of the user's body. Each paired sensor channels 1385*a*-1385*f* includes two electrodes 1380 (e.g., electrodes 1380*a*-1380*h*) for sensing neuromuscular signals based on differential sensing within each respective sensor channel. In accordance with some embodiments, the wearable device 1370 further includes an electrical ground and a shielding electrode.

The techniques described above can be used with any device for sensing neuromuscular signals, including the arm-wearable devices of FIGS. 7A-7C, but could also be used with other types of wearable devices for sensing neuromuscular signals (such as body-wearable or head-wearable devices that might have neuromuscular sensors closer to the brain or spinal column).

In some embodiments, a wrist-wearable device is used in conjunction with a head-wearable device described below, and the wrist-wearable device can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable devices, attention will now be turned to example head-wearable devices, such as AR glasses and VR headsets.

Example Head-Wearable Devices

Figure 8A:
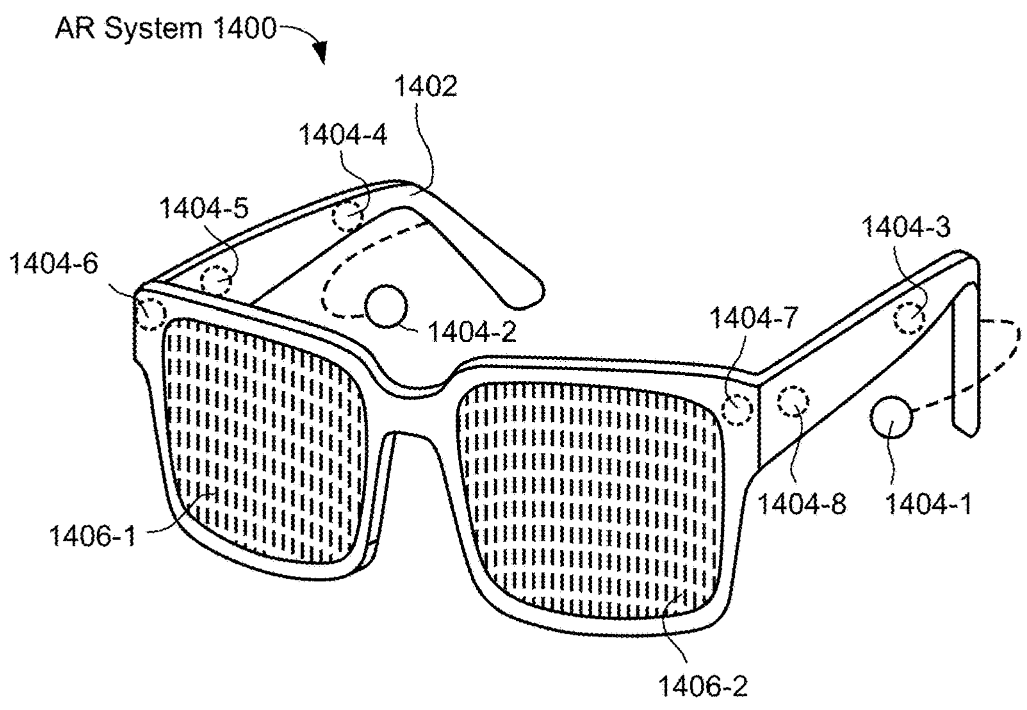
FIGS. 8A-8B illustrate example artificial-reality systems in accordance with some embodiments.

FIG. 8A shows an example AR system 1400 (e.g., augmented-reality glasses) in accordance with some embodiments. In FIG. 8A, the AR system 1400 includes an eyewear device with a frame 1402 configured to hold a left display device 1406-1 and a right display device 1406-2 in front of a user's eyes. The display devices 1406-1 and 1406-2 may act together or independently to present an image or series of images to a user. While the AR system 1400 includes two displays, embodiments of this disclosure may be implemented in AR systems with a single near-eye display (NED) or more than two NEDs.

In some embodiments, the AR system 1400 includes one or more sensors, such as the acoustic sensors 1404. For example, the acoustic sensors 1404 can generate measurement signals in response to motion of the AR system 1400 and may be located on substantially any portion of the frame 1402. Any one of the sensors may be a position sensor, an IMU, a depth camera assembly, or any combination thereof. In some embodiments, the AR system 1400 includes more or fewer sensors than are shown in FIG. 8A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 1400 includes a microphone array with a plurality of acoustic sensors 1404-1 through 1404-8, referred to collectively as the acoustic sensors 1404. The acoustic sensors 1404 may be transducers that detect air pressure variations induced by sound waves. In some embodiments, each acoustic sensor 1404 is configured to detect sound and convert the detected sound into an electronic format (e.g., an analog or digital format). In some embodiments, the microphone array includes ten acoustic sensors: 1404-1 and 1404-2 designed to be placed inside a corresponding ear of the user, acoustic sensors 1404-3, 1404-4, 1404-5, 1404-6, 1404-7, and 1404-8 positioned at various locations on the frame 1402, and acoustic sensors positioned on a corresponding neckband, where the neckband is an optional component of the system that is not present in certain embodiments of the artificial-reality systems discussed herein.

The configuration of the acoustic sensors 1404 of the microphone array may vary. While the AR system 1400 is shown in FIG. 8A having ten acoustic sensors 1404, the number of acoustic sensors 1404 may be more or fewer than ten. In some situations, using more acoustic sensors 1404 increases the amount of audio information collected and/or the sensitivity and accuracy of the audio information. In contrast, in some situations, using a lower number of acoustic sensors 1404 decreases the computing power required by a controller to process the collected audio information. In addition, the position of each acoustic sensor 1404 of the microphone array may vary. For example, the position of an acoustic sensor 1404 may include a defined position on the user, a defined coordinate on the frame 1402, an orientation associated with each acoustic sensor, or some combination thereof.

The acoustic sensors 1404-1 and 1404-2 may be positioned on different parts of the user's ear. In some embodiments, there are additional acoustic sensors on or surrounding the ear in addition to acoustic sensors 1404 inside the ear canal. In some situations, having an acoustic sensor positioned next to an ear canal of a user enables the microphone array to collect information on how sounds arrive at the ear canal. By positioning at least two of the acoustic sensors 1404 on either side of a user's head (e.g., as binaural microphones), the AR device 1400 is able to simulate binaural hearing and capture a 3D stereo sound field around a user's head. In some embodiments, the acoustic sensors 1404-1 and 1404-2 are connected to the AR system 1400 via a wired connection, and in other embodiments, the acoustic sensors 1404-1 and 1404-2 are connected to the AR system 1400 via a wireless connection (e.g., a Bluetooth connection). In some embodiments, the AR system 1400 does not include the acoustic sensors 1404-1 and 1404-2.

The acoustic sensors 1404 on the frame 1402 may be positioned along the length of the temples, across the bridge of the nose, above or below the display devices 1406, or in some combination thereof. The acoustic sensors 1404 may be oriented such that the microphone array is able to detect sounds in a wide range of directions surrounding the user who is wearing the AR system 1400. In some embodiments, a calibration process is performed during manufacturing of the AR system 1400 to determine relative positioning of each acoustic sensor 1404 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of the neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some or all of the battery power, computational resources, and/or additional features of the AR system 1400 may be provided by a paired device or shared between a paired device and an eyewear device, thus reducing the weight, heat profile, and form factor of the eyewear device overall while retaining desired functionality. For example, the neckband may allow components that would otherwise be included on an eyewear device to be included in the neckband, thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy stand-alone eyewear device, thereby enabling an artificial-reality environment to be incorporated more fully into a user's day-to-day activities.

In some embodiments, the optional neckband is communicatively coupled with the eyewear device and/or other devices. The other devices may provide certain functions (e.g., tracking, localizing, depth mapping, processing, and/or storage) to the AR system 1400. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 1400. For example, the controller may process information from the acoustic sensors 1404. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 1400 includes an IMU, the controller may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system such as the VR system 1450 in FIG. 8B, which mostly or completely covers a user's field of view.

Figure 8B:
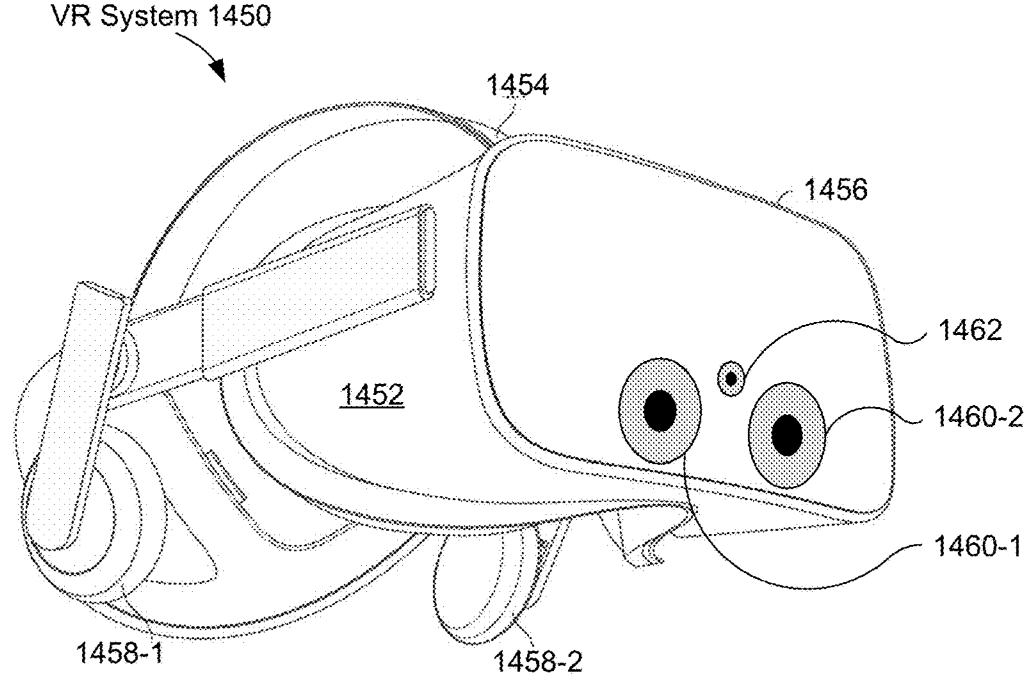

FIG. 8B shows a virtual reality (VR) system 1450 (e.g., a VR headset) in accordance with some embodiments. The VR system 1450 includes a head-mounted display (HMD) 1452. The HMD 1452 includes a front body 1456 and a frame 1454 (e.g., a strap or band) shaped to fit around a user's head. In some embodiments, the HMD 1452 includes output audio transducers 1458-1 and 1458-2, as shown in FIG. 8B. In some embodiments, the front body 1456 and/or the frame 1454 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 1400 and/or the VR system 1450 may include one or more liquid-crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 1400 and/or the VR system 1450 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image-projection system.

Artificial-reality systems may also include various types of computer vision components and subsystems. For example, the AR system 1400 and/or the VR system 1450 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions. For example, FIG. 8B shows VR system 1450 having cameras 1460-1 and 1460-2 that can be used to provide depth information for creating a voxel field and a two-dimensional mesh to provide object information to the user to avoid collisions. FIG. 8B also shows that the VR system includes one or more additional cameras 1462 that are configured to augment the cameras 1460-1 and 1460-2 by providing more information. For example, the additional cameras 1462 can be used to supply color information that is not discerned by cameras 1460-1 and 1460-2. In some embodiments, cameras 1460-1 and 1460-2 and/or additional cameras 1462 include an optional IR-cut filter configured to remove IR light from being received at the respective camera sensors.

In some embodiments, the AR system 1400 and/or the VR system 1450 include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

The techniques described above can be used with any device for interacting with an artificial-reality environment, including the head-wearable devices of FIGS. 8A-8B, but could also be used with other types of wearable devices for sensing neuromuscular signals (such as body-wearable or head-wearable devices that might have neuromuscular sensors closer to the brain or spinal column).

Example System-Level Block Diagrams

Figure 9A:
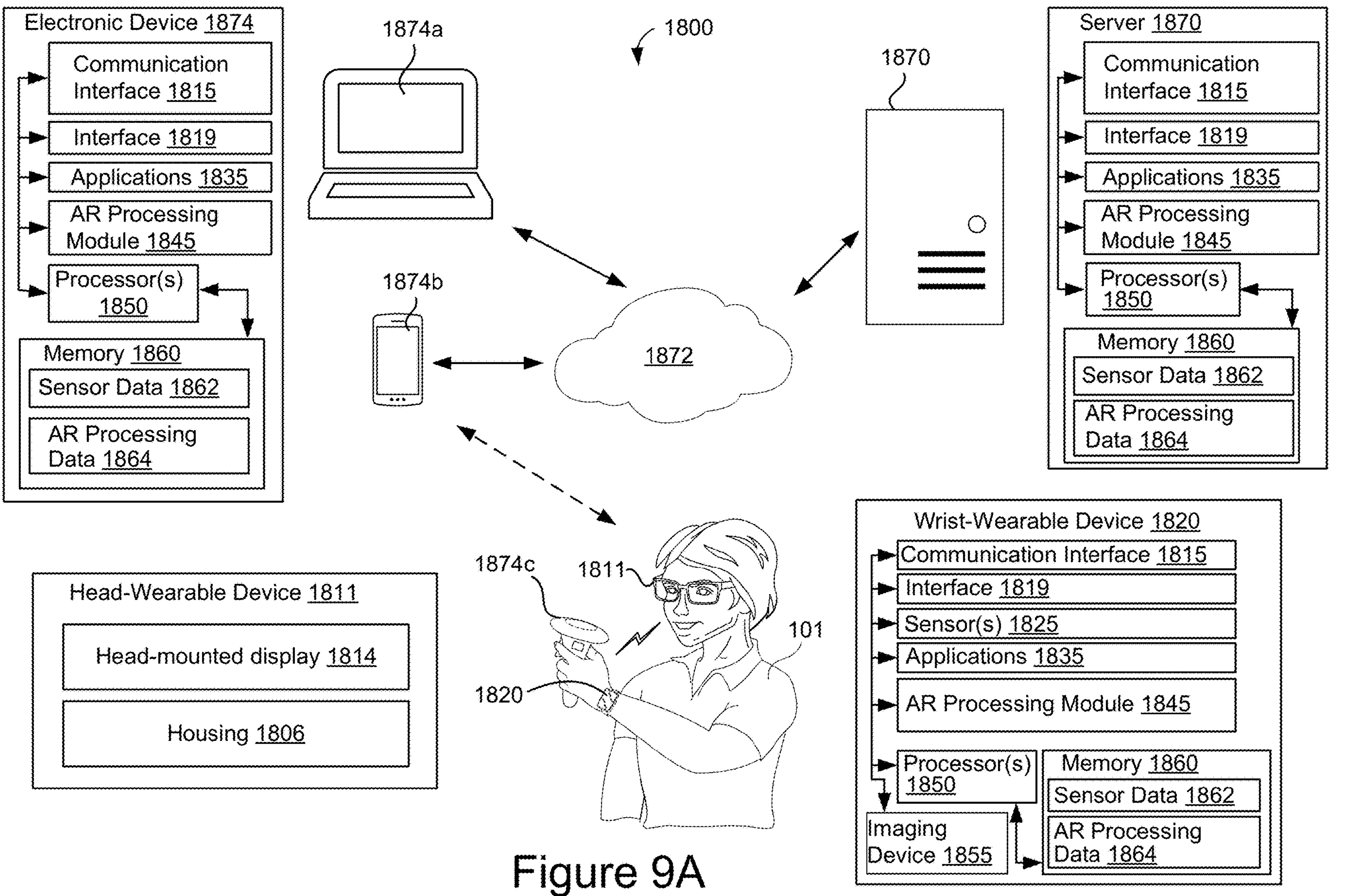
FIG. 9A is a block diagram illustrating an example artificial-reality system in accordance with some embodiments.

FIG. 9A is a block diagram illustrating an example artificial-reality system in accordance with some embodiments. The system 1800 includes one or more devices for facilitating an interactivity with an artificial-reality environment in accordance with some embodiments. For example, the head-wearable device 1811 can present to the user 101 a user interface within the artificial-reality environment. As a non-limiting example, the system 1800 includes one or more wearable devices, which can be used in conjunction with one or more computing devices. In some embodiments, the system 1800 provides the functionality of a virtual-reality device, an augmented-reality device, a mixed-reality device, hybrid-reality device, or a combination thereof. In some embodiments, the system 1800 provides the functionality of a user interface and/or one or more user applications (e.g., games, word processors, messaging applications, calendars, and/or clocks).

The system 1800 includes one or more of servers 1870, electronic devices 1874 (e.g., a computer, 1874*a*, a smartphone 1874*b*, a controller 1874*c*, and/or other devices), head-wearable devices 1811 (e.g., the AR system 1400 or the VR system 1450), and/or wrist-wearable devices 1820 (e.g., the artificial-reality headset 102). In some embodiments, the one or more of servers 1870, electronic devices 1874, head-wearable devices 1811, and/or wrist-wearable devices 1820 are communicatively coupled via a network 1872. In some embodiments, the head-wearable device 1811 is configured to cause one or more operations to be performed by a communicatively coupled wrist-wearable device 1820, and/or the two devices can also both be connected to an intermediary device, such as a smartphone 1874*b*, a controller 1874*c*, or other device that provides instructions and data to and between the two devices. In some embodiments, the head-wearable device 1811 is configured to cause one or more operations to be performed by multiple devices in conjunction with the wrist-wearable device 1820. In some embodiments, instructions to cause the performance of one or more operations are controlled via an artificial-reality processing module 1845. The artificial-reality processing module 1845 can be implemented in one or more devices, such as the one or more of servers 1870, electronic devices 1874, head-wearable devices 1811, and/or wrist-wearable devices 1820. In some embodiments, the one or more devices perform operations of the artificial-reality processing module 1845, using one or more respective processors, individually or in conjunction with at least one other device as described herein. In some embodiments, the system 1800 includes other wearable devices not shown in FIG. 9A, such as rings, collars, anklets, gloves, and the like.

In some embodiments, the system 1800 provides the functionality to control or provide commands to the one or more electronic devices 1874 based on a wearable device (e.g., head-wearable device 1811 or wrist-wearable device 1820) determining motor actions or intended motor actions of the user. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals but can additionally (using a fusion of the various sensor inputs) or alternatively be detected using other types of sensors (such as cameras focused on viewing hand movements and/or using data from an inertial measurement unit that can detect characteristic vibration sequences or other data types to correspond to particular in-air hand gestures). The one or more computing devices include one or more of a head-mounted display, smartphones, tablets, smart watches, laptops, computer systems, augmented-reality systems, robots, vehicles, virtual avatars, user interfaces, a wrist-wearable device, and/or other electronic devices and/or control interfaces.

In some embodiments, the motor actions include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user is able to define one or more gestures using the learning module. In some embodiments, the user is able to enter a training phase in which a user-defined gesture is associated with one or more input commands that when provided to a computing device cause the computing device to perform an action. Similarly, the one or more input commands associated with the user-defined gesture can be used to cause a wearable device to perform one or more actions locally. The user-defined gesture, once trained, is stored in the memory 1860. Similar to the motor actions, the one or more processors 1850 can use the detected neuromuscular signals by the one or more sensors 1825 to determine that a user-defined gesture was performed by the user.

The electronic devices 1874 can also include a communication interface 1815, an interface 1819 (e.g., including one or more displays, lights, speakers, and haptic generators), one or more sensors 1825, one or more applications 1835, an artificial-reality processing module 1845, one or more processors 1850, and memory 1860. The electronic devices 1874 are configured to communicatively couple with the wrist-wearable device 1820 and/or head-wearable device 1811 (or other devices) using the communication interface 1815. In some embodiments, the electronic devices 1874 are configured to communicatively couple with the wrist-wearable device 1820 and/or head-wearable device 1811 (or other devices) via an application programming interface (API). In some embodiments, the electronic devices 1874 operate in conjunction with the wrist-wearable device 1820 and/or the head-wearable device 1811 to determine a hand gesture and cause the performance of an operation or action at a communicatively coupled device.

The server 1870 includes a communication interface 1815, one or more applications 1835, an artificial-reality processing module 1845, one or more processors 1850, and memory 1860. In some embodiments, the server 1870 is configured to receive sensor data from one or more devices such as the head-wearable device 1811, the wrist-wearable device 1820, and/or electronic device 1874, and use the received sensor data to identify a gesture or user input. The server 1870 can generate instructions that cause the performance of operations and actions associated with a determined gesture or user input at communicatively coupled devices, such as the head-wearable device 1811.

Figure 9B:
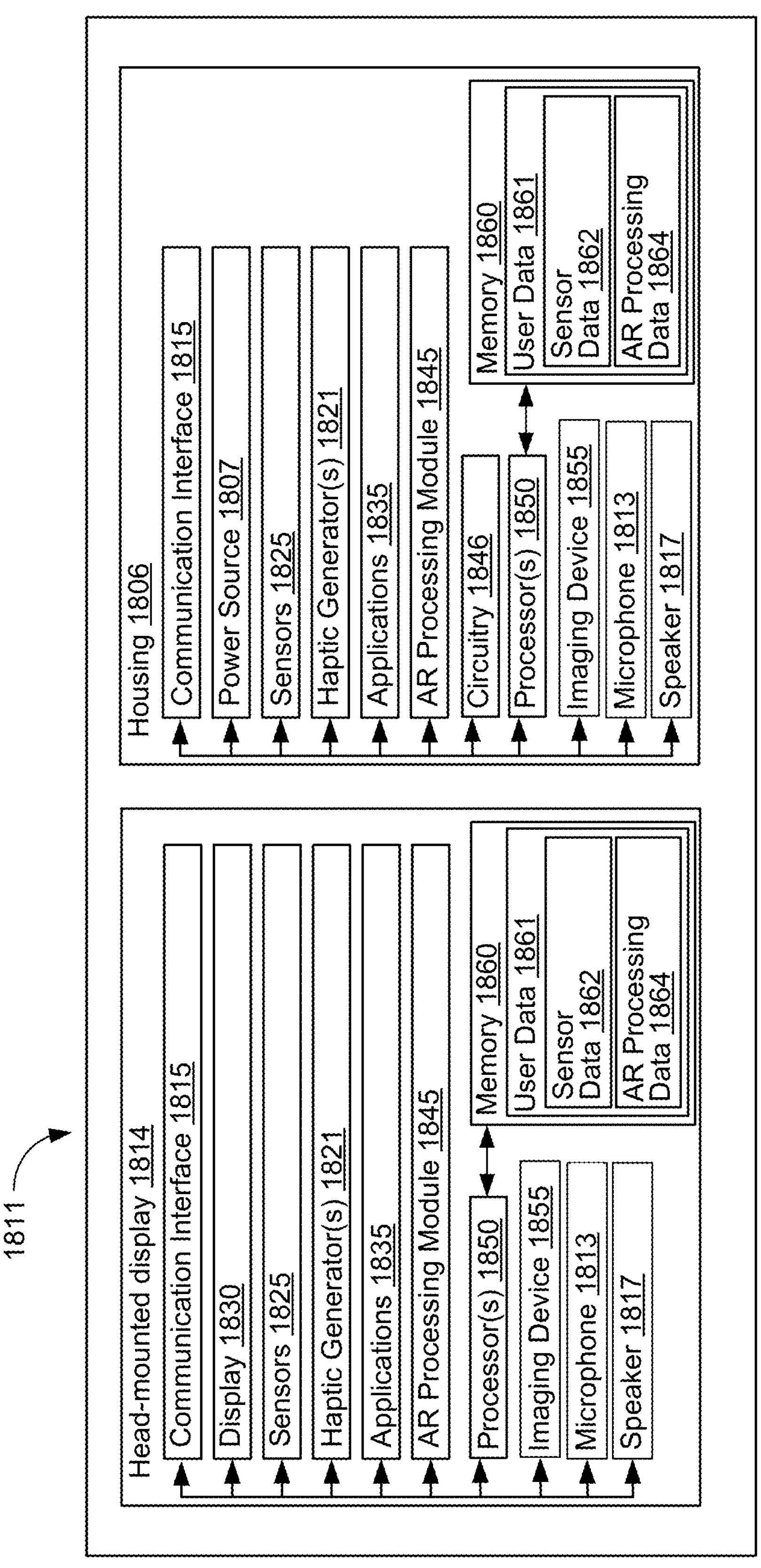
FIG. 9B is a block diagram showing additional components that can be used with the artificial-reality system of FIG. 9A in accordance with some embodiments.

FIG. 9B describes additional details of a head-mounted display (HMD) 1814 and modular housing 1806 described above in reference to FIG. 9A in accordance with some embodiments. In various embodiments, the head-wearable device 1811 is, or includes: smart glasses (e.g., the augmented-reality glasses), artificial reality headsets (e.g., VR/AR headsets), or other head worn devices. In some embodiments, one or more components of the head-wearable device 1811 are housed within a body of the HMD 1814 (e.g., frames of smart glasses or a body of an AR headset). In some embodiments, one or more components of the head-wearable device 1811 are stored within or coupled with lenses of the HMD 1814. Alternatively, or in addition, in some embodiments, one or more components of the head-wearable device 1811 are housed within a modular housing 1806. The head-wearable device 1811 is configured to communicatively couple with other electronic device 1874 and/or a server 1870 using communication interface 1815 as discussed above.

The housing 1806 includes a communication interface 1815, circuitry 1846, a power source 1807 (e.g., a battery for powering one or more electronic components of the housing 1806 and/or providing usable power to the HMD 1814), one or more processors 1850, and memory 1860. In some embodiments, the housing 1806 includes one or more supplemental components that add to the functionality of the HMD 1814. For example, in some embodiments the housing 1806 includes one or more sensors 1825, an AR processing module 1845, one or more haptic generators 1821, one or more imaging devices 1855, one or more microphones 1813, one or more speakers 1817, etc. The housing 1806 is configured to couple with the HMD 1814 via the one or more retractable side straps. More specifically, the housing 1806 is a modular portion of the head-wearable device 1811 that can be removed from head-wearable device 1811 and replaced with another housing (which includes more or less functionality). The modularity of the housing 1806 allows a user to adjust the functionality of the head-wearable device 1811 based on the user's needs.

In some embodiments, the communications interface 1815 is configured to communicatively couple the housing 1806 with the HMD 1814, the server 1870, and/or other electronic device 1874 (e.g., the controller 1874*c*, a tablet, or other computing device). The communication interface 1815 is used to establish wired or wireless connections between the housing 1806 and the other devices. In some embodiments, the communication interface 1815 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. In some embodiments, the housing 1806 is configured to communicatively couple with the HMD 1814 and/or other electronic device 1874 via an application programming interface (API).

In some embodiments, the power source 1807 is a battery. The power source 1807 can be a primary or secondary battery source for the HMD 1814. In some embodiments, the power source 1807 provides useable power to the one or more electrical components of the housing 1806 or the HMD 1814. For example, the power source 1807 can provide usable power to the sensors 1825, the speakers 1817, the HMD 1814, and the microphone 1813. In some embodiments, the power source 1807 is a rechargeable battery. In some embodiments, the power source 1807 is a modular battery that can be removed and replaced with a fully charged battery while it is charged separately.

The one or more sensors 1825 can include heart rate sensors, neuromuscular-signal sensors (e.g., electromyography (EMG) sensors), SpO2 sensors, altimeters, thermal sensors or thermal couples, ambient light sensors, ambient noise sensors, and/or IMUs. Additional non-limiting examples of the one or more sensors 1825 include infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 1825 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable-device data (e.g., biometric readings and output, accelerometer data). The one or more sensors 1825 can include location sensing devices (e.g., GPS) configured to provide location information. In some embodiments, the data measured or sensed by the one or more sensors 1825 is stored in the memory 1860. In some embodiments, the housing 1806 receives sensor data from communicatively coupled devices such as the HMD 1814, the server 1870, and/or other electronic device 1874. Alternatively, the housing 1806 can provide sensors data to the HMD 1814, the server 1870, and/or other electronic device 1874.

The one or more haptic generators 1821 can include one or more actuators (e.g., eccentric rotating mass (ERM), linear resonant actuators (LRA), voice coil motor (VCM), piezo haptic actuator, thermoelectric devices, solenoid actuators, and/or ultrasonic transducers or sensors). In some embodiments, the one or more haptic generators 1821 are hydraulic, pneumatic, electric, and/or mechanical actuators. In some embodiments, the one or more haptic generators 1821 are part of a surface of the housing 1806 that can be used to generate a haptic response (e.g., a thermal change at the surface, a tightening or loosening of a band, or an increase or decrease in pressure). For example, the one or more haptic generators 1821 can apply vibration stimulations, pressure stimulations, squeeze stimulations, shear stimulations, temperature changes, or some combination thereof to the user. In addition, in some embodiments the one or more haptic generators 1821 include audio generating devices (e.g., speakers 1817 and other sound transducers) and illuminating devices (e.g., LEDs or screen displays). The one or more haptic generators 1821 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 1835 include social media applications, banking applications, health applications, messaging applications, web browsers, gaming applications, streaming applications, media applications, imaging applications, productivity applications, and/or social applications. In some embodiments, the one or more applications 1835 include artificial reality applications. The one or more applications 1835 are configured to provide data to the head-wearable device 1811 for performing one or more operations. In some embodiments, the one or more applications 1835 are displayed via a display 1830 of the head-wearable device 1811 (e.g., via the HMD 1814).

In some embodiments, instructions to cause the performance of one or more operations are controlled via an artificial-reality (AR) processing module 1845. The AR processing module 1845 can be implemented in one or more devices, such as the one or more of servers 1870, electronic devices 1874, head-wearable devices 1811, and/or wrist-wearable devices 1820. In some embodiments, the one or more devices perform operations of the AR processing module 1845 using one or more respective processors, individually or in conjunction with at least one other device as described herein. In some embodiments, the AR processing module 1845 is configured to process signals based at least on sensor data. In some embodiments, the AR processing module 1845 is configured to process signals based on image data received that captures at least a portion of the user hand, mouth, facial expression, surrounding, etc. For example, the housing 1806 can receive EMG data and/or IMU data from one or more sensors 1825 and provide the sensor data to the AR processing module 1845 for a particular operation (e.g., gesture recognition or facial recognition). The AR processing module 1845 causes a device communicatively coupled to the housing 1806 to perform an operation (or action). In some embodiments, the AR processing module 1845 performs different operations based on the sensor data and/or performs one or more actions based on the sensor data.

In some embodiments, the one or more imaging devices 1855 include an ultra-wide camera, a wide camera, a telephoto camera, a depth-sensing cameras, or other types of cameras. In some embodiments, the one or more imaging devices 1855 are used to capture image data and/or video data. The imaging devices 1855 can be coupled to a portion of the housing 1806. The captured-image data can be processed and stored in memory and then presented to a user for viewing. The one or more imaging devices 1855 can include one or more modes for capturing image data or video data. For example, these modes can include a high-dynamic range (HDR) image-capture mode, a low light image capture mode, burst image capture mode, and other modes. In some embodiments, a particular mode is automatically selected based on the environment (e.g., lighting and/or movement of the device). For example, a wrist-wearable device with HDR image-capture mode and a low light image-capture mode active can automatically select the appropriate mode based on the environment (e.g., dark lighting may result in the use of low light image-capture mode instead of HDR image-capture mode). In some embodiments, the user can select the mode. The image data and/or video data captured by the one or more imaging devices 1855 is stored in the memory 1860 (which can include volatile and non-volatile memory such that the image data and/or video data can be temporarily or permanently stored, as needed, depending on the circumstances).

The circuitry 1846 is configured to facilitate the interaction between the housing 1806 and the HMD 1814. In some embodiments, the circuitry 1846 is configured to regulate the distribution of power between the power source 1807 and the HMD 1814. In some embodiments, the circuitry 1846 is configured to transfer audio and/or video data between the HMD 1814 and/or one or more components of the housing 1806.

The one or more processors 1850 can be implemented as any kind of computing device, such as an integrated system-on-a-chip, a microcontroller, a fixed programmable gate array (FPGA), a microprocessor, and/or other application-specific integrated circuits (ASICs). The processor may operate in conjunction with memory 1860. The memory 1860 may be or include random access memory (RAM), read-only memory (ROM), dynamic random-access memory (DRAM), static random-access memory (SRAM) and magnetoresistive random access memory (MRAM), and may include firmware, such as static data or fixed instructions, basic input/output system (BIOS), system functions, configuration data, and other routines used during the operation of the housing and the processor 1850. The memory 1860 also provides a storage area for data and instructions associated with applications and data handled by the processor 1850.

In some embodiments, the memory 1860 stores user data 1861, including sensor data 1862 and AR processing data 1864. The sensor data 1862 includes sensor data monitored by one or more sensors 1825 of the housing 1806 and/or sensor data received from one or more devices communicative coupled with the housing 1806, such as the HMD 1814, the smartphone 1874*b*, the controller 1874*c*, etc. The sensor data 1862 can include sensor data collected over a predetermined period of time that can be used by the AR processing module 1845. The AR processing data 1864 can include one or more predefined camera-control gestures, user-defined camera-control gestures, predefined non-camera-control gestures, and/or user-defined non-camera-control gestures. In some embodiments, the AR processing data 1864 further includes one or more predetermined thresholds for different gestures.

The HMD 1814 includes a communication interface 1815, a display 1830, an AR processing module 1845, one or more processors, and memory. In some embodiments, the HMD 1814 includes one or more sensors 1825, one or more haptic generators 1821, one or more imaging devices 1855 (e.g., a camera), microphones 1813, speakers 1817, and/or one or more applications 1835. The HMD 1814 operates in conjunction with the housing 1806 to perform one or more operations of a head-wearable device 1811, such as capturing camera data, presenting a representation of the image data at a coupled display, operating one or more applications 1835, and/or allowing a user to participate in an AR environment.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:

presenting, via an artificial-reality headset, a user interface that includes a selectable user interface element;

while a representation of a hand of a user is within an indirect-control threshold distance of the user interface, projecting a focus selector within the user interface based on a position of the representation of the hand of the user, wherein, while the hand of the user is within the indirect-control threshold distance of the user interface, the selectable user interface element is configured for interaction by the focus selector; and upon determining that the representation of the hand of the user has moved within a direct-touch threshold distance of the user interface, ceasing to display the focus selector within the user interface and altering the selectable user interface element to be directly interacted by the representation of the hand of the user.

2. The method of claim 1, further comprising:

in conjunction with projecting the focus selector within the user interface based on a position of the representation of the hand of the user:

presenting a directional element associated with the focus selector near the representation of the hand of the user; and before the representation of the hand of the user has moved within the direct-touch threshold distance, altering a visual characteristic associated with the focus selector.

3. The method of claim 2, wherein a visual characteristic of the directional element is altered in conjunction with the altering of the visual characteristic of the focus selector.

4. The method of claim 1, further comprising:

determining that direct-touch contact has occurred between the representation of the hand of the user and the selectable user interface element; and in accordance with the determining that the direct-touch contact has occurred between the representation of the hand of the user and the selectable user interface element:

adjusting a visual characteristic of the selectable user interface element such that a visual glow is presented behind the selectable user interface element.

5. The method of claim 1, wherein a position of the representation of the hand of the user is not based on user interactions with a touch-screen display.

6. The method of claim 1, wherein the direct interaction by the representation of the hand of the user is performed while no handheld controllers or other mechanical or electronic devices are in physical contact with a hand or a wrist of the user.

7. A non-transitory, computer-readable storage medium storing one or more programs wherein the one or more programs are that, when executed by an extended-reality headset causes the artificial-reality headset to:

present, via the artificial-reality headset, a user interface that includes a selectable user interface element;

while a representation of a hand of a user is within an indirect-control threshold distance of the user interface, project a focus selector within the user interface based on a position of the representation of the hand of the user, wherein, while the hand of the user is within the indirect-control threshold distance of the user interface, the selectable user interface element is configured for interaction by the focus selector; and upon determining that the representation of the hand of the user has moved within a direct-touch threshold distance of the user interface, cease to display the focus selector within the user interface and alter the selectable user interface element to be directly interacted by the representation of the hand of the user.

8. The non-transitory computer readable storage medium of claim 7, wherein the one or more programs are further configured to cause the artificial-reality headset to:

in conjunction with projecting the focus selector within the user interface based on a position of the representation of the hand of the user:

present a directional element associated with the focus selector near the representation of the hand of the user; and before the representation of the hand of the user has moved within the direct-touch threshold distance, alter a visual characteristic associated with the focus selector.

9. The non-transitory computer readable storage medium of claim 8, wherein a visual characteristic of the directional element is altered in conjunction with the altering of the visual characteristic of the focus selector.

10. The non-transitory computer readable storage medium of claim 7, wherein the one or more programs are further configured to cause the artificial-reality headset to:

determine that direct-touch contact has occurred between the representation of the hand of the user and the selectable user interface element; and in accordance with the determining that the direct-touch contact has occurred between the representation of the hand of the user and the selectable user interface element:

adjust a visual characteristic of the selectable user interface element such that a visual glow is presented behind the selectable user interface element.

11. The non-transitory computer readable storage medium of claim 7, wherein a position of the representation of the hand of the user is not based on user interactions with a touch-screen display.

12. The non-transitory computer readable storage medium of claim 7, wherein the direct interaction by the representation of the hand of the user is performed while no handheld controllers or other mechanical or electronic devices are in physical contact with a hand or a wrist of the user.

13. An artificial-reality headset, comprising:

one or more processors; and memory storing one or more programs that, when executed by one or more processors, cause the artificial-reality headset to:

present, via an artificial-reality headset, a user interface that includes a selectable user interface element;

while a representation of a hand of a user is within an indirect-control threshold distance of the user interface, projecting a focus selector within the user interface based on a position of the representation of the hand of the user, wherein, while the hand of the user is within the indirect-control threshold distance of the user interface, the selectable user interface element is configured for interaction by the focus selector; and upon determining that the representation of the hand of the user has moved within a direct-touch threshold distance of the user interface, cease to display the focus selector within the user interface and alter the selectable user interface element to be directly interacted by the representation of the hand of the user.

14. The artificial-reality headset of claim 13, wherein the one or more programs that, when executed further cause the artificial-reality headset to:

in conjunction with projecting the focus selector within the user interface based on a position of the representation of the hand of the user:

present a directional element associated with the focus selector near the representation of the hand of the user; and before the representation of the hand of the user has moved within the direct-touch threshold distance, alter a visual characteristic associated with the focus selector.

15. The non-transitory computer readable storage medium of claim 14, wherein a visual characteristic of the directional element is altered in conjunction with the altering of the visual characteristic of the focus selector.

16. The artificial-reality headset of claim 13, wherein the one or more programs that, when executed further cause the artificial-reality headset to:

determine that direct-touch contact has occurred between the representation of the hand of the user and the selectable user interface element; and in accordance with the determining that the direct-touch contact has occurred between the representation of the hand of the user and the selectable user interface element:

adjust a visual characteristic of the selectable user interface element such that a visual glow is presented behind the selectable user interface element.

17. The artificial-reality headset of claim 13, wherein a position of the representation of the hand of the user is not based on user interactions with a touch-screen display.

18. The artificial-reality headset of claim 13, wherein the direct interaction by the representation of the hand of the user is performed while no handheld controllers or other mechanical or electronic devices are in physical contact with a hand or a wrist of the user.

* * * * *